United States Patent
Yanai et al.

(10) Patent No.: US 8,130,415 B2
(45) Date of Patent: *Mar. 6, 2012

(54) IMAGE PROCESSING APPARATUS, IMAGE FORMING APPARATUS, AND CONTROL METHOD THEREOF, WHICH FORM AN IMAGE BY APPLYING N-ARY PROCESSING

(75) Inventors: Tomokazu Yanai, Yokohama (JP); Yumi Watanabe, Yokohama (JP); Atsushi Ushiroda, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,285

(22) Filed: May 6, 2011

(65) Prior Publication Data

US 2011/0211208 A1 Sep. 1, 2011

Related U.S. Application Data

(63) Continuation of application No. 12/022,305, filed on Jan. 30, 2008, now Pat. No. 7,986,440.

(30) Foreign Application Priority Data

Feb. 1, 2007 (JP) .................................. 2007-023515

(51) Int. Cl.
*G06K 15/00* (2006.01)
*H04N 1/46* (2006.01)
(52) U.S. Cl. .......... 358/2.1; 358/1.9; 358/3.06; 358/534
(58) Field of Classification Search ................ 358/1.1, 358/1.8, 1.9, 2.1, 3.06, 501, 502, 534; 347/5, 347/9, 15
See application file for complete search history.

(56) References Cited

U.S. PATENT DOCUMENTS 4,974,067 A 11/1990 Suzuki et al.
6,164,745 A 12/2000 Nagoshi et al.
(Continued)

FOREIGN PATENT DOCUMENTS

JP 06-336016 A 12/1994
(Continued)

OTHER PUBLICATIONS

Office Action—Japanese Patent Appln. No. 2007-023516, Japanese Patent Office, dated Apr. 8, 2011.

*Primary Examiner* — Thomas D Lee
(74) *Attorney, Agent, or Firm* — Fitzpatrick, Cella, Harper & Scinto

(57) ABSTRACT

In order to form a high-quality image, upon execution of multi-pass printing using a printing head with a plurality of nozzles, an image processing apparatus calculates, using a scan duty setting unit, scan duty data for respective nozzles for each scan of the printing head in accordance with input image data. A halftone processor generates a dot pattern to be formed by applying N-ary processing based on predetermined constraining condition information to the calculated scan duty data. A constraining, condition information calculation unit generates constraining condition information to be referred to by the halftone processor at the time of the next scan. The constraining condition information is set so that the phase of a next dot pattern to be generated has an opposite phase relationship in a low frequency region with respect, to the already printed dot pattern.

15 Claims, 55 Drawing Sheets

U.S. PATENT DOCUMENTS

| | | |
|---|---|---|
| 6,364,446 B1 | 4/2002 | Ishikawa et al. |
| 6,511,143 B1 | 1/2003 | Ishikawa et al. |
| 6,669,318 B2 | 12/2003 | Ushiroda |
| 7,207,650 B2 | 4/2007 | Ikemoto et al. |
| 7,986,440 B2 * | 7/2011 | Yanai et al. ............ 358/2.1 |
| 2006/0170937 A1 | 8/2006 | Takahashi |
| 2008/0186348 A1 | 8/2008 | Yanai et al. |
| 2008/0192267 A1 | 8/2008 | Watanabe |

FOREIGN PATENT DOCUMENTS

| | | |
|---|---|---|
| JP | 2000-103088 A | 4/2000 |
| JP | 2000-141714 A | 5/2000 |
| JP | 2001-063014 A | 3/2001 |

* cited by examiner

● : PIXEL OF INTEREST

F I G. 33
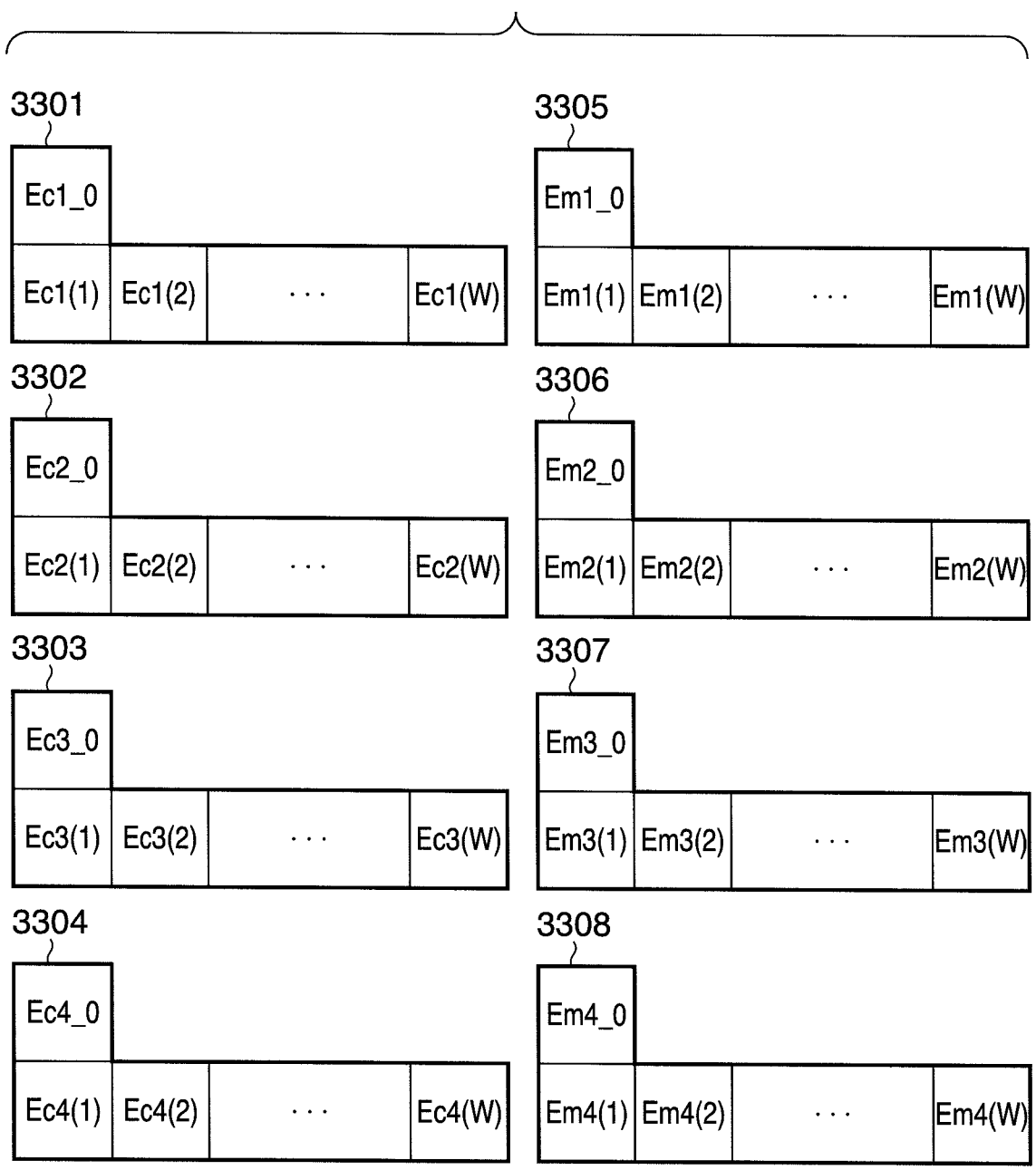

F I G. 38
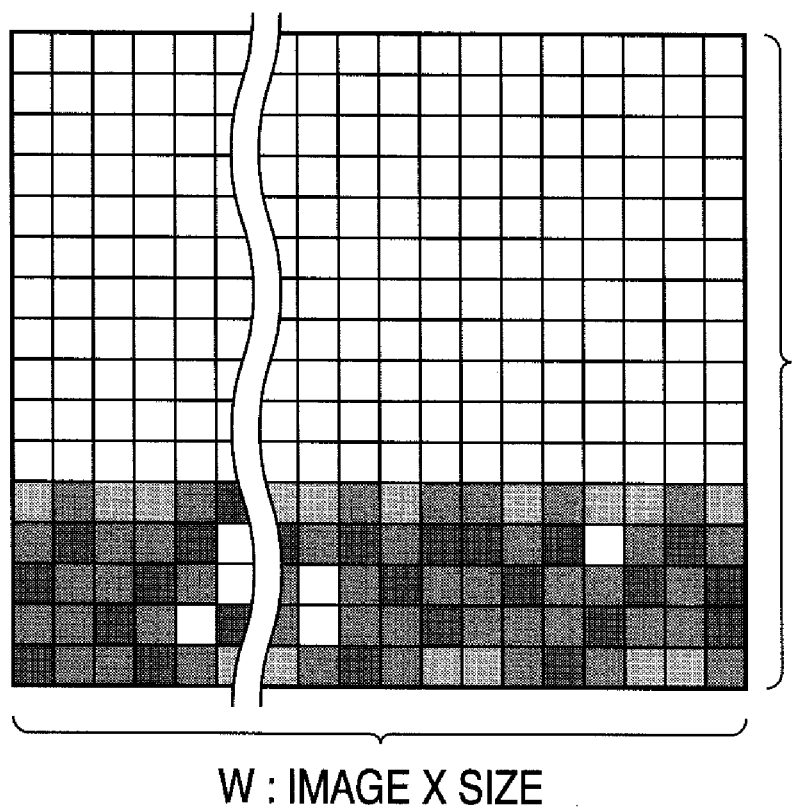
Nzzl : NUMBER OF NOZZLES
W : IMAGE X SIZE

Nzzl : NUMBER OF NOZZLES

W : IMAGE X SIZE

| 0.08 | 0.12 | 0.08 |
|---|---|---|
| 0.12 | 0.20 | 0.12 |
| 0.08 | 0.12 | 0.08 |

F_m $\sigma x(30)=1.0$
$\sigma y(30)=1.0$

5003

| 0.08 | 0.12 | 0.08 |
|---|---|---|
| 0.12 | 0.20 | 0.12 |
| 0.08 | 0.12 | 0.08 |

LPF_b $\sigma x(30)=1.0$
$\sigma y(30)=1.0$

5002

| 0.07 | 0.12 | 0.07 |
|---|---|---|
| 0.10 | 0.24 | 0.12 |
| 0.07 | 0.12 | 0.07 |

F_m $\sigma x(40)=0.9$
$\sigma y(40)=0.9$

5004

| 0.07 | 0.12 | 0.07 |
|---|---|---|
| 0.10 | 0.24 | 0.12 |
| 0.07 | 0.12 | 0.07 |

LPF_b $\sigma x(40)=0.9$
$\sigma y(40)=0.9$

F I G. 52
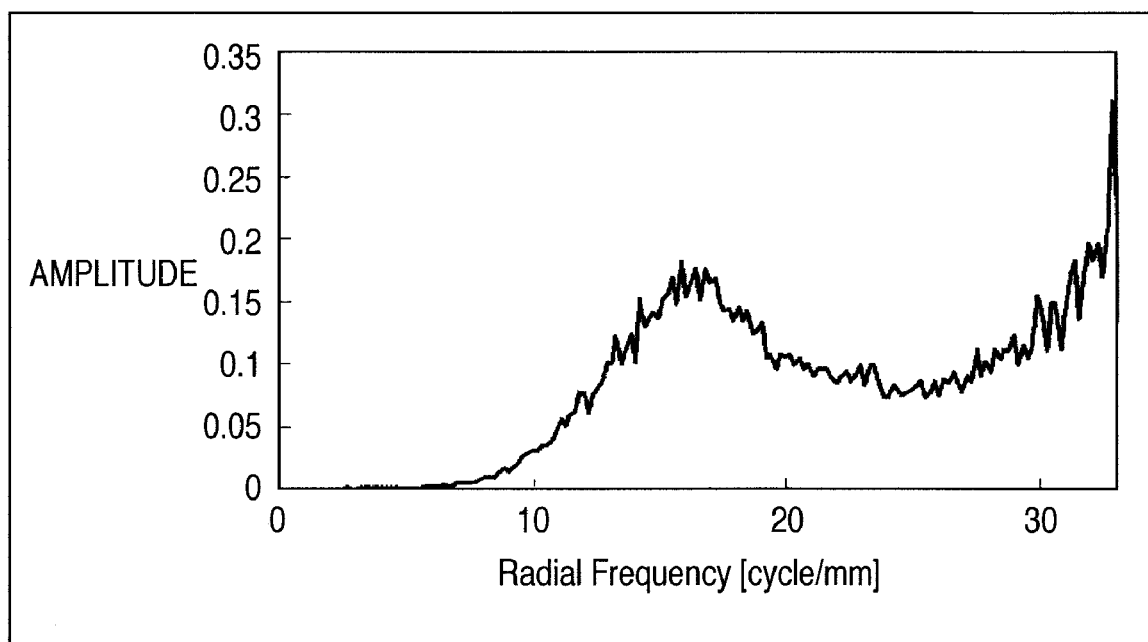

IMAGE PROCESSING APPARATUS, IMAGE FORMING APPARATUS, AND CONTROL METHOD THEREOF, WHICH FORM AN IMAGE BY APPLYING N-ARY PROCESSING

This application is a continuation of Application No. 12/022,305, which is currently pending.

BACKGROUND OF THE INVENTION

1. Field of the Invention

The present invention relates to an image processing apparatus, image forming apparatus, and control method thereof and, more particularly, to an image processing apparatus, image forming apparatus, and control method thereof, which form an image using the number of tones smaller than that of an input image.

2. Description of the Related Art

As image output apparatuses for wordprocessors, personal computers, facsimile apparatuses, and the like, printing apparatuses which print information of desired text, images, and the like on sheet-like printing media such as paper sheets, films, and the like are used. Such printing apparatuses adopt various printing schemes. Of these schemes, schemes for forming an image on a printing medium by attachment of printing agents are popularly put into practical use. As a representative example of such schemes, an ink-jet printing scheme is known.

A printing apparatus, which adopts the ink-jet printing scheme, comprises a nozzle group prepared by integrally arraying a plurality of ink ejection ports (nozzles) that can eject ink with an identical color and density, so as to attain improvement of the printing speed and higher image quality. Furthermore, in order to attain higher image quality, some printing apparatuses comprise a nozzle group which can eject ink with an identical color but different densities, and a nozzle group which can eject ink with an identical color and density by changing an ejection amount in some levels.

In such printing apparatus, as a scheme for converting multi-valued input image data into a binary (or N-ary: N is an integer equal to or larger than 2, which corresponds to the number of tones smaller than that of the input image data) image as a dot printing signal, an error diffusion method is known. According to the error diffusion method, pseudo tone expression is implemented by diffusing a binary error (or an N-ary error) produced at a given pixel to a plurality of subsequent pixels.

In addition to the aforementioned error diffusion method, as a means for converting multi-valued input image data as a binary (or N-ary) image as a dot recording signal, a dither matrix method is known. According to the dither matrix method, pseudo tone expression is implemented by executing N-ary processing by comparing a threshold matrix prepared in advance with the multi-valued input data. Since the dither matrix method requires processing simpler than the error diffusion method, it can achieve higher-speed processing.

In order to improve image quality upon actually forming an image, the number of tones of which has been converted by the error diffusion method or dither matrix method, on a printing medium, a technique for determining the formation order and allocations has been proposed (for example, see Japanese Patent Laid-Open No. 2000-103088 (patent reference 1)). According to this technique, by applying the error diffusion method for each scan, even when registrations of respective scans have varied, an image quality drop due to density nonuniformity can be suppressed. More specifically, a plurality of main scans are made on an identical main scan printing region using different nozzle groups, and a binary (or N-ary) image is formed by the error diffusion method for respective main scans. When a binary (N-ary) images is generated by executing the error diffusion method for respective main scans, the dispersiveness of dot allocations in the main scan becomes high and uniform. Therefore, upon forming an image by a plurality of main scans, even when physical registrations such as the feed amounts of a printing medium, the positions of printing elements, and the like have varied, the graininess hardly changes. Since the dot allocations among the plurality of main scans have low correlation, even when the registrations have varied, a change in dot coverage with respect to the sheet surface is reduced, thus greatly relaxing density nonuniformity.

However, with the scheme described in aforementioned patent reference 1, since the dot allocations among the main scans have low correlation, low frequency components of an image generated by the plurality of scans are unwantedly emphasized. These low frequency components are emphasized more with increasing number of scans, and are recognized as graininess which is visually obtrusive.

The present invention has been made to solve such problems, and has as its object to provide an image forming apparatus having the following functions and a control method thereof. That is, N-ary processing is executed for each main scan based on constraining condition information which is updated real-time based on the N-ary result (N is an integer equal to or larger than 2) in the previous scan, thus suppressing deterioration of graininess depending on the low frequency components of an image, and allowing formation of a high-quality image.

SUMMARY OF THE INVENTION

The present invention has been made in consideration of the aforementioned problems, and has as its object to solve one or more of the aforementioned problems.

According to one aspect of the present invention, there is provided an image forming apparatus which forms an image by scanning a printing head, comprising a plurality of printing elements, on a printing medium, comprises: an input unit adapted to input image data; a calculation unit adapted to calculate printing amounts for the respective printing elements for each main scan of the printing head in accordance with the image data; an N-ary unit adapted to generate a dot pattern to be formed by applying N-ary processing (N is an integer not less than 2) to the printing amounts calculated by the calculation unit based on predetermined constraining condition information; and a generation unit adapted to generate the constraining condition information to be referred to by the N-ary unit at the time of a next main scan based on the printing amounts calculated by the calculation unit and the dot pattern output from the N-ary unit, wherein the generation unit generates the constraining condition information so that a phase of the dot pattern to be generated by the N-ary unit has an opposite phase relationship in a low frequency region with respect to a dot pattern already printed on an identical region on the printing medium.

According to another aspect of the present invention, there is provided an image processing apparatus which outputs a dot pattern to an image forming apparatus that forms an image by scanning a printing head, comprising a plurality of printing elements, on a printing medium, comprises: an input unit adapted to input image data; a calculation unit adapted to calculate printing amounts for the respective printing elements for each main scan of the printing head; an N-ary unit adapted to generate a dot pattern to be formed by applying N-ary processing to the printing amounts calculated by the calculation unit based on predetermined constraining condition information; and a generation unit adapted to generate the constraining condition information to be referred to by the N-ary unit at the time of a next main scan based on the printing amounts calculated by the calculation unit and the dot pattern output from the N-ary unit, wherein the generation unit generates the constraining condition information so that a phase of the dot pattern to be generated by the N-ary unit has an opposite phase relationship in a low frequency region with respect to a dot pattern already printed on an identical region on the printing medium.

According to still another aspect of the present invention, there is provided a method of controlling an image forming apparatus which forms an image by scanning a printing head, comprising a plurality of printing elements, on a printing medium, comprises: an input step of causing an input unit to input image data; a calculation step of causing a calculation unit to calculate printing amounts for the respective printing elements for each main scan of the printing head in accordance with the image data; an N-ary step of causing an N-ary unit to generate a dot pattern to be formed by applying N-ary processing based on predetermined constraining condition information to the printing amounts calculated in the calculation step; and a generation step of causing a generation unit to generate the constraining condition information to be referred to by the N-ary unit at the time of a next main scan based on the printing amounts calculated in the calculation step and the dot pattern output from the N-ary step, wherein in the generation step, the constraining condition information is generated so that a phase of the dot pattern to be generated by the N-ary unit has an opposite phase relationship in a low frequency region with respect to a dot pattern already printed on an identical region on the printing medium.

According to yet another aspect of the present invention, there is provided a method of controlling an image processing apparatus which outputs a dot pattern to an image forming apparatus that forms an image by scanning a printing head, comprising a plurality of printing elements, on a printing medium, comprises: an input step of causing an input unit to input image data; a calculation step of causing a calculation unit to calculate printing amounts for the respective printing elements for each main scan of the printing head in accordance with the image data; an N-ary step of causing an N-ary unit to generate a dot pattern to be formed by applying N-ary processing based on predetermined constraining condition information to the printing amounts calculated in the calculation step; and a generation step of causing a generation unit to generate the constraining condition information to be referred to by the N-ary unit at the time of a next main scan based on the printing amounts calculated in the calculation step and the dot pattern output from the N-ary step, wherein in the generation step, the constraining condition information is generated so that a phase of the dot pattern to be generated by the N-ary unit has an opposite phase relationship in a low frequency region with respect to a dot pattern already printed on an identical region on the printing medium.

According to the present invention, N-ary processing is executed for each main scan based on constraining condition information which is updated real-time based on the N-ary result (N is an integer equal to or larger than 2) in the previous scan, thus suppressing deterioration of graininess depending on the low frequency components of an image, and allowing formation of a high-quality image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 33 shows the storage areas of respective accumulated error line buffers according to the third embodiment;

FIG. 38 shows cyan halftone data after the filter processing according to the third embodiment;

FIG. 50 shows practical examples of filters in the constraining condition information calculation processing according to the fourth embodiment;

FIG. 52 shows a Fourier analysis result of the dot allocation according to the fifth embodiment;

DESCRIPTION OF THE EMBODIMENTS

The preferred embodiments of the present invention will be described in detail hereinafter with reference to the accompanying drawings. Note that the arrangements to be described in the following embodiments are merely examples, and the present invention is not limited to the illustrated arrangements.

First Embodiment

Figure 1:
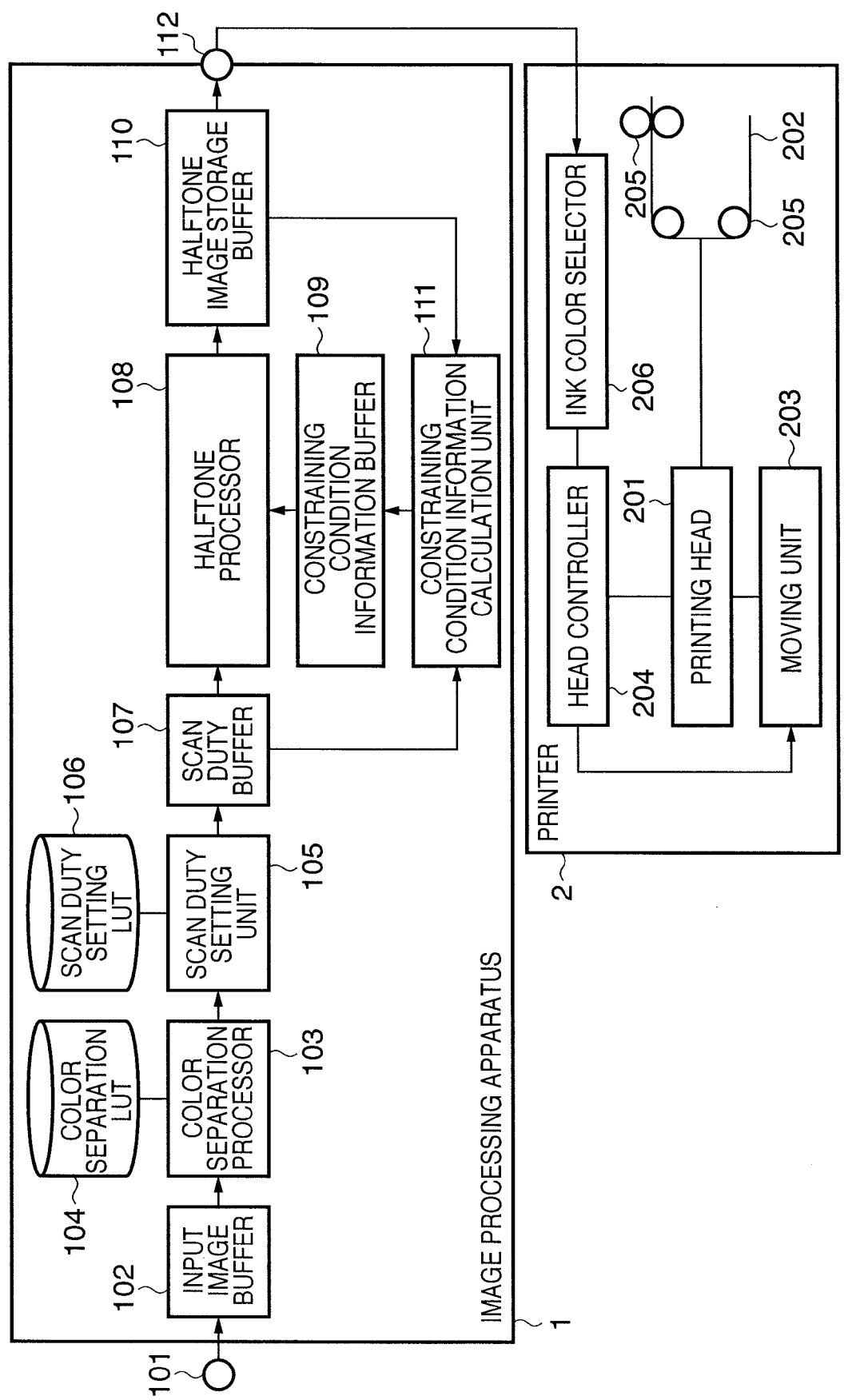
FIG. 1 is a block diagram showing the arrangement of an image forming system according to one embodiment of the present invention.

FIG. 1 is a block diagram showing the arrangement of an image forming system according to this embodiment. Referring to FIG. 1, reference numeral 1 denotes an image processing apparatus; and 2, a printer. Note that the image processing apparatus 1 can be implemented by, e.g., a printer driver installed in a general personal computer. In this case, the respective units of the image processing apparatus 1 to be described below are implemented when the computer executes a predetermined program. As another arrangement, for example, the printer 2 may include the image processing apparatus 1.

The image processing apparatus 1 and printer 2 are connected to each other via a printer interface or circuit. The image processing apparatus 1 receives image data to be printed from an image data input terminal 101, and stores it in an input image buffer 102. A color separation processor 103 separates the input image data into ink colors the printer 2 uses. Upon execution of this color separation processing, the processor 103 looks up a color separation lookup table (LUT) 104. A scan duty setting unit 105 further converts ink color values separated by the color separation processor 103 into those for each scan, and stores the converted data in a scan duty buffer 107. Scan duty data in this embodiment indicates a printing ink amount for each scan.

A halftone processor 108 converts multi-tone (three or more tones) values of respective colors for each scan, which are obtained by the scan duty setting unit 105, into binary image data based on values accumulated in a constraining condition information buffer 109 (to be described below).

The constraining condition information buffer 109 accumulates information indicating whether or not a dot is easily formed at an address on an image to be printed. Note that the constraining condition information buffer 109 is assured for each ink color.

A halftone image storage buffer 110 stores binary image data of each color obtained by the halftone processor 108. A constraining condition information calculation unit 111 generates constraining condition information by making predetermined calculations based on the binary image data stored in the halftone image storage buffer 110 and the scan duty data stored in the scan duty buffer 107, and updates the contents of the constraining condition information buffer 109.

The binary image data stored in the halftone image storage buffer 110 is output to the printer 2 via an output terminal 112.

The printer 2 forms the binary image data formed by the image processing apparatus 1 on a printing medium 202 by vertically and horizontally moving a printing head 201 relative to the printing medium 202. As the printing head 201, any of heads of a thermal transfer scheme, electrophotography scheme, ink-jet scheme, and the like can be used, and the printing head 201 of any of these schemes has one or more printing elements (nozzles in case of the ink-jet scheme). A moving unit 203 moves the printing head 201 under the control of a head controller 204. A convey unit 205 conveys a printing medium under the control of the head controller 204. An ink color selector 206 selects an ink color from those mounted in the printing head 201 based on the binary image data for respective colors formed by the image processing apparatus 1.

Figure 2:
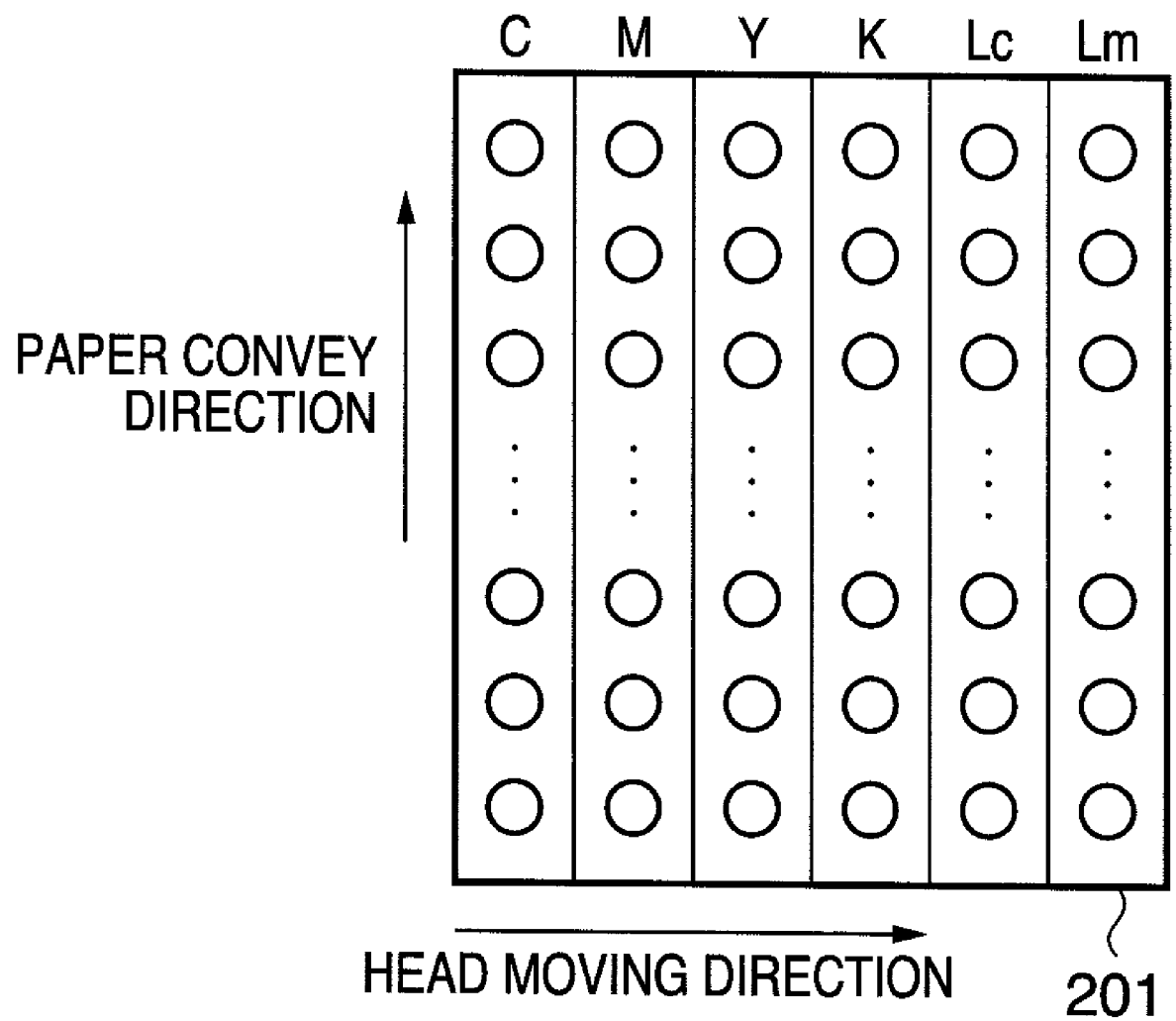
FIG. 2 shows a configuration example of a printing head in a printer according to the embodiment of the present invention.

FIG. 2 shows a configuration example of the printing head 201. In this embodiment, the printing head 201 mounts inks of six colors including light cyan (Lc) and light magenta (Lm) having relatively low ink densities in addition to inks of four colors, i.e., cyan (C), magenta (M), yellow (Y), and black (K).

Note that FIG. 2 shows the configuration in which nozzles line up in the paper convey direction for the sake of simplicity. However, the number and layout of nozzles are not limited to this example. For example, the head may have nozzle arrays which eject identical ink in different amounts or a plurality of nozzle arrays which eject ink in an identical amount, or nozzles may be laid out in a zigzag pattern. In FIG. 2, as for the layout order of ink colors, the ink colors line up in the head moving direction. Alternatively, the ink colors may line up in the paper convey direction.

The image forming processing in the image processing apparatus 1 of this embodiment with the aforementioned functional arrangement will be described below with reference to the flowchart of FIG. 3.

Multi-tone color input image data is input from the input terminal 101, and is stored in the input image buffer 102 (S101). Note that the input image data includes three color components, i.e., red (R), green (G), and blue (B) to form color image data.

The color separation processor 103 applies color separation processing from R, G, and B to C, M, Y, K, Lc, and Lm color ink planes to the multi-tone color input image data stored in the input image buffer 102 (S102). In this embodiment, each pixel data after the color separation processing is handled as 8 bits. However, conversion to the number of tones more than 8 bits may be made.

As described above, the printing head 201 of this embodiment has six different ink colors. For this reason, R, G, and B color input image data are converted into image data of a total of six planes, i.e., C, M, Y, K, Lc, and Lm planes. That is, image data of six different planes corresponding to six different ink colors are generated.

Details of the color separation processing of this embodiment will be described below with reference to FIG. 4.

Figure 4:
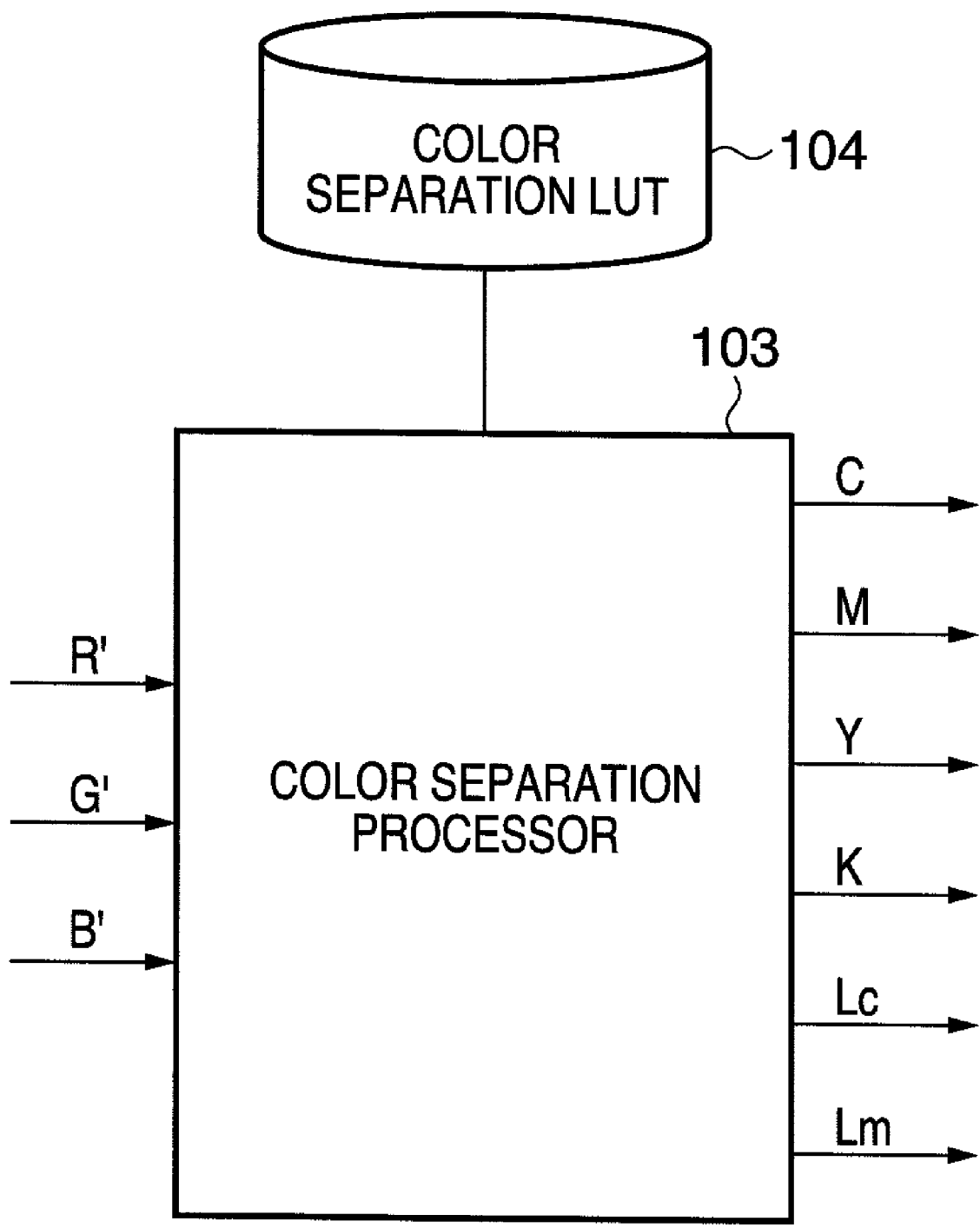
FIG. 4 shows details of input and output data in a color separation processor according to the embodiment of the present invention.

FIG. 4 shows details of input and output data in the color separation processor 103. As shown in FIG. 4, input image data R', G', and B' are converted into C, M, Y, K, Lc, and Lm data by looking up the color separation LUT 104, as given by:

$$C = C\_LUT\_3D(R', G', B') \quad (1)$$

$$M = M\_LUT\_3D(R', G', B') \quad (2)$$

$$Y = Y\_LUT\_3D(R', G', B') \quad (3)$$

$$K = K\_LUT\_3D(R', G', B') \quad (4)$$

$$Lc = Lc\_LUT\_3D(R', G', B') \quad (5)$$

$$Lm = Lm\_LUT\_3D(R', G', B') \quad (6)$$

Note that respective functions defined in the right-hand sides of equations (1) to (6) correspond to the contents of the color separation LUT 104. The color separation LUT 104 defines the output values of respective ink colors from the three input values, i.e., red, green, and blue. Since this embodiment comprises six colors C, M, Y, K, Lc, and Lm, the LUT configuration that obtains six output values from the three input values is adopted.

With the aforementioned processing, the color separation processing of this embodiment is complete.

Referring back to FIG. 3, the scan duty setting unit 105 sets a scan number k and Ycut(k) indicating a Y-coordinate as a color separation data cut position (S103). Ycut(k) is the color separation data cut position at the scan number k, and corresponds to a nozzle upper end coordinate. Note that an initial value of scan number k is 1, and is incremented one by one for each processing loop.

The method of setting the color separation data cut position Y-coordinate Ycut will be explained below taking as an example a case of 4-pass printing which uses the head comprising 16 nozzle arrays and forms an image on an identical main scan printing region on an image by four scans.

Figure 5:
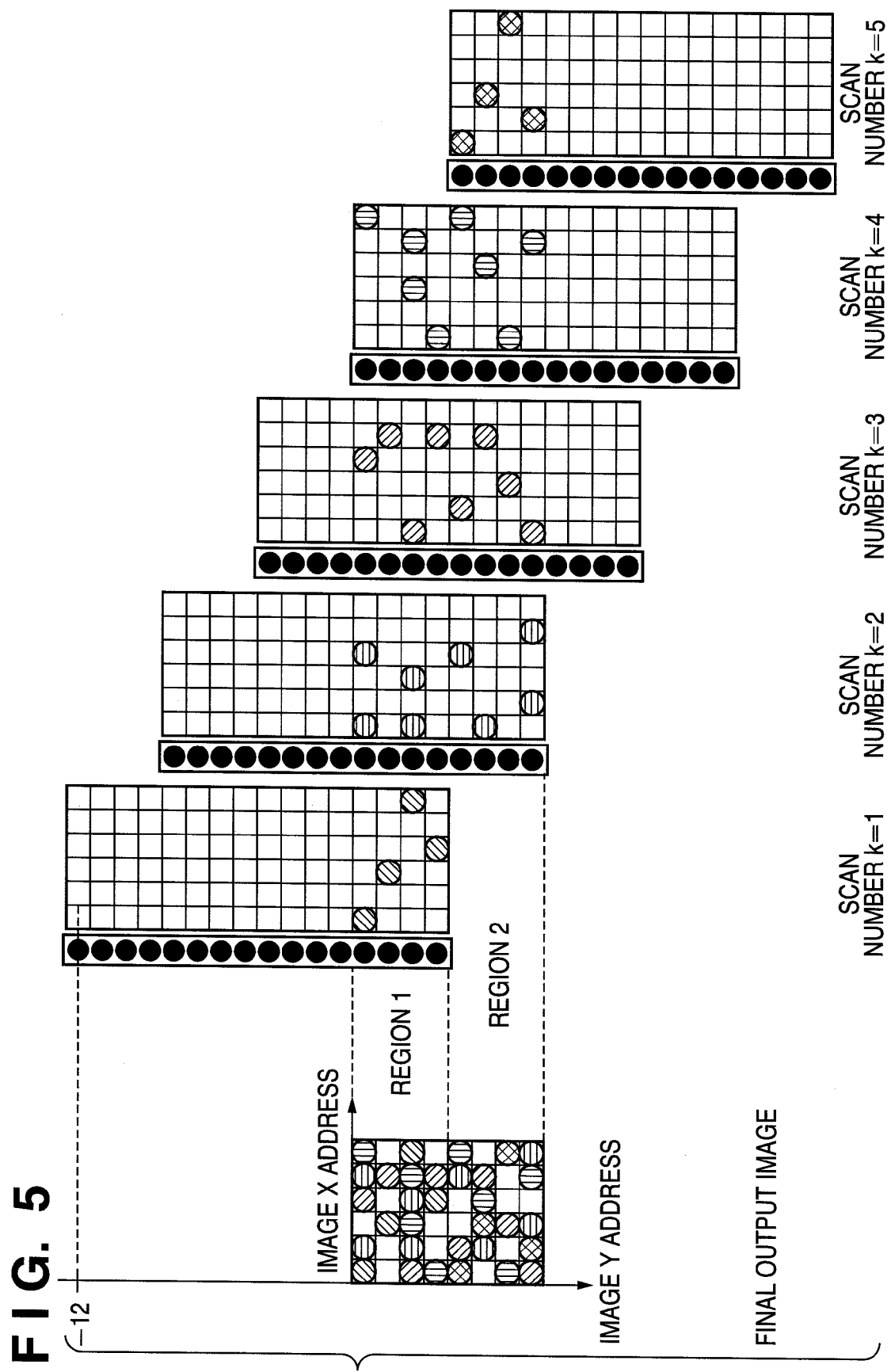
FIG. 5 shows an overview of image formation in a 16-nozzle, 4-pass printing mode according to the embodiment of the present invention.

In general, in case of 4-pass printing, as shown in FIG. 5, an image is formed using only ¼ nozzle arrays from the lower end at the initial value (k=1) of the scan number, and an image is formed at the scan number k=2 after a paper sheet is fed by a ¼ nozzle length with respect to the scan number k=1. Furthermore, an image is formed at the scan number k=3 after the sheet is fed by another ¼ nozzle length with respect to the scan number k=2. By repeating such image formation and paper feed, a final output image is formed. For example, in case of the scan number k=1, a color separation data cut position Ycut=−12 corresponding to a nozzle upper end coordinate is set.

Upon normalizing the aforementioned color separation data cut position Ycut(k), Ycut(k) is given by:

$$Ycut(k) = -Nzzl + (Nzzl/Pass) \times k \quad (7)$$

where Nzzl is the number of nozzle arrays, Pass is the number of passes, and k is the scan number.

After Ycut(k) is set as described above, the scan duty setting unit 105 sets duty values for respective scans based on the scan duty setting LUT 106 and image data of the respective color separation processing planes (S104).

Figure 6:
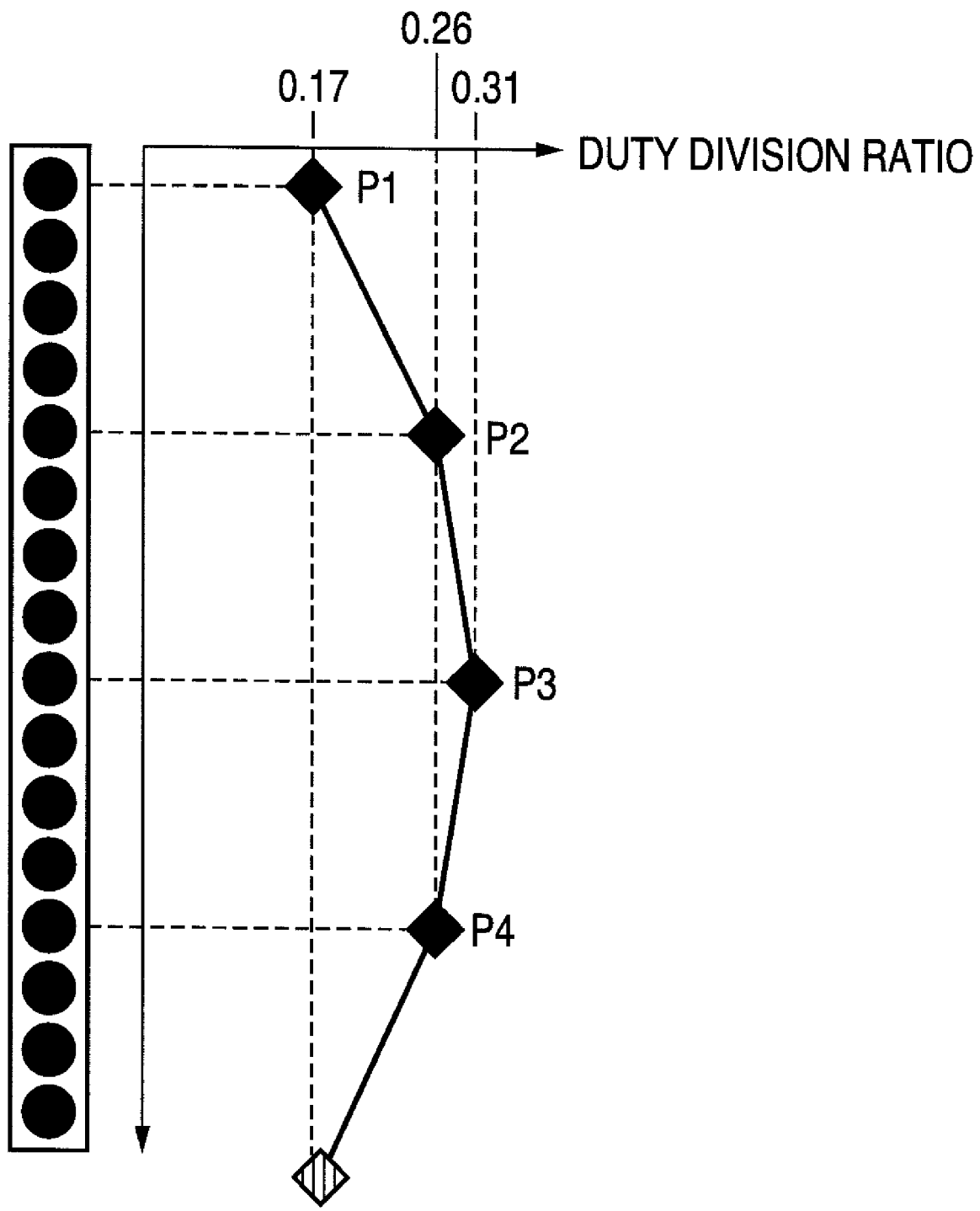
FIG. 6 shows an example of duty division ratios held in a scan duty setting LUT according to the embodiment of the present invention.

According to the scan duty setting LUT 106, values shown in FIG. 6 are given in case of 4-pass printing. FIG. 6 shows an example of 16-nozzle, 4-pass printing. In FIG. 6, the ordinate plots the nozzle position, and the abscissa plots a Duty division ratio. As shown in FIG. 6, inflection points P1 to P4 are set for every four nozzles, and Duty division ratios for 16 nozzles obtained by linearly interpolating the values at these inflection points are held as the scan duty setting LUT 106. Note that numerical values of P1 to P4 are set as follows:

$$P1 + P2 + P3 + P4 = 1.0 \quad (8)$$

Note that the values held as the scan duty setting LUT 106 are not limited to those set by the aforementioned setting method. For example, more inflection points may be set, or values may be directory set for respective nozzles.

Figure 7:
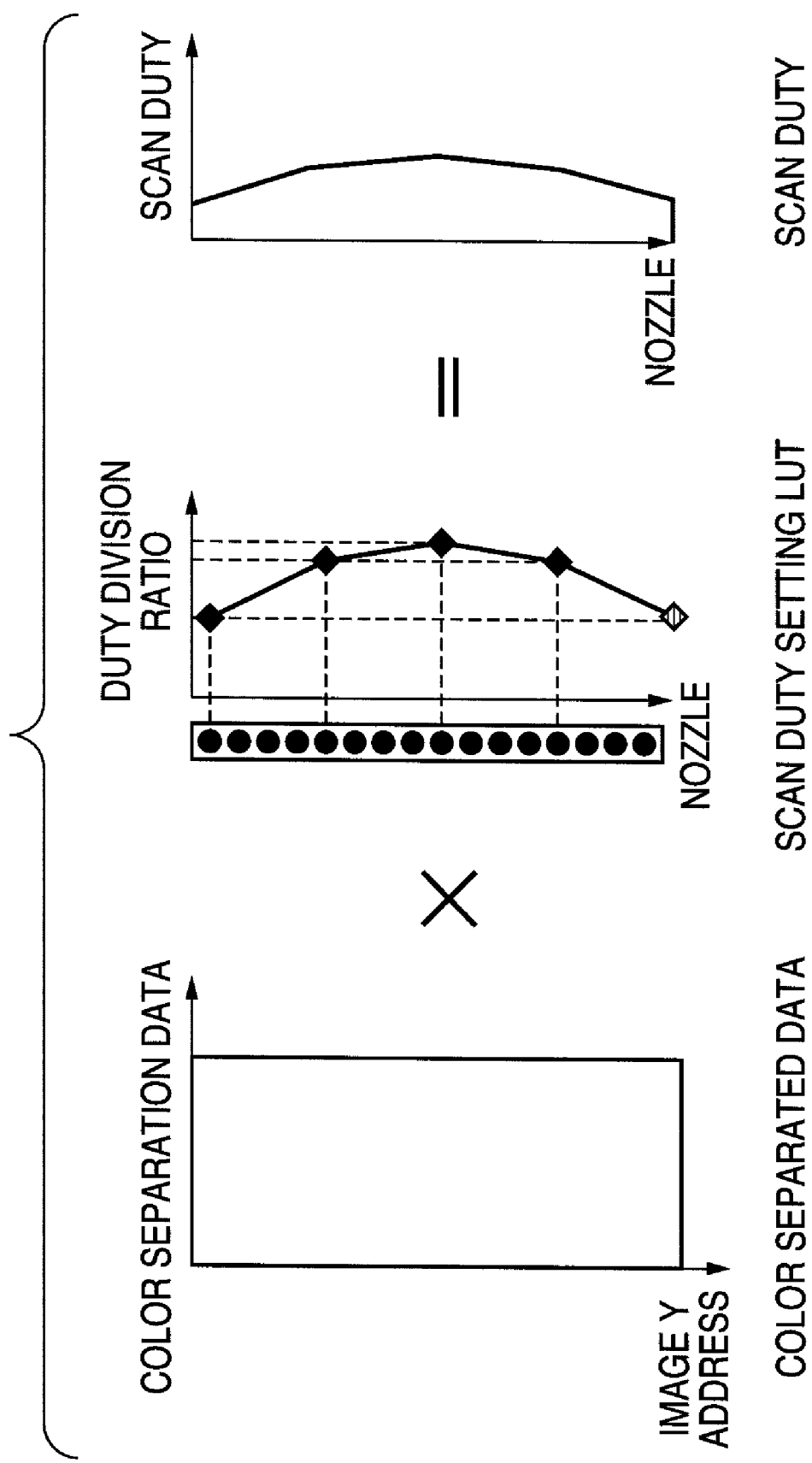
FIG. 7 shows an overview of a scan duty setting method according to the embodiment of the present invention.

The scan duty values to be set in step S104 are set as the products of the scan duty setting LUT 106 and color separation data, as shown in FIG. 7. That is, when data after color separation are multiplied by duty division ratios set for respective nozzles, as shown in the left-hand term of FIG. 7, the products are set as the scan duty values for respective nozzles, as shown in the right-hand term of FIG. 7. In this way, in case of an actual scan, each nozzle ejects ink by an amount corresponding to only the scan duty value with respect to color separation data as a target, thus forming an image.

Figure 8:
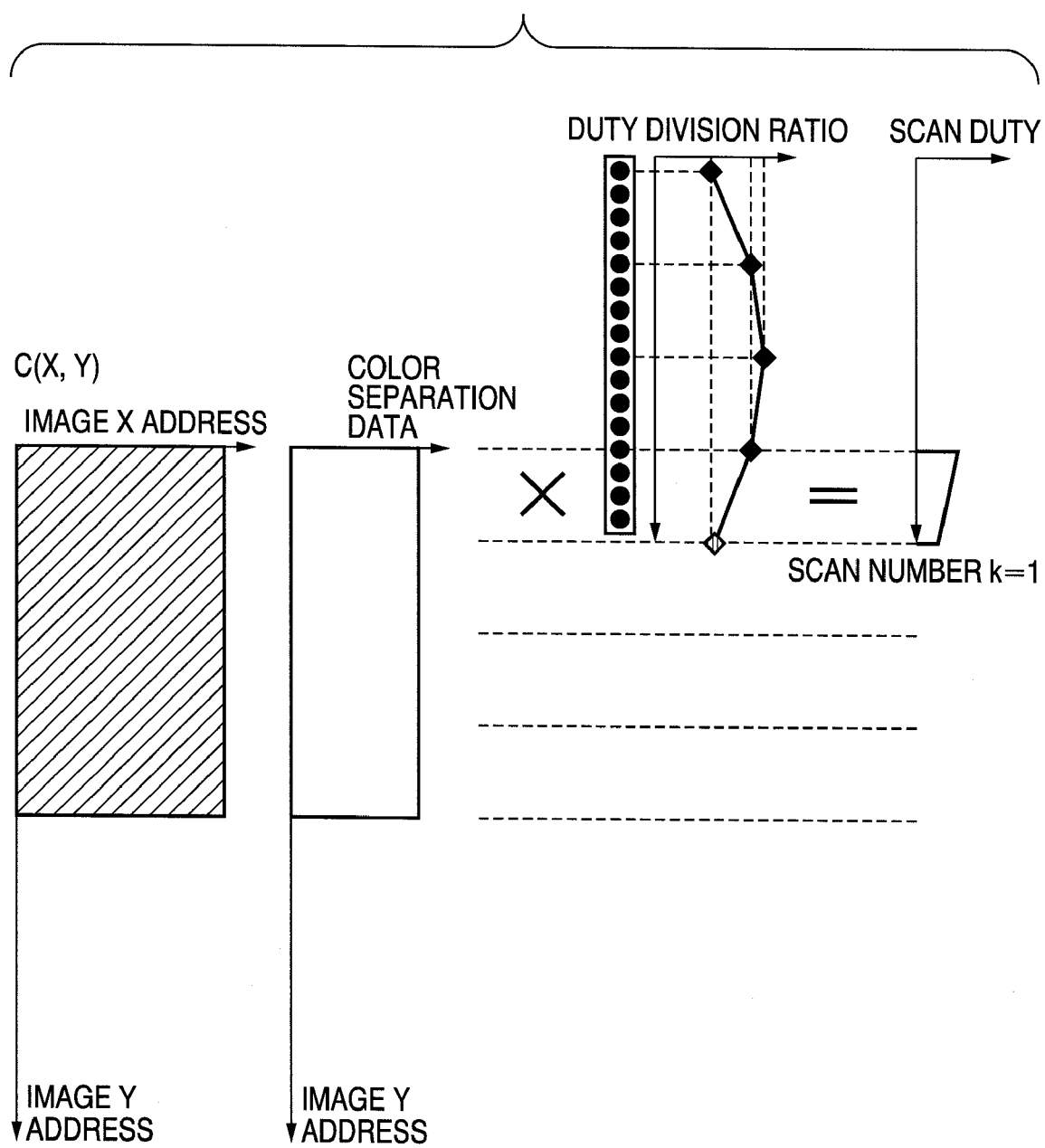
FIG. 8 shows an overview of a scan duty setting method according to the embodiment of the present invention.

In this embodiment, when a corresponding nozzle is located at a coordinate outside the region of image Y addresses, a scan duty value is set to be zero. For example, at the scan number k=1, since ¾ nozzle arrays from the upper end have negative image Y addresses, as shown in FIG. 8, a scan duty value=0 is substituted, and significant values are substituted in ¼ nozzle arrays from the lower end.

Figure 9:
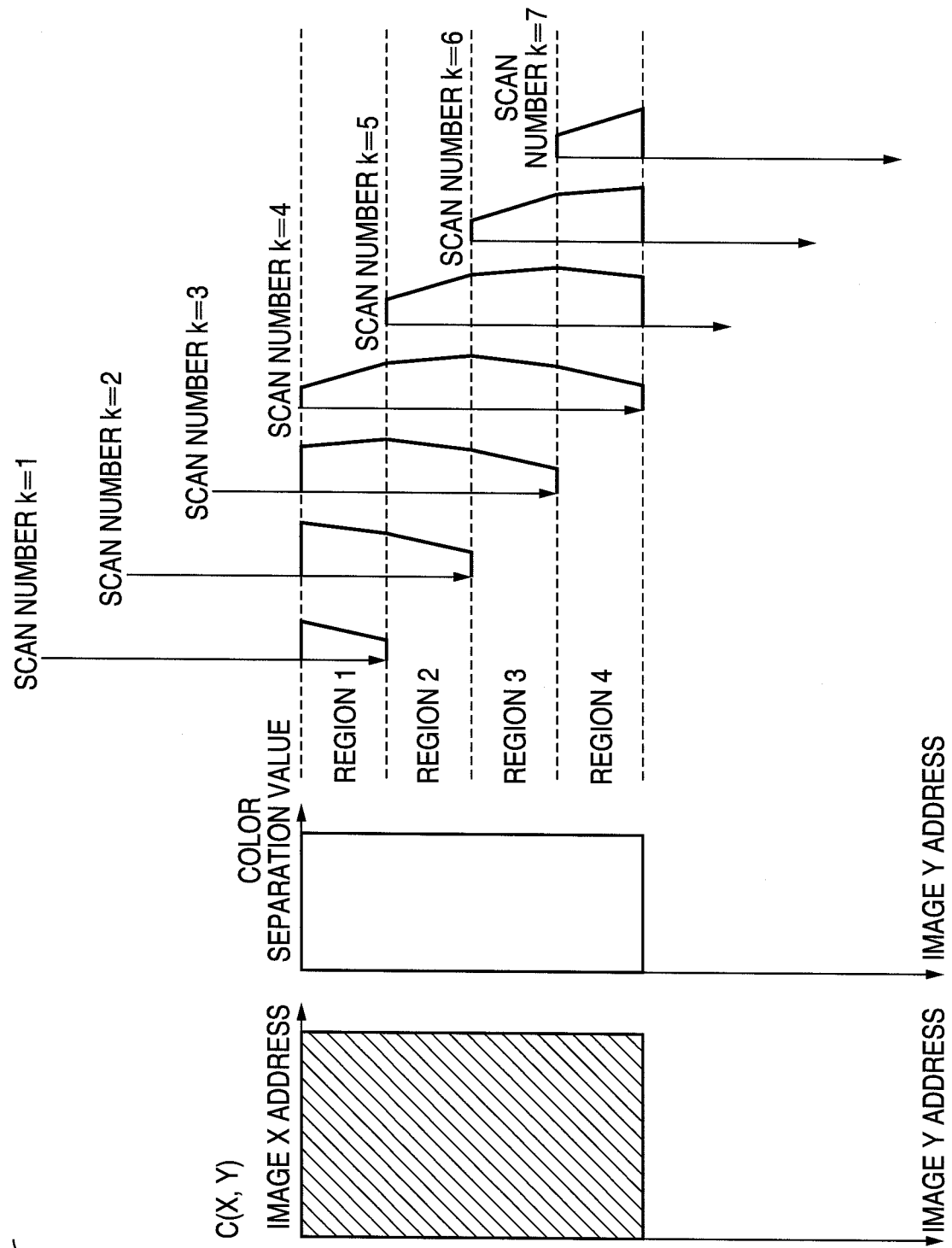
FIG. 9 shows an overview of a scan duty setting method according to the embodiment of the present invention.

Since the color separation data cut position Ycut(k) is determined by the scan number k, in case of scan numbers k=1 to 7, the scan duty values are determined, as shown in FIG. 9. FIG. 9 shows scan duty values corresponding to the nozzle positions for respective scan numbers. As can be seen from FIG. 9, different scan duty values are set for respective scan numbers. Since the respective scan duty values in FIG. 9 are defined by the products of the color separation data and the scan duty setting LUT 106, when the products with the LUT are calculated while feeding a paper sheet, a total value per raster formed by the four scans of the scan numbers k=1 to 4 becomes equal to the color separation data in region 1. Likewise, in each of regions 2, 3, and 4 as well, the total value per raster becomes the same as the color separation data.

In this embodiment, the scan duty values are separated, as shown in FIG. 9. A duty separation threshold D_Th3 is prepared in advance, and is compared with color separation data. If the color separation data value is smaller than D_Th3 (corresponding to formulas (10) to (15) to be described later), image formation is made by one to three scans in place of four scans.

The aforementioned scan duty settings in the scan duty setting unit 105 are described by the following formulas while limiting to, e.g., cyan C(X,Y). Note that C_d(X,Y) represents a scan duty at an address (X,Y), and S_LUT(Y) represents the value of the scan duty setting LUT 106 at an address Y. Also, $0 \leq nx <$ image X size, and $0 \leq ny < Nzzl$ (the number of nozzle arrays: 16 in this case). Furthermore, as duty separation thresholds, D_Th2 and D_Th1 indicating smaller thresholds (D_Th3>D_Th2>D_Th1) are defined in addition to D_Th3 described above.

When C(nx, Ycut(k)+ny)>D_Th3, $$C\_d(nx,ny)=C(nx,Ycut(k)+ny) \times S\_LUT(ny) \qquad (9)$$

When C(nx, Ycut(k)+ny)≤D_Th1,
for "scan numbers k=1, 5, . . . , 4n+1 (n is an integer equal to or larger than 0)", $$C\_d(nx,ny)=C(nx,Ycut(k)+ny) \qquad (10)$$

for "scan numbers other than above numbers", $$C\_d(nx,ny)=0 \qquad (11)$$

When C(nx, Ycut(k)+ny)≤D_Th2,
for "scan numbers k=1, 5, . . . , 4n+1" and
"scan numbers k=2, 6, . . . , 4n+2", $$C\_d(nx,ny)=C(nx,Ycut(k)+ny)/2 \qquad (12)$$

for "scan numbers other than above numbers", $$C\_d(nx,ny)=0 \qquad (13)$$

When C(nx, Ycut(k)+ny) D_Th3,
for "scan numbers k=1, 5, . . . , 4n+1"
"scan numbers k=2, 6, . . . , 4n+2", and
"scan numbers k=3, 7, . . . , 4n+3", $$C\_d(nx,ny)=C(nx,Ycut(k)+ny)/3 \qquad (14)$$

for "scan numbers other than above numbers", $$C\_d(nx,ny)=0 \qquad (15)$$

Formula (9) expresses normal duty separation processing, and formulas (10) to (15) express exceptional duty separation processes. When the color separation data value is smaller than D_Th1, image formation is made by one scan, as described in formulas (10) and (11). When the color separation data value is smaller than D_Th2, image formation is made by two scans, as described in formulas (12) and (13). When the color separation data value is smaller than D_Th3, image formation is made by three scans, as described in formulas (14) and (15).

The same applies to Lc(X,Y), M(X,Y), Lm(X,Y), Y(X,Y), and K(X,Y) to attain separation to the scan duty values using the above formulas.

Since this embodiment has been described taking 4-pass printing as an example, the exceptional duty separation processes are set, as described in formulas (10) to (15). Likewise, in case of 8-pass printing as well, duty separation thresholds D_Th1 to D_Th7 need to be set to execute exceptional duty separation processes.

Figure 10:
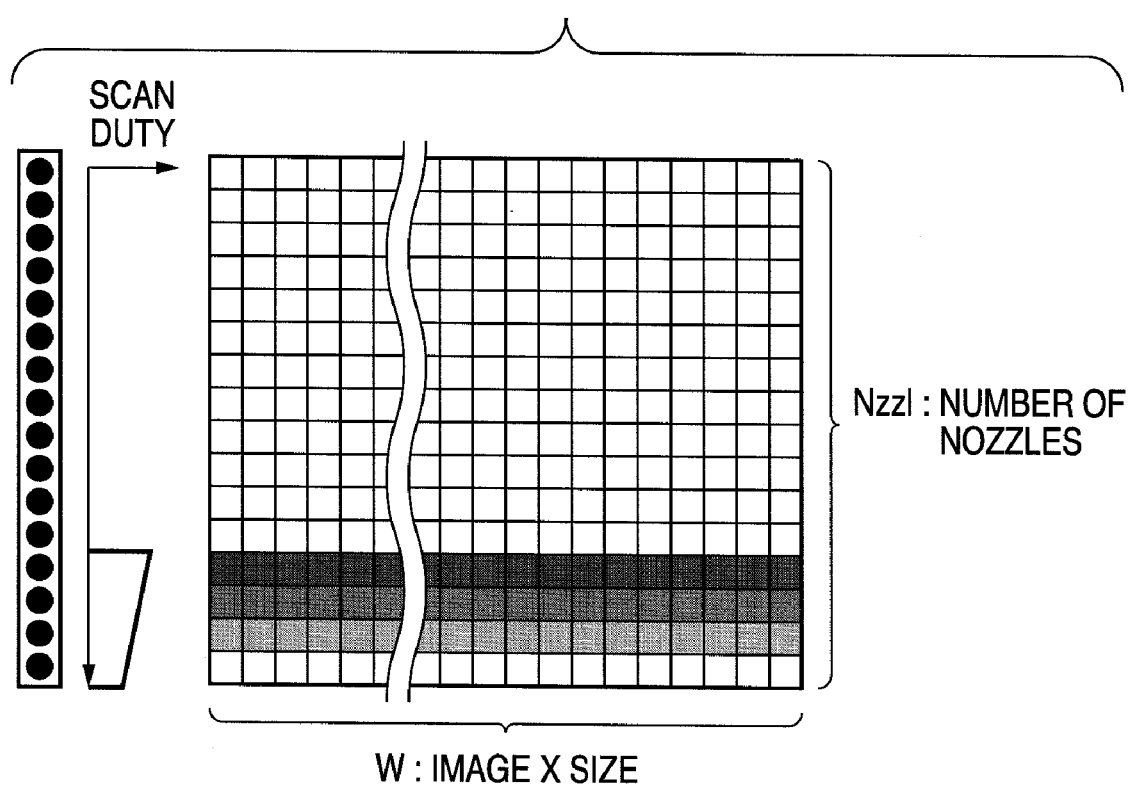
FIG. 10 shows an example of the band configuration of a scan duty buffer according to the embodiment of the present invention.

The scan duty data set by the scan duty setting unit 105 as described above are stored in the scan duty buffer 107 (S105). That is, the scan duty buffer 107 stores, for respective colors, scan duty data values of a band shape, the vertical direction of which corresponds to the number of nozzles and the horizontal direction of which corresponds to the X size of an image, as shown in FIG. 10.

The halftone processor 108 then executes halftone processing for converting the total value of the scan duty data stored in the scan duty buffer 107 and constraining condition information data stored in the constraining condition information buffer 109 into a tone value of two levels (binary data) (S106).

Figure 11:
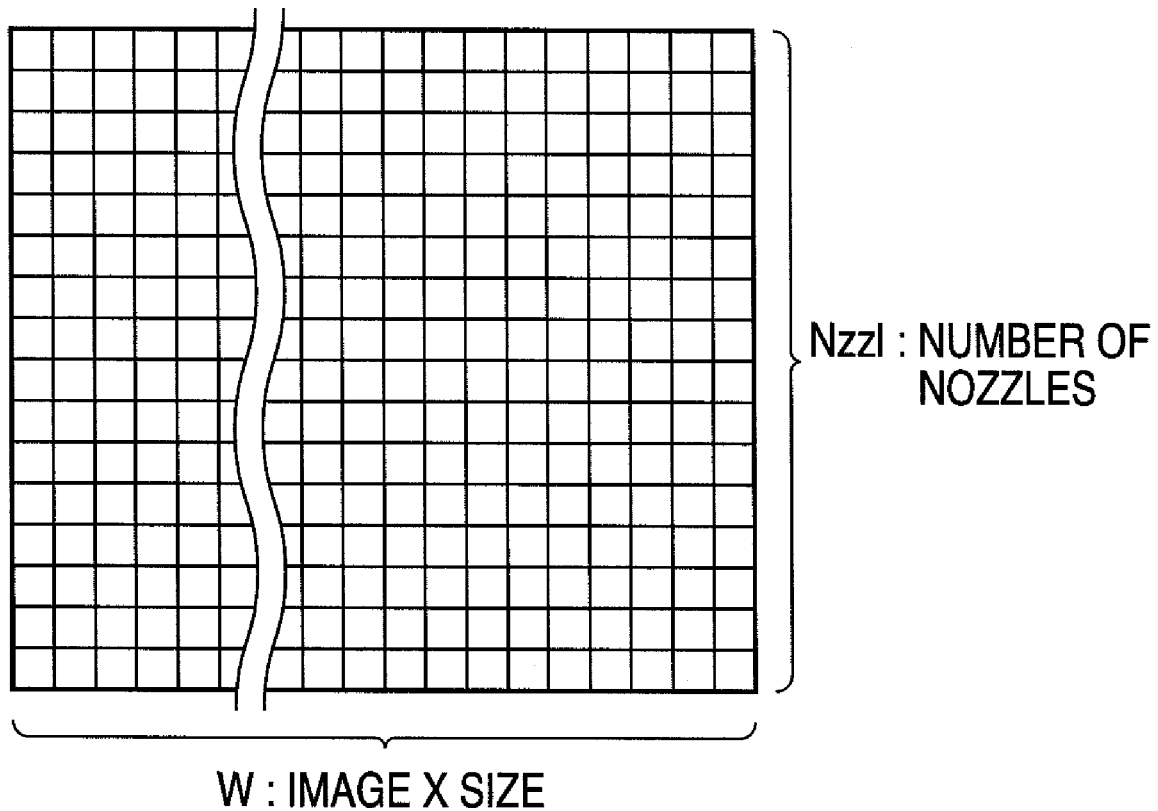
FIG. 11 shows an example of the band configuration of a constraining condition information buffer according to the embodiment of the present invention.

The constraining condition information buffer 109 also stores, for respective colors, constraining condition information data values of a band shape, the vertical direction of which corresponds to the number of nozzles and the horizontal direction of which corresponds to the X size of an image, as shown in FIG. 11. The constraining condition information buffer 109 stores constraining condition information indicating whether or not a binary image is easily formed at an address on an image to be printed, and is updated for each scan number k. At the beginning of processing of the scan number k=1, all zeros are substituted as an initial value. That is, let C_r(X,Y), Lc_r(X,Y), M_r(X,Y), Lm_r(X,Y), Y_r(X,Y), and K_r(X,Y) be respective pieces of constraining condition information for respective colors at an address (X,Y). Then, when the scan number k=1, these pieces of information are described as follows. Note that $0 \leq nx \leq$ image X size and $0 \leq ny < Nzzl$ (the number of nozzle arrays: 16 in this case).

$$C\_r(nx,ny)=0 \qquad (16)$$

$$Lc\_r(nx,ny)=0 \qquad (17)$$

$$M\_r(nx,ny)=0 \qquad (18)$$

$$Lm\_r(nx,ny)=0 \qquad (19)$$

$$Y\_r(nx,ny)=0 \qquad (20)$$

$$K\_r(nx,ny)=0 \qquad (21)$$

For this reason, actually, when the scan number k≧2, the contents of the constraining condition information buffer 109 are updated by significant constraining condition information. As the constraining condition information value is smaller, a dot is harder to be formed at that position; as the value is larger, a dot is easier to be formed. Note that respective values are stored in the constraining condition information buffer 109 independently of the timing of any scan number, so that the average value of the stored values becomes zero. More specifically, a positive value is stored when a dot is easy to be formed at that position, and a negative value is stored when a dot is hard to be formed at that position. Details of updating of the constraining condition information will be described later.

Figure 12:
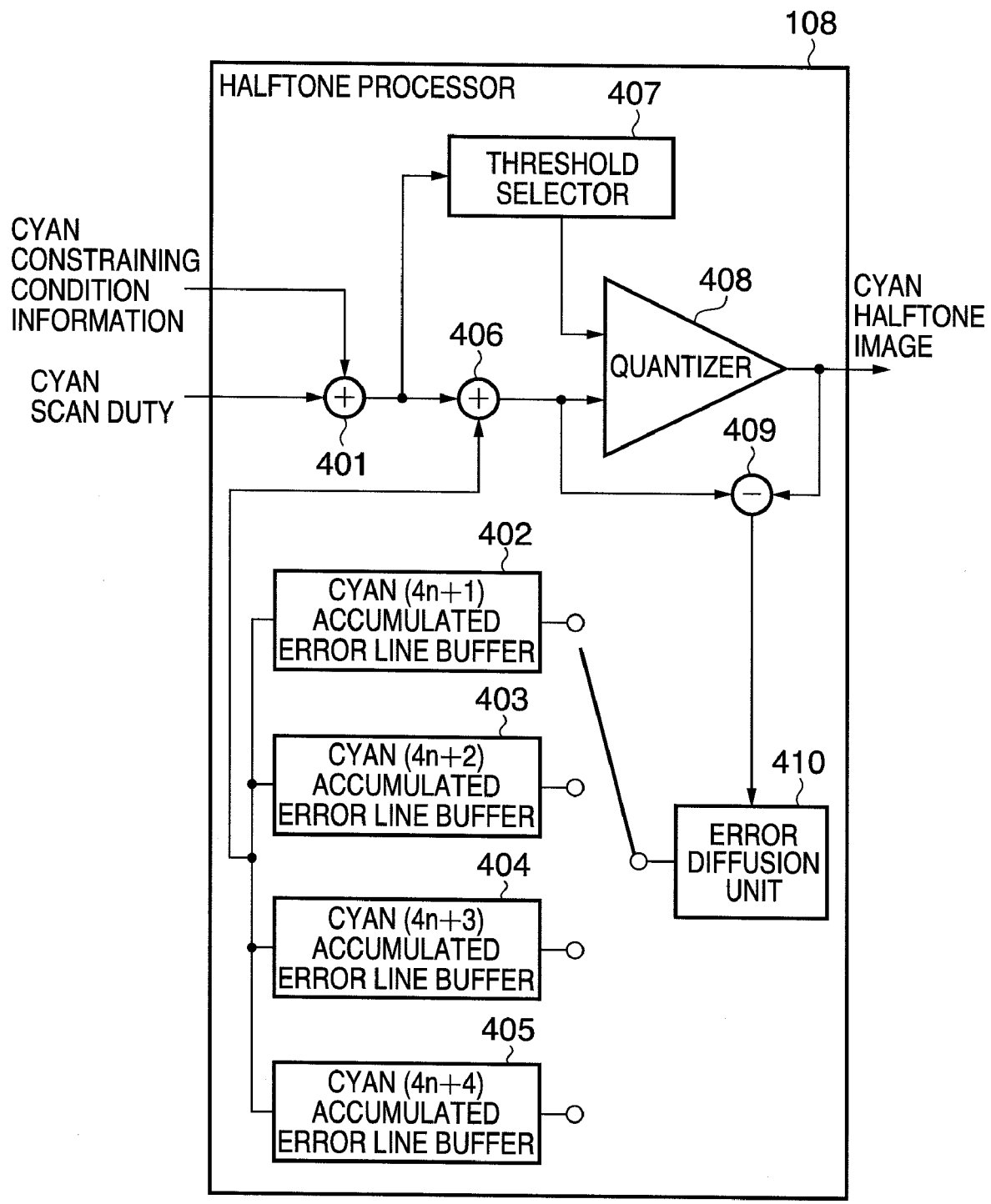
FIG. 12 is a block diagram showing the detailed arrangement of a halftone processor according to the embodiment of the present invention.

The halftone processing of this embodiment uses a known error diffusion method as the processing for converting multivalued input image data into a binary image (or an image having the number of tones equal to or larger than a binary value and smaller than the number of input tones). The halftone processing of this embodiment will be described in detail below with reference to the block diagram of FIG. 12, and the flowchart of FIG. 13. For the sake of simplicity, halftone processing of cyan in case of 4-pass printing and the scan number k=1 will be exemplified. FIG. 12 is a block diagram showing the detailed arrangement of the halftone processor 108, and FIG. 13 is a flowchart showing details of the halftone processing in the halftone processor 108.

Figure 13:
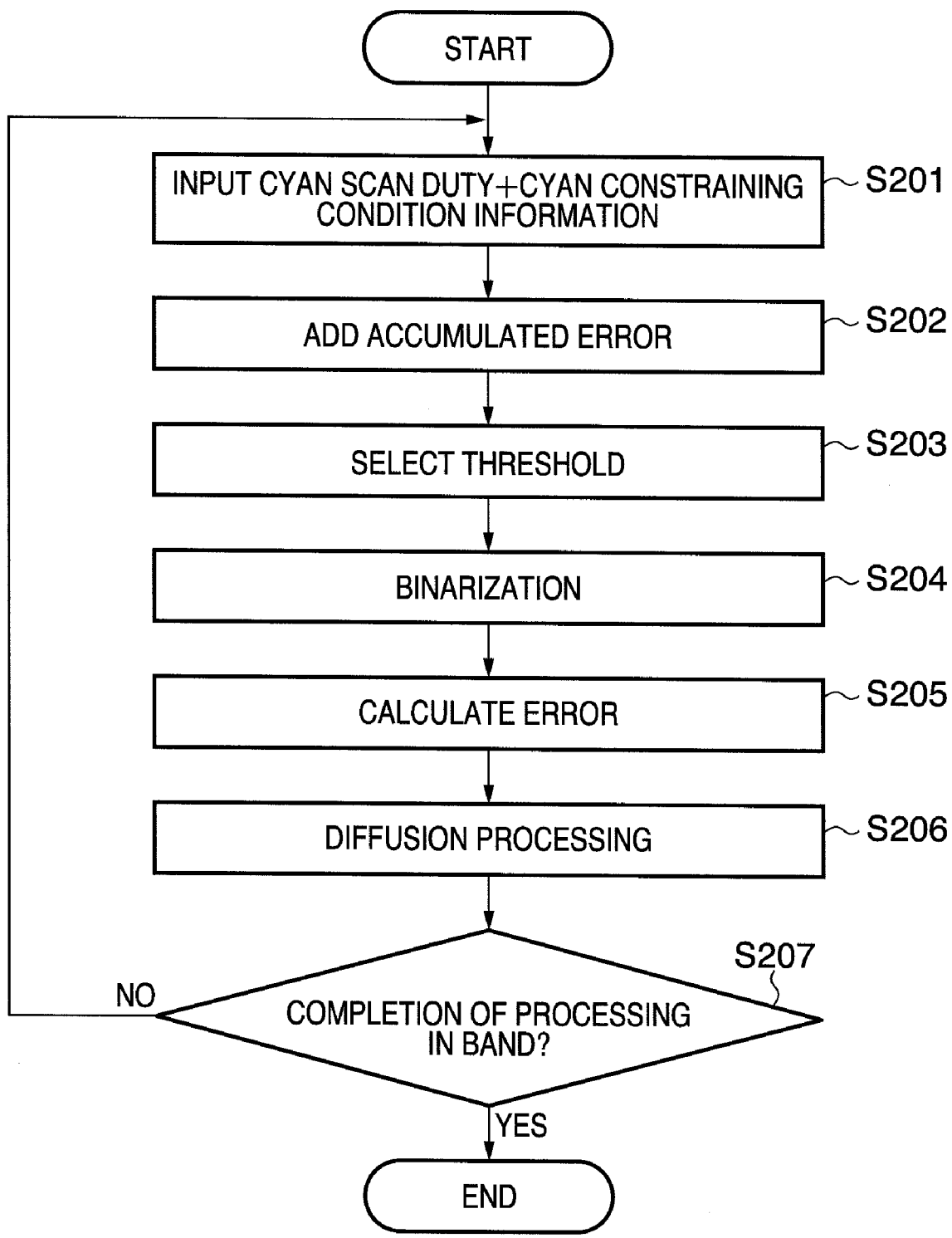
FIG. 13 is a flowchart showing halftone processing according to the embodiment of the present invention.

In step S201 shown in FIG. 13, a total of the scan duty data and constraining condition information of cyan is input. That is, a constraining condition information adder 401 shown in FIG. 12 calculates total value data Ic of cyan scan duty C_d and cyan constraining condition information C_r by:

$$Ic = C\_d + C\_r \quad (22)$$

Note that the constraining condition information C_r includes all zeros when the scan number k=1.

In step S202, an accumulated error is added for error diffusion processing. The addition processing of an accumulated error will be described in detail below.

Figure 14:
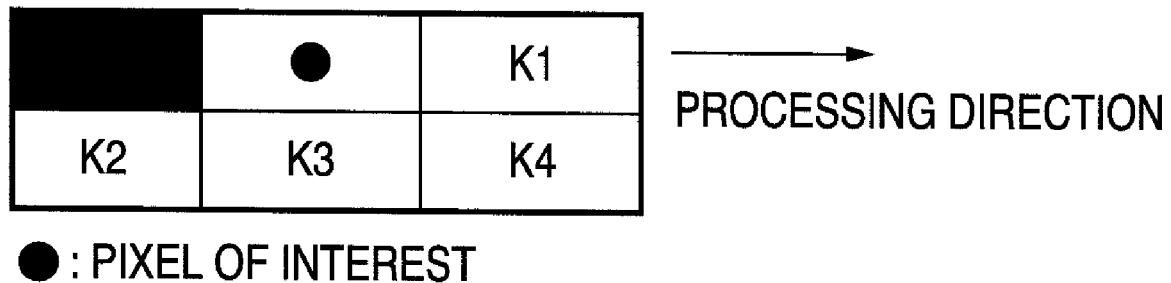
FIG. 14 shows an example of error diffusion coefficients according to the embodiment of the present invention.

In this embodiment, assume that four coefficients K1 to K4 are set as error diffusion coefficients for the error diffusion processing, as shown in FIG. 14. For example, K1=7/16, K2=3/16, K3=5/16, and K4=1/16. However, the diffusion coefficients need not be fixed, as described above, but they may be changed according to tones (e.g., according to C_d) or more coefficients may be set in place of the four coefficients.

In order to diffuse and accumulate an error using these error diffusion coefficients, the halftone processor 108 assures four accumulated error line buffers 402 to 405 for cyan, and switches the accumulated error line buffer to be used for each scan number as follows:

"When the scan numbers k=1, 5, . . . , 4n+1 (n is an integer equal to or larger than 0)",
use cyan (4n+1) accumulated error line buffer 402
"When the scan numbers k=2, 6, . . . , 4n+2",
use cyan (4n+2) accumulated error line buffer 403
"When the scan numbers k=3, 7, . . . , 4n+3",
use cyan (4n+3) accumulated error line buffer 404
"When the scan numbers k=4, 8, . . . , 4n+4",
use cyan (4n+4) accumulated error line buffer 405

Figure 15:
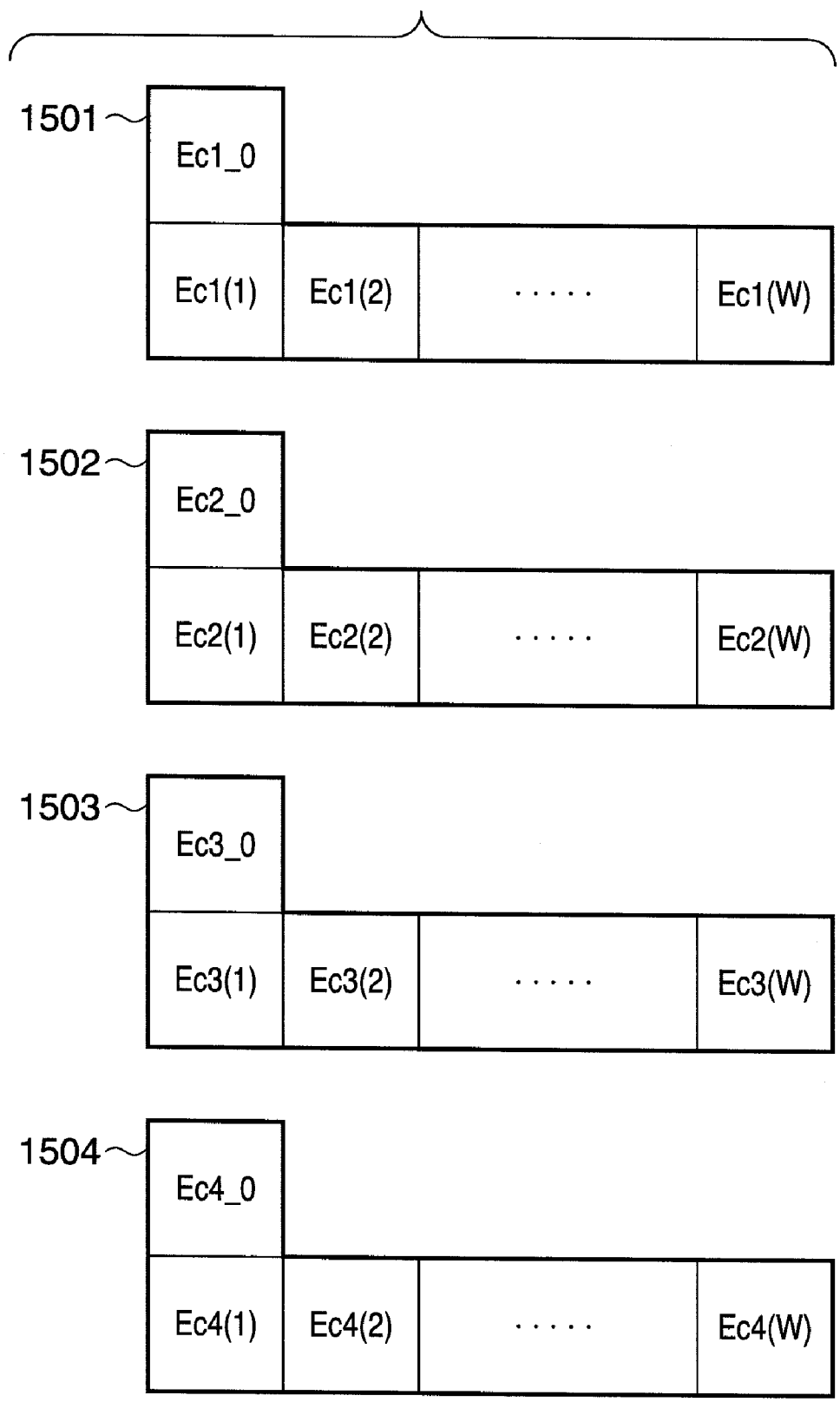
FIG. 15 shows the storage areas of respective cyan accumulated error line buffers according to the embodiment of the present invention.

Note that the cyan accumulated error line buffers 402, 403, 404, and 405 respectively include four sets of storage areas 1501 to 1504 in FIG. 15, i.e., four sets "Ec1_0, Ec1(x)", "Ec2_0, Ec2(x)", "Ec3_0, Ec3(x)", and "Ec4_0, Ec4(x)". For example, the cyan (4n+1) accumulated error line buffer 402 has one storage area Ec1_0 and storage areas Ec1(x) (x=1 to W) as many as the number W of horizontal pixels of the input image. The cyan accumulated error line buffers 402, 403, 404, and 405 are initialized by an initial value "all zeros" only at the beginning of processing of the scan numbers k=1, 2, 3, and 4, respectively. For example, at the beginning of processing of the scan number k=5, the (4n+1) accumulated error line buffer 402 is not initialized.

In this embodiment, since the aforementioned four accumulated error line buffers are required per color, these buffers need to be prepared for six colors. That is, a total of 24 (=4×6) line buffers are required.

In this case, assume that the error diffusion processing is executed using the cyan (4n+1) accumulated error line buffer 402 so as to exemplify the halftone processing for the scan number k=1.

That is, an accumulated error adder 406 adds an error Ec1(x) corresponding to a horizontal pixel position x of input pixel data to the input data value as the total of the scan duty and constraining condition information. That is, let Ic be input data of interest, and Ic' be data after addition of an accumulated error. Then, we have:

$$Ic' = Ic + Ec1(x) \quad (23)$$

In step S203, a threshold selector 407 selects a threshold T. The threshold T is set, for example, by:

$$T = 128 \quad (24)$$

Alternatively, in order to avoid any dot generation delay, the threshold T may be finely changed according to C_d to reduce an average quantization error, as given by:

$$T = f(C\_d) \quad (25)$$

In step S204, a quantizer 408 compares the pixel data Ic' after error addition with the threshold T to determine Out_c as a binarization result of the dot. This rule is as follows.

When Ic'<T, $$Out\_c = 0 \quad (26)$$

When Ic'≧T, $$Out\_c = 255 \quad (27)$$

In step S205, an error calculation unit 409 calculates a difference Err_c between the pixel data Ic' obtained by adding an error to the pixel IC of interest, and the output pixel value Out_c by:

$$Err\_c(x) = Ic' - Out\_c \quad (28)$$

In step S206, an error diffusion unit 410 diffuses an error. That is, the unit 410 executes diffusion processing of the error Err_c(x) according to the horizontal pixel position x using the cyan (4n+1) accumulated error line buffer 402 as follows:

$$Ec1(x+1) \leftarrow Ec1(x+1) + Err\_c(x) \times 7/16 \, (x<W)$$

$$Ec1(x-1) \leftarrow Ec1(x-1) + Err\_c(x) \times 3/16 \, (x>1)$$

$$Ec1(x) \leftarrow Ec1\_0 + Err\_c(x) \times 5/16 \, (1<x<W)$$

$$Ec1(x) \leftarrow Ec1\_0 + Err\_c(x) \times 8/16 \, (x=1)$$

$$Ec1(x) \leftarrow Ec1\_0 + Err\_c(x) \times 13/16 \, (x=W)$$

$$Ec1\_0 \leftarrow Err\_c(x) \times 1/16 \, (x<W)$$

$$Ec1\_0 \leftarrow 0 \, (x=W) \quad (29)$$

In this way, binarization (quantization value 0, 255) for one cyan pixel of the scan number k=1 is complete.

By repeating the aforementioned processes in steps S201 to S206 for addresses (0, 0) to (W−1, Nzzl−1) in the band (S207), the dot positions of halftone image data, i.e., ON/OFF of dots can be determined.

Figure 16:
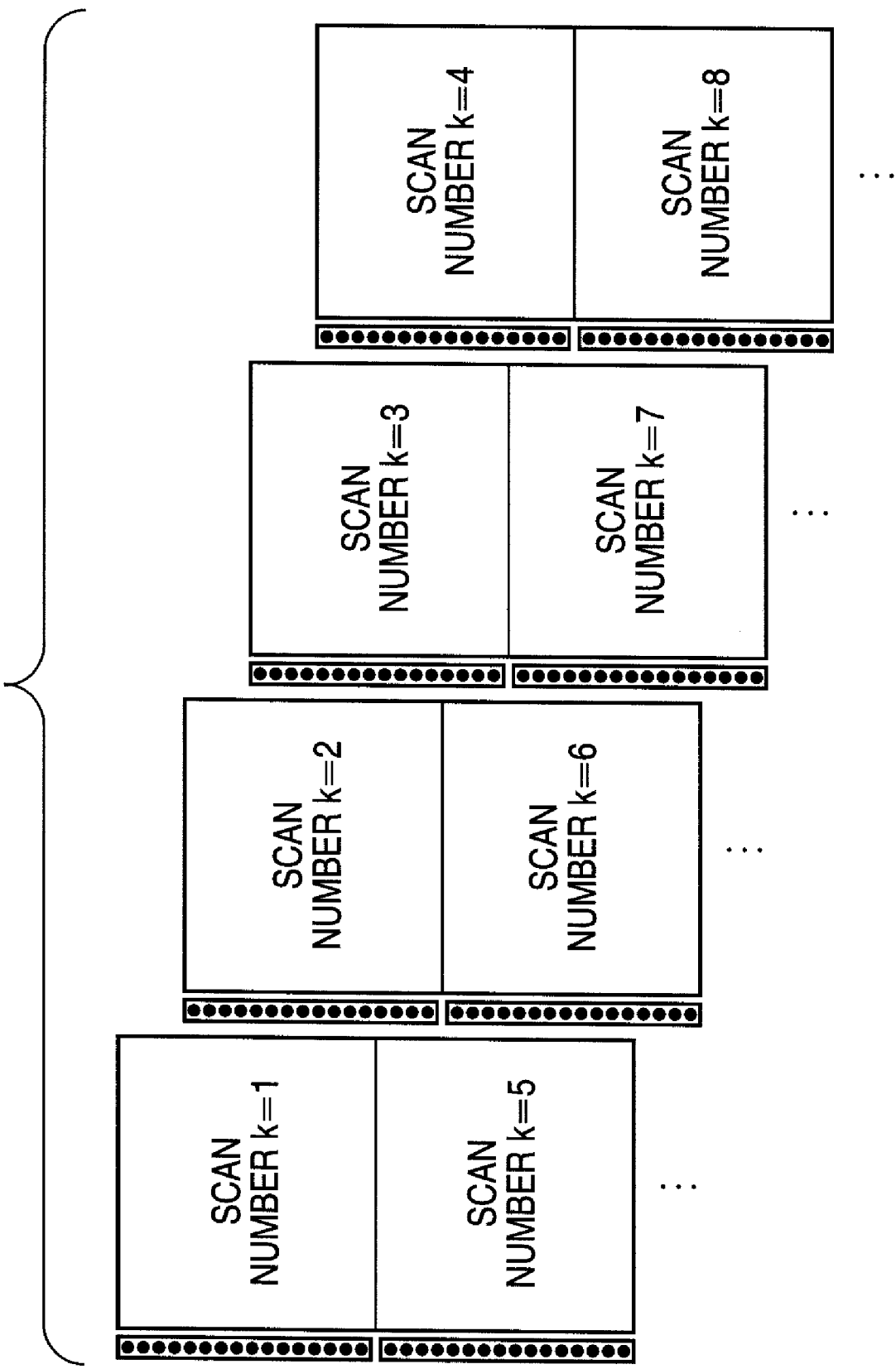
FIG. 16 shows a state of neighboring print regions according to the embodiment of the present invention.

Note that the processing for the scan number k=1 has been described above. For the scan numbers k=2 to 4, the halftone processing is executed using the cyan accumulated error line buffers 403 to 405, respectively. The processing for the scan number k=5 uses the same cyan (4n+1) accumulated error line buffer 402 as that for the scan number k=1 intact without initializing (substituting all zeros in) that buffer. This is because the preserved accumulated errors are applied intact to the lower neighboring region since the print regions of the scan numbers k=1 and 5 neighbor vertically, as shown in FIG. 16. If the cyan accumulated error line buffer 402 is initialized at k=5, errors are not preserved at the boundary that neighbors k=1, and dot continuity cannot be maintained.

Figure 17:
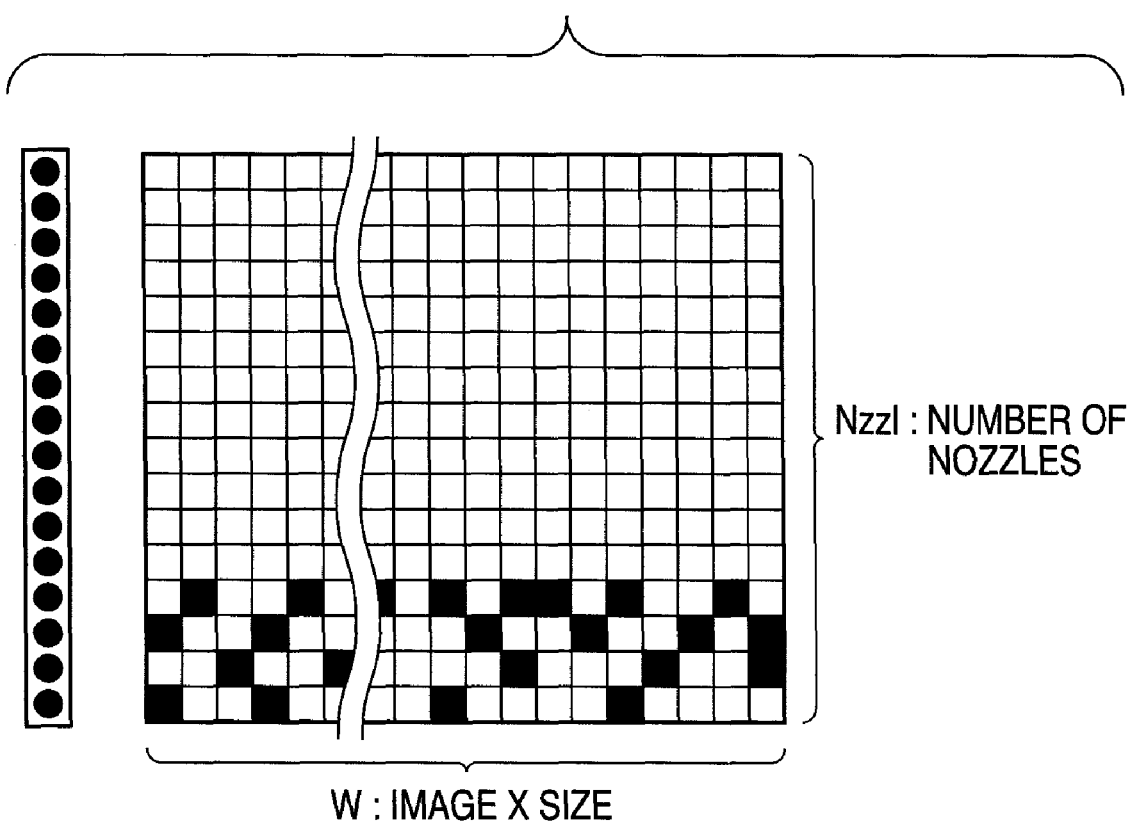
FIG. 17 shows a storage example of the halftone processing result according to the embodiment of the present invention.

Referring back to FIG. 3, upon completion of the halftone processing in step S106 as described above, the binary image data after the halftone processing is stored in the halftone image storage buffer 110 (S107). FIG. 17 shows the storage state of the halftone processing result of the scan duty values of the scan number k=1 in the halftone image storage buffer 110. As shown in FIG. 17, the halftone image storage buffer 110 stores binary image data for (the number of nozzles: Nzzl)×(image X size: W) corresponding to the pixel positions of the scan duty values.

With the above processing, the halftone processing for the scan number k=1 is complete. As a result, a binary image to be formed by a single head operation for each color is stored in the halftone image storage buffer 110 for each color.

Band data, which is stored in each halftone image storage buffer 110, and the vertical direction of which corresponds to the number of nozzles (Nzzl) and the horizontal direction of which corresponds to the X size (W) of the image, is output from the image output terminal 112 (S108).

Figure 18:
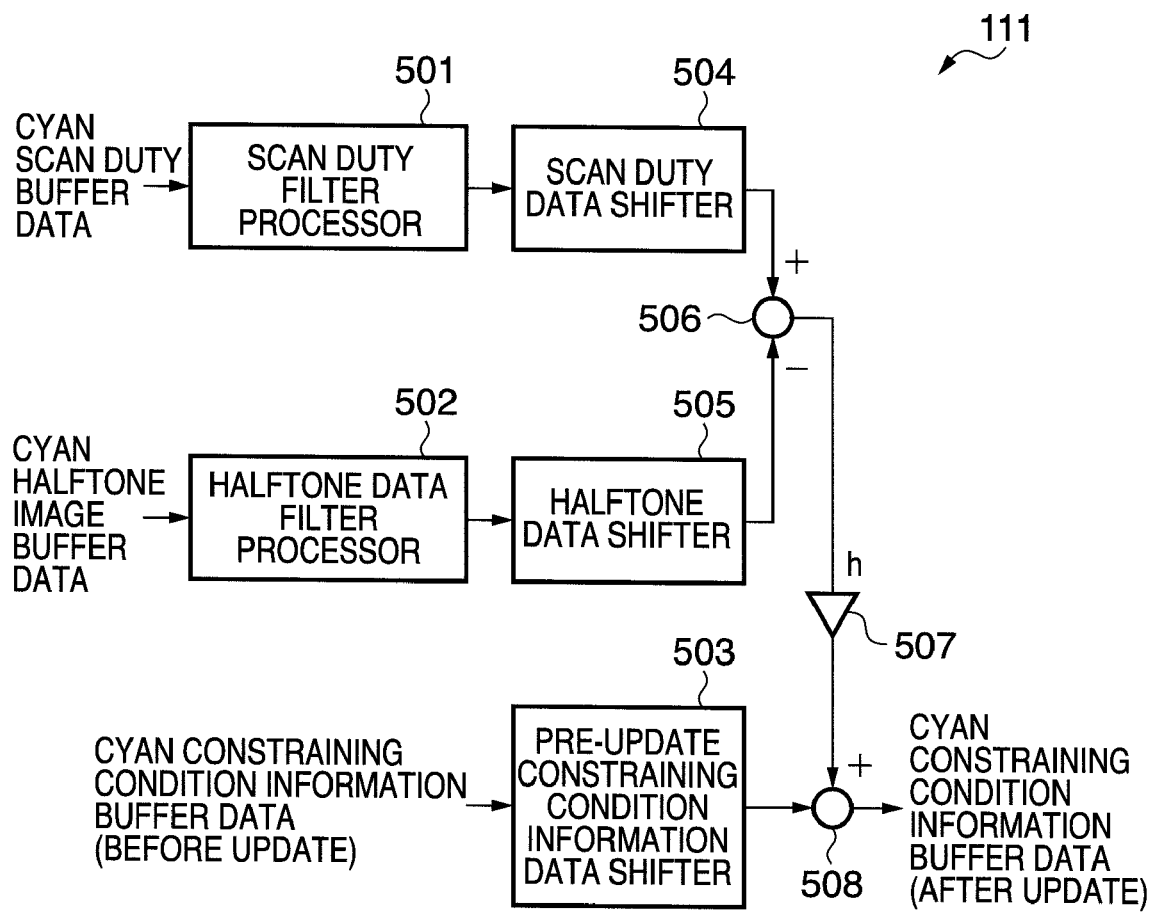
FIG. 18 is a block diagram showing the detailed arrangement of a constraining condition information calculation unit according to the embodiment of the present invention.

Then, the constraining condition information calculation unit 111 calculates constraining condition information (S109). The constraining condition information calculation processing of this embodiment will be described in detail below with reference to the block diagram of FIG. 18 and the flowchart of FIG. 19. For the sake of simplicity, calculations of cyan constraining condition information for 4-pass printing and the scan number k=1 will be exemplified below. FIG. 18 is a block diagram showing the detailed arrangement of the constraining condition information calculation unit 111, and FIG. 19 is a flowchart showing the constraining condition information calculation processing in the constraining condition information calculation unit 111.

As described above, the constraining condition information of this embodiment is information which is referred to upon determining the dot allocations of a halftone image for the scan number k=2 next to the current scan number k=1, and indicates whether or not a dot is easily formed.

Figure 19:
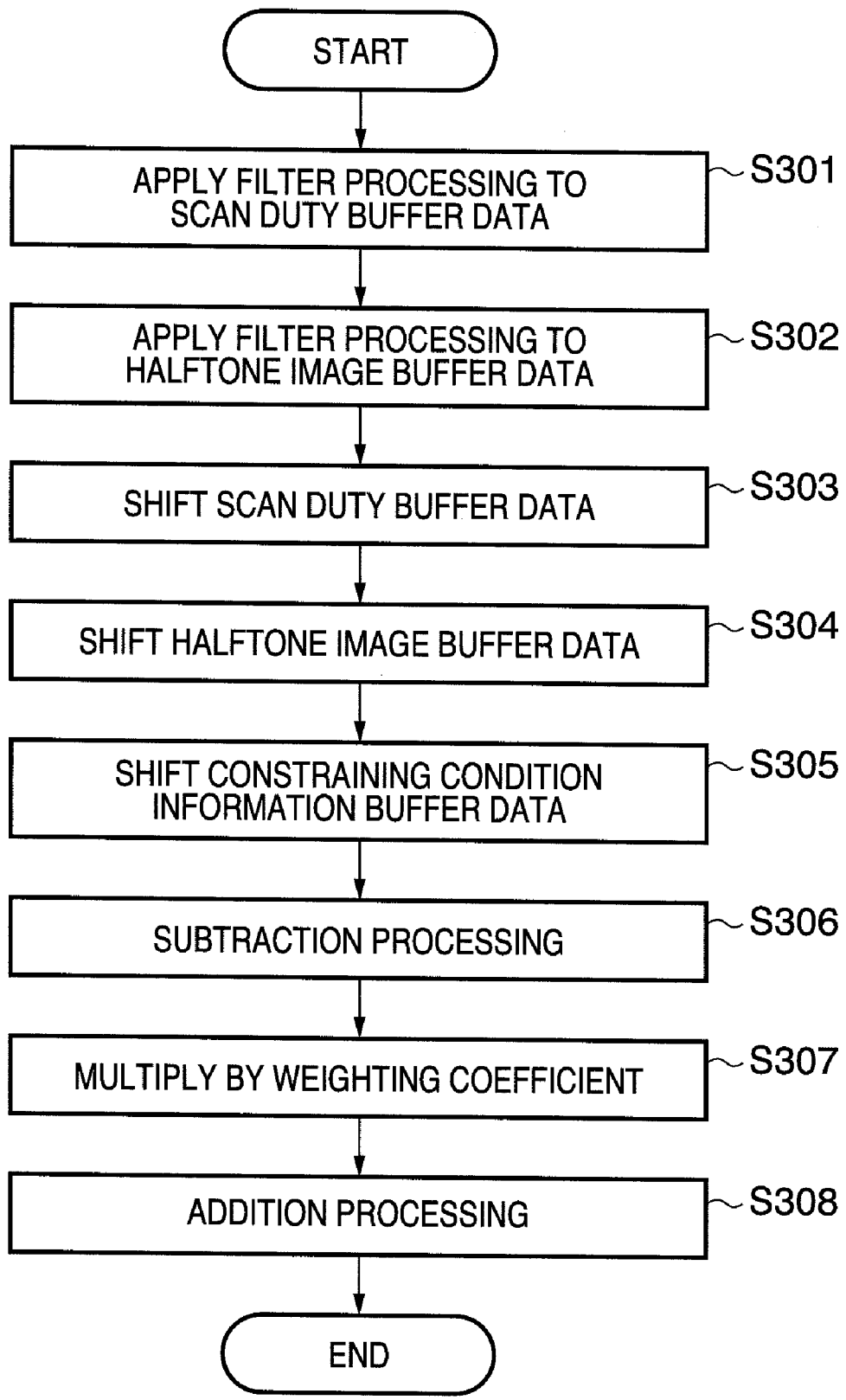
FIG. 19 is a flowchart showing constraining condition information calculation processing according to the embodiment of the present invention.
Figure 20:
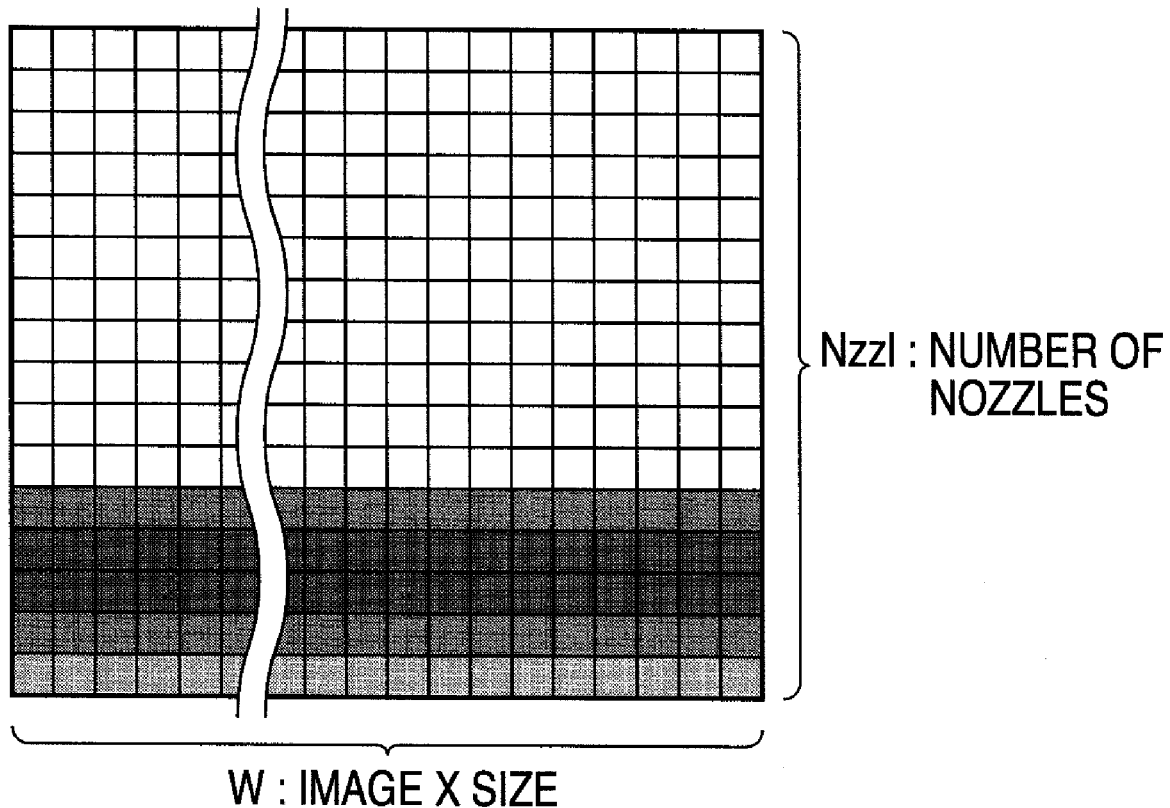
FIG. 20 shows scan duty data after filter processing in the constraining condition information calculation processing according to the embodiment of the present invention.

In step S301 shown in FIG. 19, filter processing is applied to data in the scan duty buffer 107. That is, a scan duty filter processor 501 shown in FIG. 18 applies, to C_d as the cyan scan duty in the scan duty buffer 107, filter processing using a predetermined filter F_m by:

$$C\_df = C\_d * F\_m \quad (30)$$

where * is a convolution operation to calculate C_df. FIG. 20 shows scan duty data that has undergone the filter processing.

Note that the filter F_m of this embodiment will be described as an isotropic weighted average filter 2401 in FIG. 24, which has a filter size of a 3×3 square and in which coefficients are set in a nearly concentric circler pattern. However, the present invention is not limited to such specific filter. For example, the filter size may be a 5×5, 7×7, or 9×9 square, or a 3×5, 5×7, or 5×9 rectangle, and an anisotropic filter in which filter coefficients are set in an elliptic pattern. Also, the present invention is not limited to low-pass characteristics, and a filter with band-pass or high-pass characteristics may be used.

Figure 21:
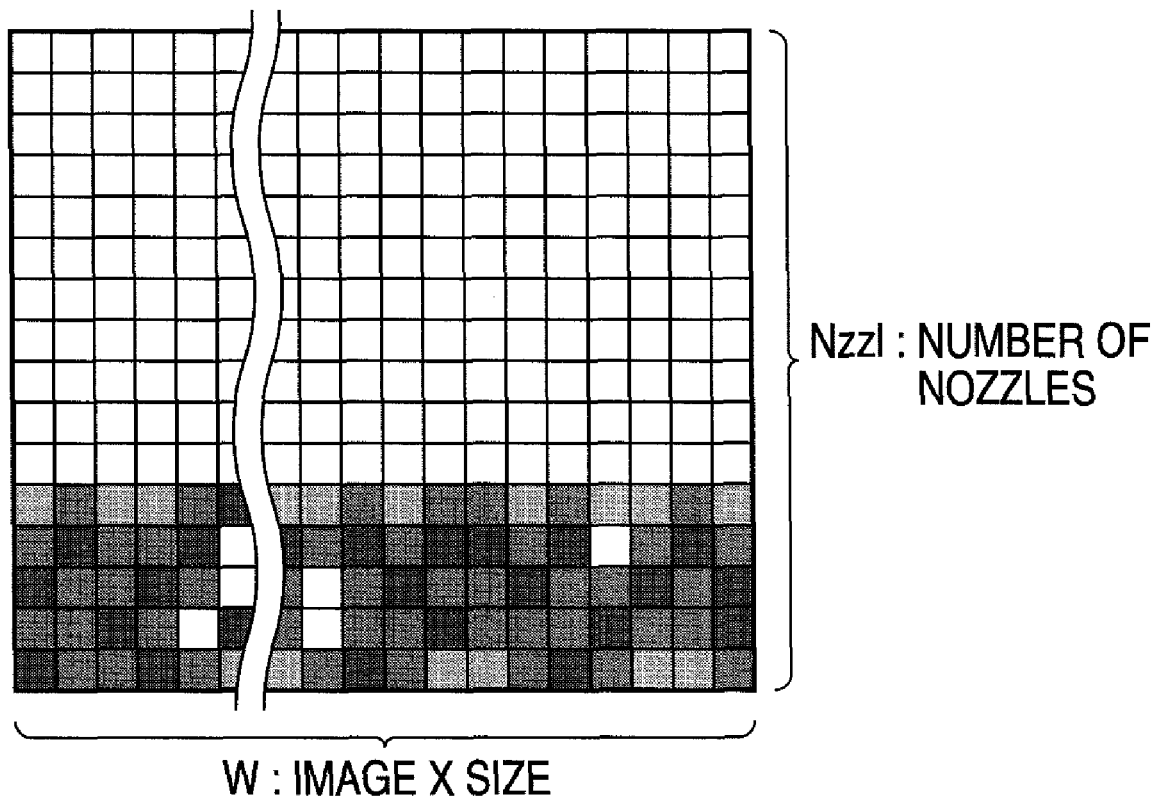
FIG. 21 shows halftone data after the filter processing in the constraining condition information calculation processing according to the embodiment of the present invention.

In step S302, a halftone data filter processor 502 applies, to Out_c, filter processing using a predetermined low-pass filter LPF_b by:

$$Out\_c\_LPF = Out\_c * LPF\_b \quad (31)$$

to calculate Out_c_LPF. FIG. 21 shows halftone data that has undergone the filter processing.

Figure 24:
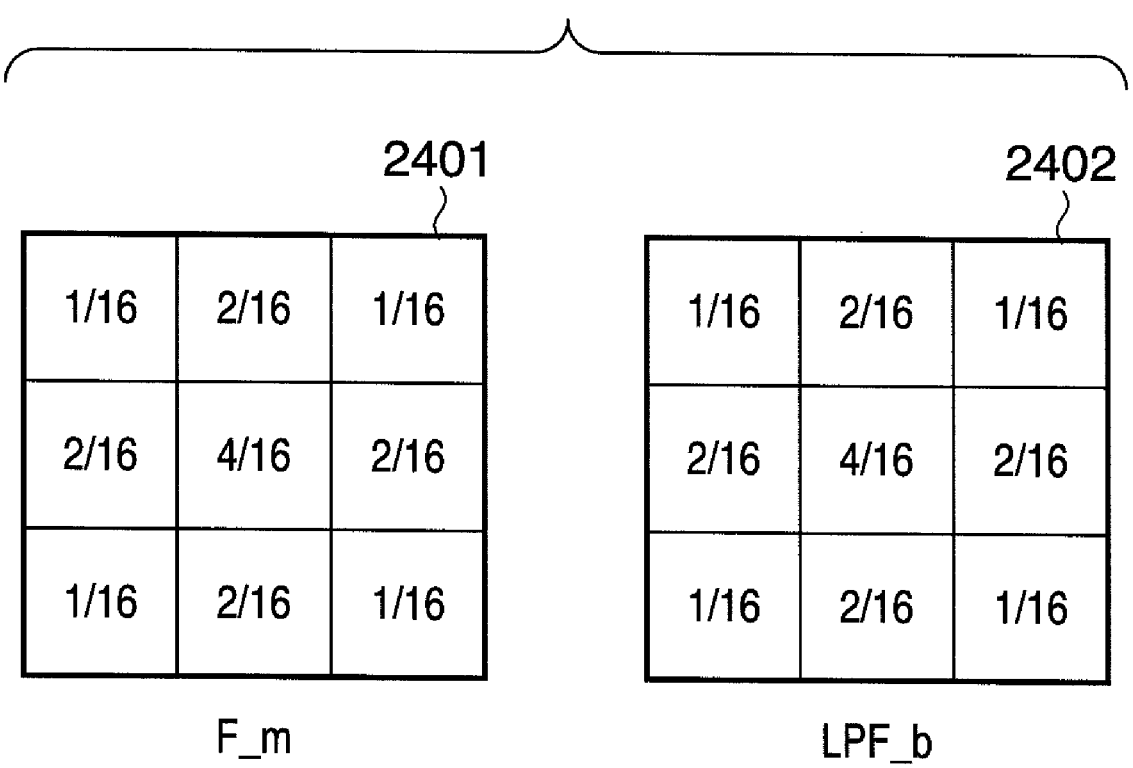
FIG. 24 shows practical examples of filters in the constraining condition information calculation processing according to the embodiment of the present invention.

The coefficients of LPF_b of this embodiment will also be described as an isotropic weighted average filter 2402 in FIG. 24, which has a filter size of a 3×3 square and in which coefficients are set in a nearly concentric circler pattern, as in F_m. However, the present invention is not limited to such specific filter. However, LPF_b preferably has low-pass characteristics. In this embodiment, F_m and LPF_b use the same filter coefficients, but they may use different coefficients, as a matter of course.

Figure 22:
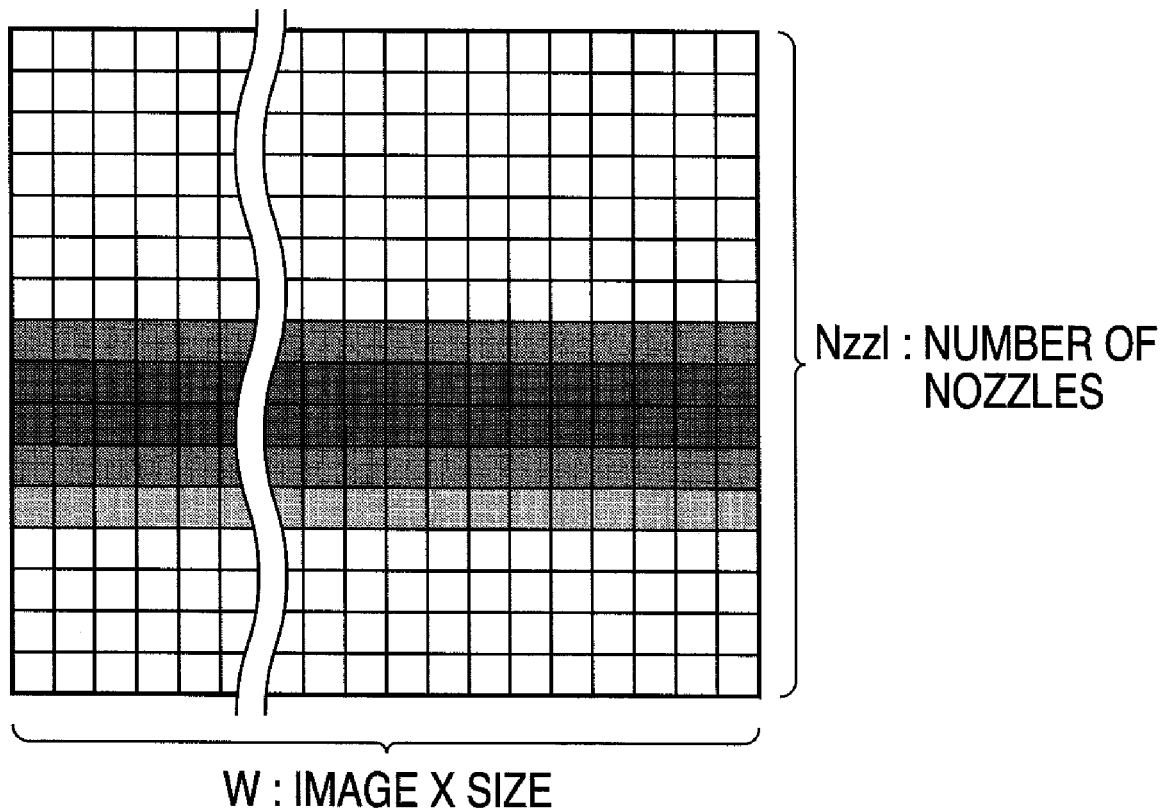
FIG. 22 shows scan duty data after shift processing in the constraining condition information calculation processing according to the embodiment of the present invention.

In step S303, a scan duty data shifter 504 shifts the data C_df output from the scan duty filter processor 501 upward by one paper feed amount LF=Nzzl/Pass=16/4=4. FIG. 22 shows shifted scan duty data. Shifted scan duty data C'_df is calculated by:

$$C'\_df(nx, ny) = C\_df(nx, ny+LF) \quad (32)$$

for 0≦nx<image X size and 0≦ny<Nzzl

In equation (32), when ny+LF≧Nzzl, C'_df(nx, ny)=0. That is, zero is substituted in lower end LF nozzles (four nozzles in this case) after the shift processing.

Figure 23:
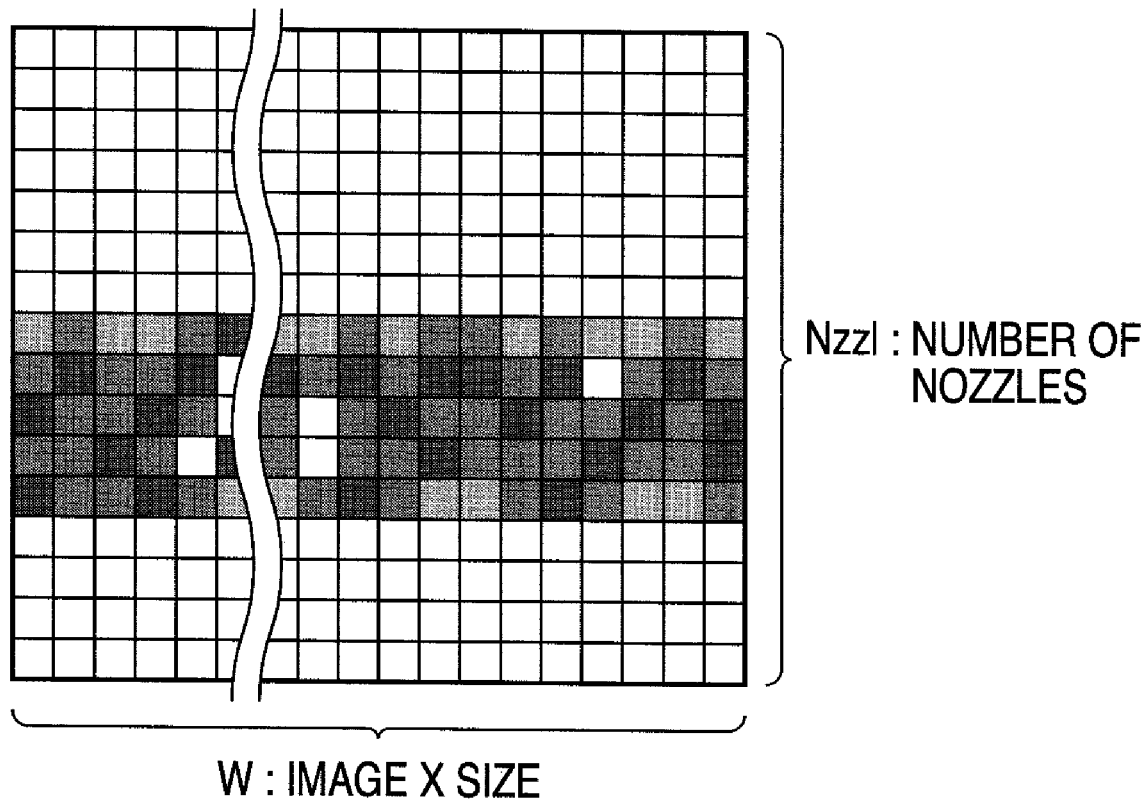
FIG. 23 shows halftone data after the shift processing in the constraining condition information calculation processing according to the embodiment of the present invention.

Likewise, in step S304 a halftone data shifter 505 shifts the data Out_c_LPF upward by the paper feed amount. FIG. 23 shows shifted halftone data. Shifted halftone data Out'_c_LPF is calculated by:

$$Out'\_c\_LPF(nx, ny) = Out\_c\_LPF(nx, ny+LF) \quad (33)$$

for 0≦nx<image X size and 0≦ny<Nzzl

As in equation (32), in equation (33), when ny+LF≧Nzzl, Out'_c_LPF(nx, ny)=0. That is, zero is substituted in lower end LF nozzles (four nozzles in this case) after the shift processing.

Likewise, in step S305 a pre-update constraining condition information data shifter 503 shifts the constraining condition information data C_r before update upward by the paper feed amount. Shifted constraining condition information data C'_r is calculated by:

$$C'\_r(nx, ny) = C\_r(nx, ny+LF) \quad (34)$$

for 0≦nx<image X size and 0≦ny<Nzzl

As in equation (32), in equation (34), when ny+LF≧Nzzl, C'_r(nx, ny)=0. That is, zero is substituted in lower end LF nozzles (four nozzles in this case) after the shift processing.

The reason why the respective buffer data are shifted by the paper feed amount LF in steps S303 to S305 is that halftone dot allocations to be formed at the next scan number are relatively shifted by the paper feed amount LF on the printing medium.

In step S306, a subtractor 506 subtracts the data calculated by the halftone data shifter 505 from the data calculated by the scan duty data shifter 504. In step S307, a weight multiplier 507 multiplies the difference data by a weighting coefficient h (real number).

In step S308, an adder 508 adds the data calculated by the weight multiplier 507 and the cyan constraining condition information shifted by the pre-update constraining condition information data shifter 503 to calculate updated constraining condition information C_r. A formula of the updated constraining condition information C_r calculated in steps S306 to S308 is described by:

$$C\_r \leftarrow (-\text{Out'}\_c\_\text{LPF} + C'\_df)'h + C'\_r \quad (35)$$

The calculated constraining condition information C_r is saved in the constraining condition information buffer 109 as that for the halftone processing of the next scan number k=2 and the subsequent scan numbers (i.e., a scan number k+1 with respect to the current scan number k).

Formula (35) that describes the update method of the constraining condition information in this embodiment will be described in detail below.

Out'_c_LPF in formula (35) is data obtained by extracting low frequency components from the halftone image of the scan number k using the LPF_b by the halftone data filter processor 502. Formula (35) appends a minus sign to Out'_c_LPF as −Out'_c_LPF, and subtracts it from the constraining condition information before update, thus setting the data from which the low frequency components are removed, i.e., (−Out'_c_LPF+C'_df) to be a negative value. In this way, dots are hardly formed at the next scan number k+1 and subsequent scan numbers. That is, with this processing, an effect of setting the low frequency components of the halftone image formed at the next scan number k+1 and subsequent scan numbers after the scan number k to be in opposite phase can be provided.

In this way, −Out'_c_LPF sets the low frequency components of dots allocated by the immediately preceding scan in opposite phase. The effect of setting only the low frequency components in opposite phase will be described below with reference to FIG. 25.

Figure 25:
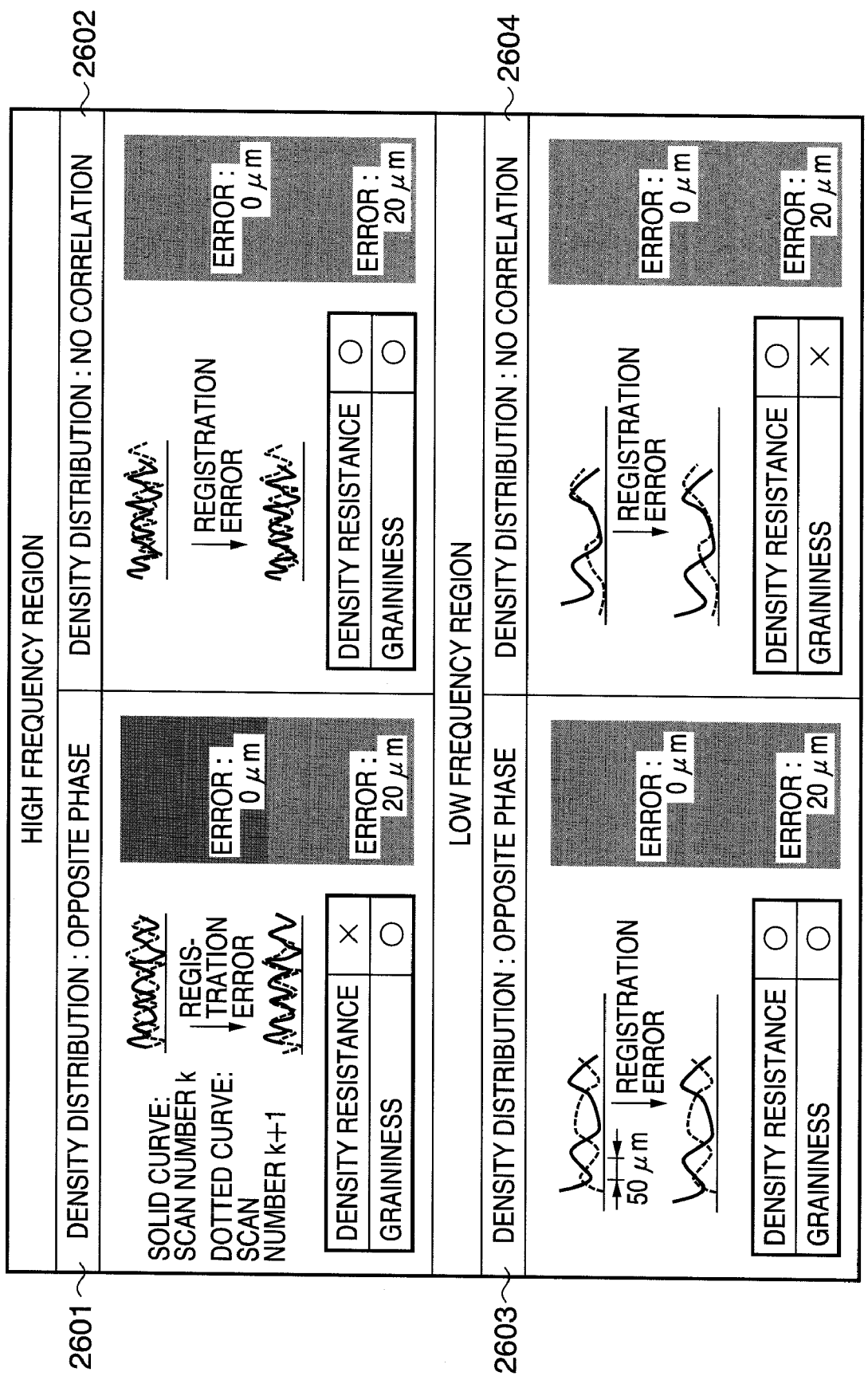
FIG. 25 shows anti-registration error characteristics depending on frequency regions of a printed image according to the embodiment of the present invention.

FIG. 25 shows changes of a printed image due to a registration error separately in a high frequency region and low frequency region. The high frequency region of a printed image will be examined first. When the density distributions at the scan numbers k and k+1 are in opposite phase, as denoted by reference numeral 2601, upper and lower peaks of the density distributions in case of no registration error are interpolated, and dots fill all over the sheet surface, thus hardly generating a sheet blank part. For this reason, the density becomes high. For example, when only a slight registration error (20 μm in FIG. 25) has occurred, the density distributions tend to overlap each other, and a sheet blank part is readily seen, resulting in a low density tendency. That is, when the density distributions of the high frequency components are in opposite phase, the density resistance against a registration error becomes low. However, when the density distributions of the high frequency components have no correlation, as denoted by reference numeral 2602, even when a slight registration error has occurred, the density hardly changes, and nearly no deterioration of graininess occurs.

On the other hand, as for a low frequency region of a printed image, when the density distributions are in opposite phase, as denoted by reference numeral 2603, low frequency components which are visually obstructive are reduced, and deterioration of graininess is suppressed. Furthermore, since the relationship between the upper and lower peaks of the distributions scarcely changes even when a registration error has occurred slightly, the density resistance is high. However, when the density distributions of the low frequency components have no correlation, as denoted by reference numeral 2604, since the low frequency components appear on an image irrespective of the occurrence of any registration error, the graininess deteriorates.

As described above, as can be seen from FIG. 25, in order to assure high density nonuniformity resistance and good graininess against a registration error on the printed image, it is important to attain the following two points between scans. That is, 1) low frequency components which are visually obstructive are set in opposite phase. 2) High frequency components are set to have no correlation in place of opposite phase.

The actual dot allocations at the scan numbers k and k+1 will be described below taking as an example a case of the scan numbers 1 and 2, the number of nozzles=170, and the number of passes=2.

Figure 51:
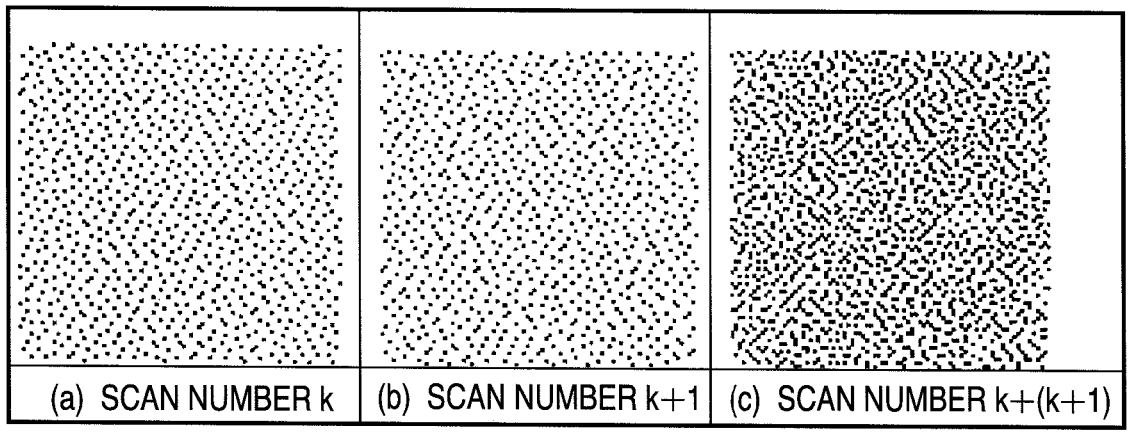
FIG. 51 shows the dot allocations of neighboring scan numbers and their integrated example according to the fifth embodiment.

The dot allocations formed on an identical printing medium coordinate system of the scan numbers k and k+1 at that time are respectively shown in (a) and (b) of FIG. 51. Furthermore, a final output image by combining the dot allocations shown in (a) and (b) is shown in (c). (a) shows a halftone image (vertical size 170/2=85) formed by ½ nozzles from the lower end, and (b) shows a halftone image (vertical size 170/2=85) formed by ½ nozzles from the upper end. Upon calculating the dot allocations of the scan number k+1, the image (b) of the scan number k+1 is formed on the same printing medium as (a), the image is formed by the ½ nozzles from the upper end.

FIG. 52 shows the Fourier analysis result of (a) of FIG. 51. (a) of FIG. 51 has high dispersiveness since the error diffusion processing is applied to multi-valued data, and becomes an image from which low frequency components are removed, as shown in FIG. 25.

Figure 53:
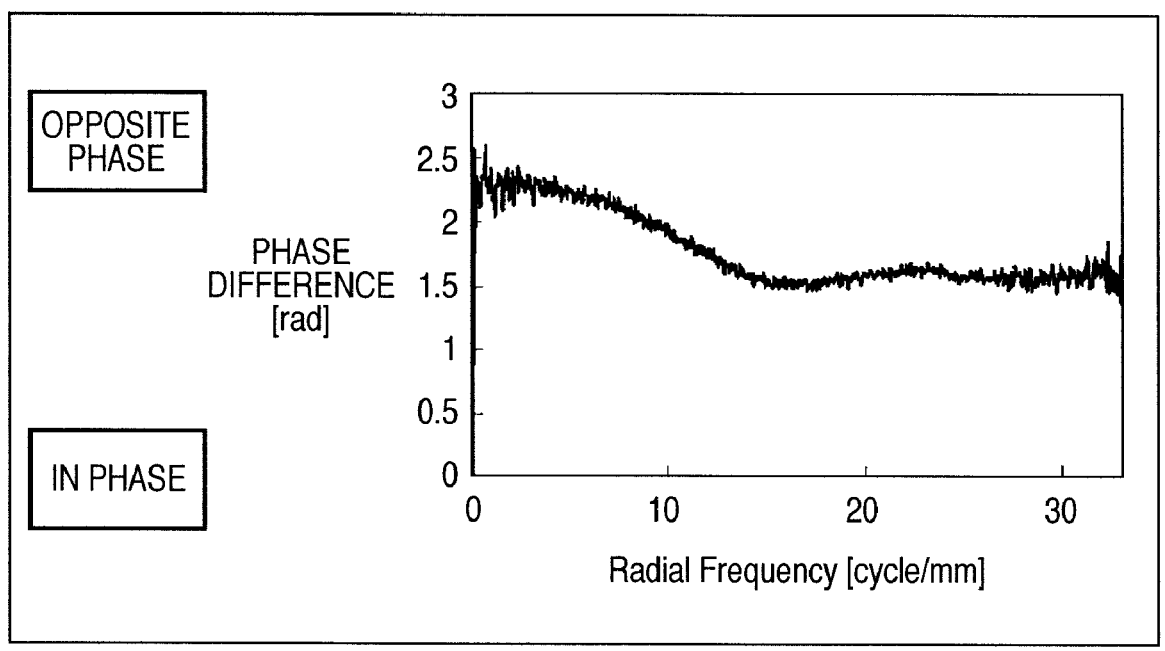
FIG. 53 shows a cross-spectrum example using the neighboring dot allocations according to the fifth embodiment.

FIG. 53 is a graph prepared by calculating a cross spectrum of (a) and (b) of FIG. 51, and calculating phase differences for respective spatial frequencies. FIG. 53 shows the relationship between the spatial frequencies on the abscissa and the average phase differences of (a) and (b) on the ordinate, and the phase differences below 10 [cycles/mm] assume values close to an opposite phase although they are not perfectly in opposite phase. Also, phase differences above 10 [cycles/mm] assume intermediate values between opposite phase and in phase, and have no correlation. Hence, as can be understood from FIG. 52, the relations that 1) low frequency components which are visually obstructive are set in opposite phase, and 2) high frequency components are set to have no correlation in place of an opposite phase, are satisfied.

This is because the constraining condition information becomes data obtained by subtracting the low frequency components of a halftone image formed by the ½ nozzles from the lower end of the scan number k, and that constraining condition information data is added by equation (22) and is passed to the halftone processing of the scan number k+1.

This example has explained the characteristics between neighboring scans of the scan numbers k and k+1. However, such characteristics are established between arbitrary scans.

Formula (35) subtracts Out'_c_LPF calculated by the halftone data filter processor 502 to obtain an effect of setting low frequency components in opposite phase. Furthermore, since high frequency components are not considered at all as constraining condition information, they can be set to have no correlation.

In formula (35), C'_df will be focused next. C'_df in formula (35) is data obtained by applying filtering to the duty data of the scan number k using F_m by the scan duty filter processor 501. In formula (35), this C'_df is added for the following two reasons.

The first reason is to always maintain the average of the constraining condition information C_r to be zero by setting the average value in the parentheses to be zero, and to make the scan duty density and the density of the halftone processing approach each other. This is because when only the data which becomes the negative value due to −Out'_c_LPF as the constraining condition information, Ic given by equation (22) becomes smaller than C_d, and the number of dots in the halftone processing becomes small. Since the error diffusion method works to set the input and output densities to always be equal to each other, C_r must always maintain zero average. Hence, since C'_df is the same density as Out'_c_LPF, C_r can always maintain zero average by adding C'_df.

The second reason is to execute spatial frequency characteristic control of an output image. As described above, since the average value in the parentheses of formula (35) must be zero, if only Out'_c_LPF is multiplied by LPF_b, Out'_c_LPF and C'_df in the parentheses are reduced in terms of spatial frequencies, thus generating edge emphasis. In other words, if subtraction is made by applying blurring processing to only Out_c without applying any blurring processing to C_d, processing equivalent to unsharp masking is executed, thus causing edge emphasis. Hence, by applying the same filter as Out_c to C_d, edge emphasis can be suppressed.

When non-coated paper such as plain paper, matte paper, or the like is used as a printing medium, since the image contour tends to be blurred, the same processing need not to be applied to both the data. For example, in order to intentionally cause edge emphasis, the degree of spread of F_m may be narrowed.

Formula (35) can further adjust the strength of the constraining condition information by the weighting coefficient h. For example, when h=1.0, the constraining condition information calculated by the filters can be output intact; when h=0.0, an output equivalent no calculations of the constraining condition information can be obtained. Since the value in the parentheses in formula (35) is zero average, the average value "0" is maintained independently of the value of h.

Figure 3:
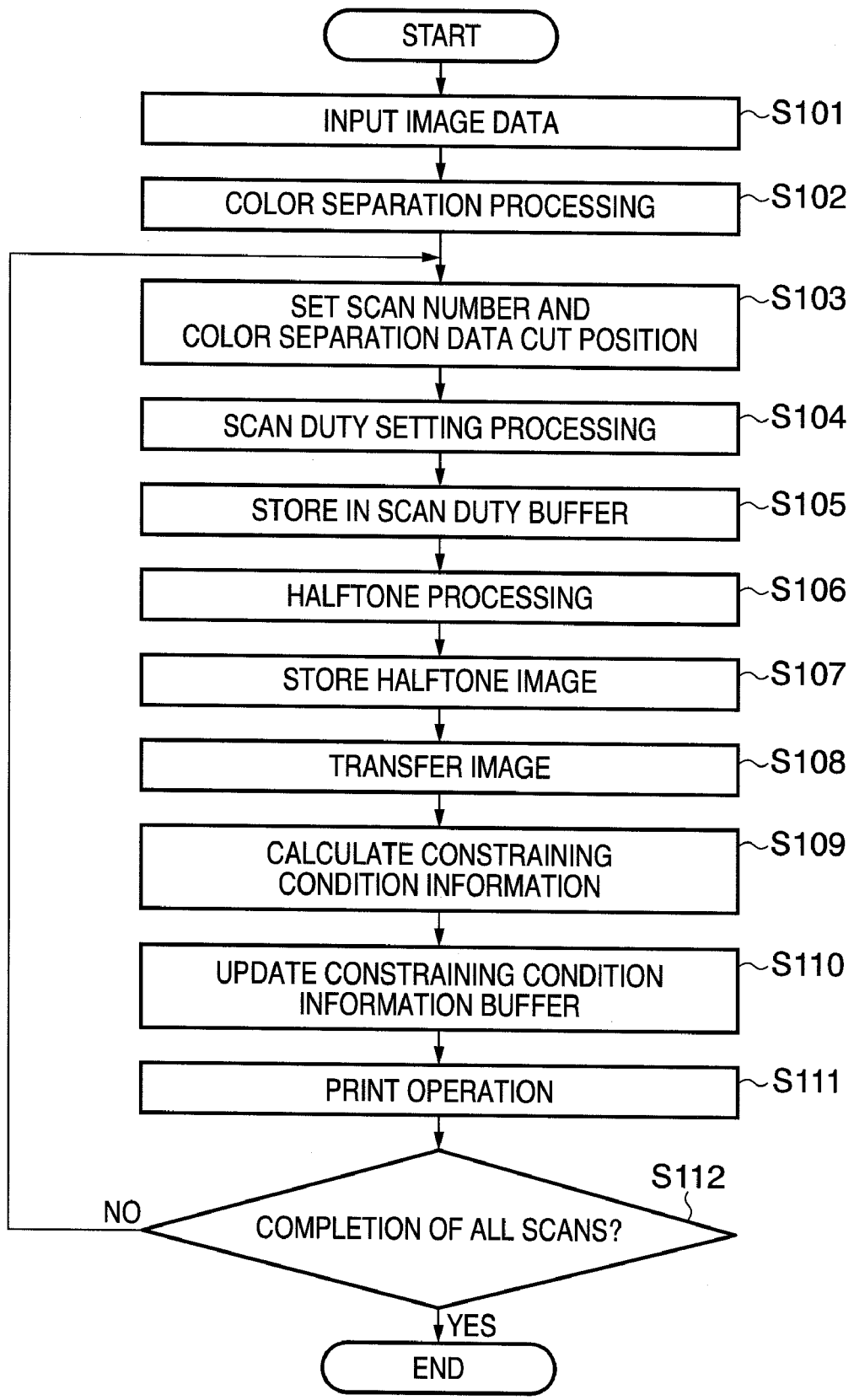
FIG. 3 is a flowchart showing image forming processing according to the embodiment of the present invention.

In this way, the constraining condition information calculation processing in step S109 in FIG. 3 ends.

In step S110, the contents of the constraining condition information buffer 109 are updated by the calculation result of the constraining condition information. The constraining condition information updated in this way is referred to as information required to determine the dot allocation of the next scan number and subsequent numbers (the next scan number is k+1 if the current scan number is k).

Updating of the constraining condition information buffer 109 will be described in detail below with reference to region 1 of FIG. 5.

In this embodiment, the halftone processing at the scan number k=2 need to set the low frequency components of a dot pattern in region 1 formed by the scan number k=1 to be in opposite phase. For this purpose, formulas (30) to (35) shift the data by one paper feed amount LF=Nzzl/Pass=16/4=4 to define the shifted data as the constraining condition information of the scan number k=2, as described above.

However, formulas (30) to (35) are not limited to "setting low frequency components in opposite phase" in the neighboring relationship of the scan numbers k=1 and k=2. For example, as shown in FIG. 5, the halftone processing of the scan number k=3 sets low frequency components in opposite phase with respect to a total dot pattern of region 1 formed by the scan numbers k=1 and 2. This is because formulas (30) to (35) repeat updating while data are shifted by one paper feed amount LF=Nzzl/Pass=16/4=4 and the constraining condition information is always held in the constraining condition information buffer 109 when the scan number is incremented by one.

Likewise, the halftone processing of the scan number k=4 sets low frequency components in opposite phase with respect to a total dot pattern of region 1 formed by the scan numbers k=1, 2, and 3.

That is, according to this embodiment, a dot pattern for each scan is formed to always set the low frequency components of an already recorded total dot pattern on an identical region on the printing medium. As a result, good graininess can always be assured irrespective of the presence/absence of the occurrence of any registration error, and density nonuniformity due to a registration error can be eliminated.

Referring back to FIG. 3, in step S111 the printer 2 which received the halftone data selects ink colors that match the image data, and starts a print operation. In step S111, a main scan for printing an image on the printing medium by driving respective nozzles at a predetermined drive interval while moving the printing head 201 from the left to the right with respect to the printing medium is made once. Upon completion of the main scan, a sub-scan as a scan perpendicular to the main scan is made once.

It is then checked in step S112 if all scans are complete. If all scans are complete, a series of image forming processes are complete; otherwise, the process returns to step S103. As described above, all the processes are complete.

As described above, according to this embodiment, in a printing method that executes binarization processing for each main scan, the following effects are further obtained upon suppressing deterioration of graininess with respect to a registration error by providing high dispersiveness to the output dot allocations formed within a single main scan. That is, in the output dot allocations between a plurality of main scans, by setting low frequency components in opposite phase, good graininess is assured irrespective of the presence/absence of the occurrence of a registration error. Furthermore, by providing randomness while reducing correlation for high frequency components, density nonuniformity due to a registration error can be eliminated.

More specifically, a dot pattern for each scan is formed by the error diffusion method so as to always set low frequency components of an identical color dot pattern, which is already printed, to be in opposite phase on an identical region on a printing medium. That is, as given by equation (22), by reflecting the constraining condition information C_r obtained by extracting the low frequency components of the dot pattern already formed at an identical position on the printing medium to the input data C_d, the low frequency components are set in opposite phase, and high frequency components are set to have no correlation. In this way, a strong density nonuniformity resistance against any registration error on a printed image and good graininess can be assured.

Note that implementation of setting the low frequency components to be in opposite phase and the high frequency components to have no correlation is not limited to the method of this embodiment. As another method, the constraining condition information obtained by extracting low frequency components may be reflected to, e.g., a threshold or quantization error.

In the example of this embodiment, the error diffusion method is used as the halftone processing. Instead, a minimized average error method may be used.

Second Embodiment

The second embodiment according to the present invention will be described hereinafter. The first embodiment has exemplified a case in which the halftone processor 108 executes the error diffusion processing. The second embodiment will exemplify a case in which the dither matrix method is used in place of the error diffusion method. As described above, since the dither matrix method can speed up the processing compared to the error diffusion method, the second embodiment can attain high-speed processing. Furthermore, since only low frequency components are used as the constraining condition information as in the first embodiment, the second embodiment can obtain the same effects as in the first embodiment.

Figure 26:
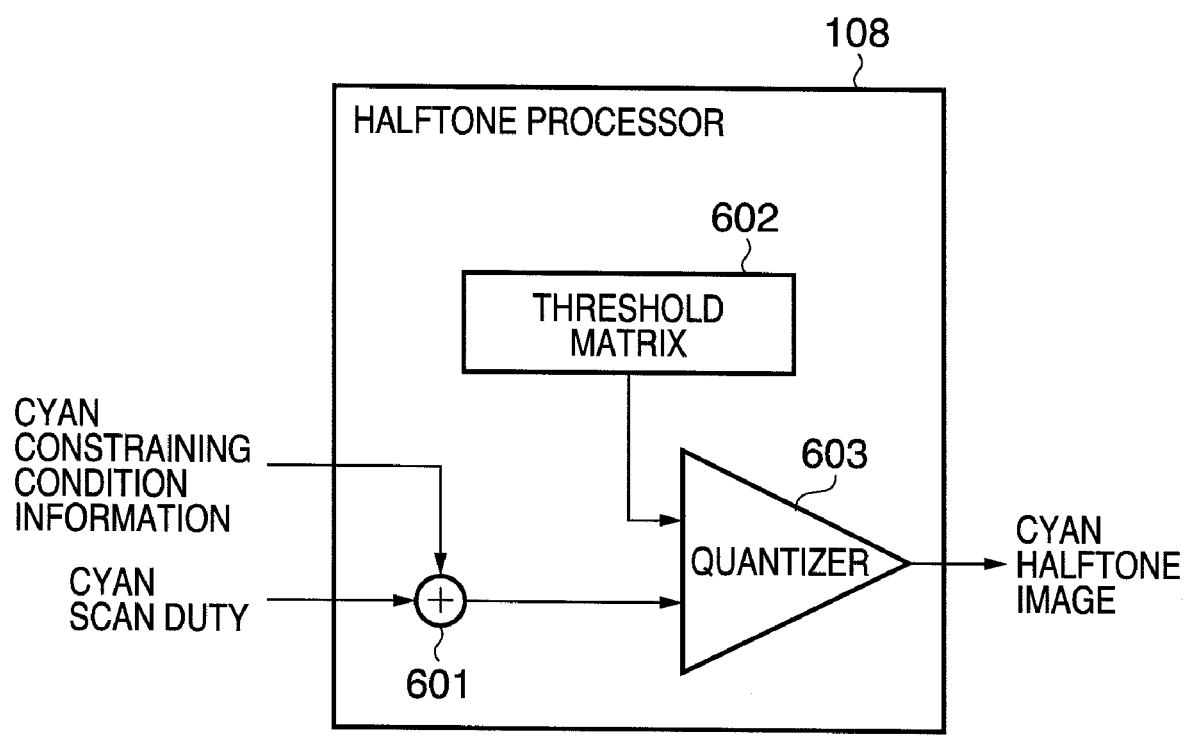
FIG. 26 is a block diagram showing the detailed arrangement of a halftone processor according to the second embodiment.

The detailed arrangement of the image forming apparatus of the second embodiment is the same as that in the first embodiment, except for the halftone processor 108. For the sake of simplicity, details of cyan halftone processing for 4-pass printing and the scan number k=1 as in the first embodiment will be described with reference to the block diagram of FIG. 26 and the flowchart of FIG. 27. FIG. 26 is a block diagram showing the detailed arrangement of the halftone processor 108 of the second embodiment, and FIG. 27 is a flowchart showing details of the halftone processing of the second embodiment.

Figure 27:
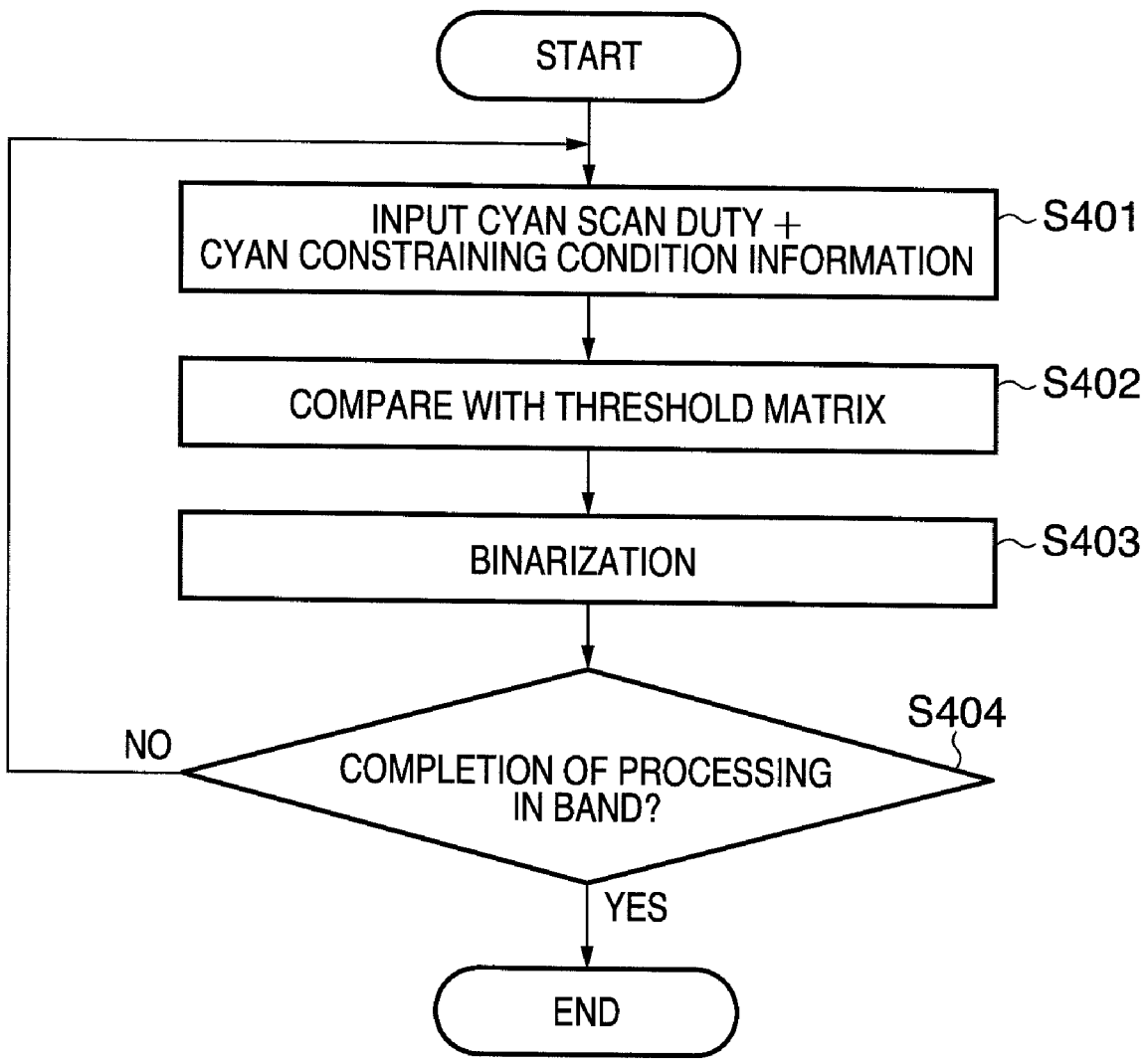
FIG. 27 is a flowchart showing halftone processing according to the second embodiment.

In step S401 shown in FIG. 27, a constraining condition information adder 601 shown in FIG. 26 calculates total value data Ic of C_d as cyan scan duty data and C_r as cyan constraining condition information by:

$$Ic = C\_d + C\_r \quad (36)$$

Note that the constraining condition information at the scan number k=1 includes all zeros.

Figure 28:
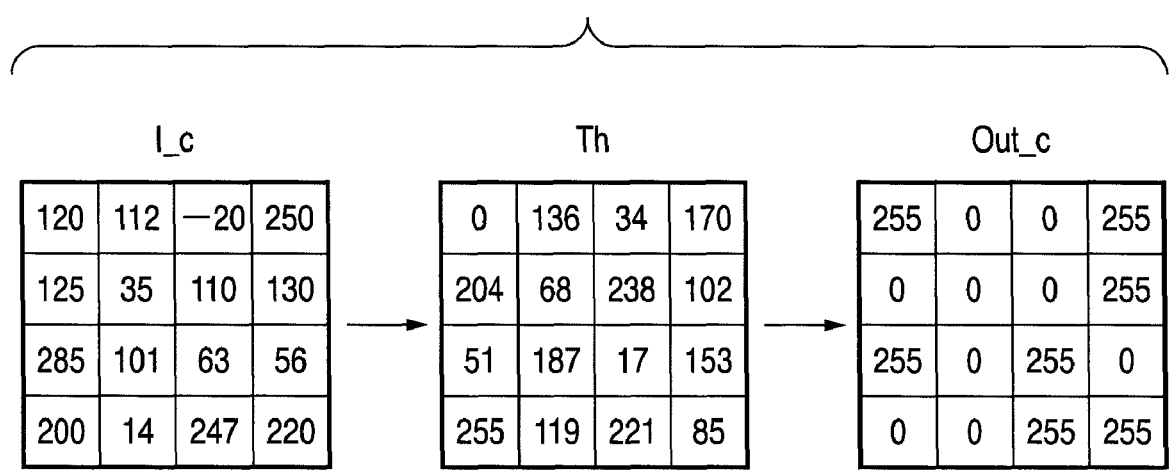
FIG. 28 shows an overview of dither matrix processing according to the second embodiment.

A quantizer 603 compares I_c with a corresponding element value of a threshold matrix 602 in step S402, and outputs binary data in step S403. FIG. 28 shows an overview of binarization by the dither matrix processing of the second embodiment. As rules of binarization, element values Th (0 to 255) of the threshold matrix 602 are expressed as:

$$\text{When } I\_c \leq Th, Out\_c = 0 \quad (37)$$

$$\text{When } Th < I\_c, Out\_c = 255 \quad (38)$$

where Th is a threshold group corresponding to addresses on the printed image, as shown in FIG. 28.

As Th in the second embodiment, a known threshold matrix may be used. For example, a Bayer matrix, dot concentration type matrix, or blue noise mask matrix may be used. Also, the threshold matrix 602 may use different matrices for respective scan numbers or may always use an identical matrix.

In step S404, the halftone processor 108 repeats the aforementioned processes in steps S401 to S403 from addresses (0, 0) to (W−1, Nzzl−1) in a band, thus determining dot positions of halftone data. In this way, the halftone processing for the scan number k=1 is complete, and a binary image to be formed by a single head operation for each color is stored in the halftone image storage buffer 110 for each color.

As described above, according to the second embodiment, since the halftone processing is executed based on the dither matrix method in place of the error diffusion, the higher-speed processing can be attained compared to the first embodiment, and high-quality image formation having a resistance to any registration error can be implemented as in the first embodiment.

Third Embodiment

The third embodiment according to the present invention will be described hereinafter. Since the detailed arrangement of the image forming apparatus according to the third embodiment is the same as the first embodiment, a description thereof will not be repeated.

The aforementioned first embodiment has exemplified the case in which the constraining condition information buffer 109 is independently assured for each color, and the error diffusion processing is applied to the total value of that constraining condition information and the scan duty data. In the aforementioned first embodiment, a dot pattern for each scan is formed to set the low frequency components of the already printed dot pattern for an identical color in opposite phase. In this way, good graininess is assured irrespective of the presence/absence of the occurrence of a registration error, and density nonuniformity due to a registration error can be eliminated.

The third embodiment is characterized in that the constraining condition information is shared by two or more colors in the halftone processing, and the error diffusion processing for one color is executed to follow the processing result for the other color. In this way, the number of constraining condition information buffers can be reduced, and low frequency components can be set in opposite phase between colors, thus preventing graininess from deteriorating due to generation of dark blue dots resulting from overlapping of cyan and magenta dots.

The halftone processing of the third embodiment will be described below with reference to the flowchart of FIG. 29. Since steps S501 to S505 are the same as those in steps S101 to S105 shown in FIG. 3 in the first embodiment described above, a repetitive description thereof will be avoided, and the processes in step S506 and subsequent steps will be explained.

In step S506, the halftone processor 108 executes cyan halftone processing for converting the total value of cyan data in the scan duty buffer 107 and the constraining condition information in the constraining condition information buffer 109 into a tone value of two levels (binary data). Note that the constraining condition information buffer 109 of the third embodiment has band-shaped constraining condition information data, the vertical direction of which corresponds to the number of nozzles (Nzzl) and the horizontal direction of which corresponds to the X size (W) of an image, and which is shared by cyan and magenta.

The constraining condition information buffer 109 stores constraining condition information indicating whether or not a binary image is easily formed at each address of an image to be printed, and updates the contents for each scan number k. At the beginning of the processing at the scan number k=1, all zeros are substituted as an initial value.

That is, upon sharing constraining condition information by cyan and magenta, five pieces of constraining condition information CM_r(X,Y), Lc_r(X,Y), Lm_r(X,Y), Y_r(X,Y), and K_r(X,Y) are to be stored at an address (X,Y), and their initial values are described by:

$$CM\_r(nx,ny) = 0 \quad (39)$$

$$Lc\_r(nx,ny) = 0 \quad (40)$$

$$Lm\_r(nx,ny) = 0 \quad (41)$$

$$Y\_r(nx,ny) = 0 \quad (42)$$

$$K\_r(nx,ny) = 0 \quad (43)$$

for 0≦nx<image X size and 0≦ny<Nzzl (the number of nozzle arrays: 16 in this case)

For this reason, each of constraining condition information Lc_r, Lm_r, Y_r, and K_r is updated to significant constraining condition information when the scan number k≧2. However, the constraining condition information CM_r shared by cyan and magenta is updated within an identical scan number. Details about updating of CM_r will be described later.

The halftone processing of the third embodiment uses error diffusion processing as processing for converting multi-valued input image data into a binary image (or a binary or more image having the number of tones smaller than the number of input tones), as in the first embodiment. Of course, a minimized average error method or the dither matrix method described in the second embodiment may be used instead.

Figure 31:
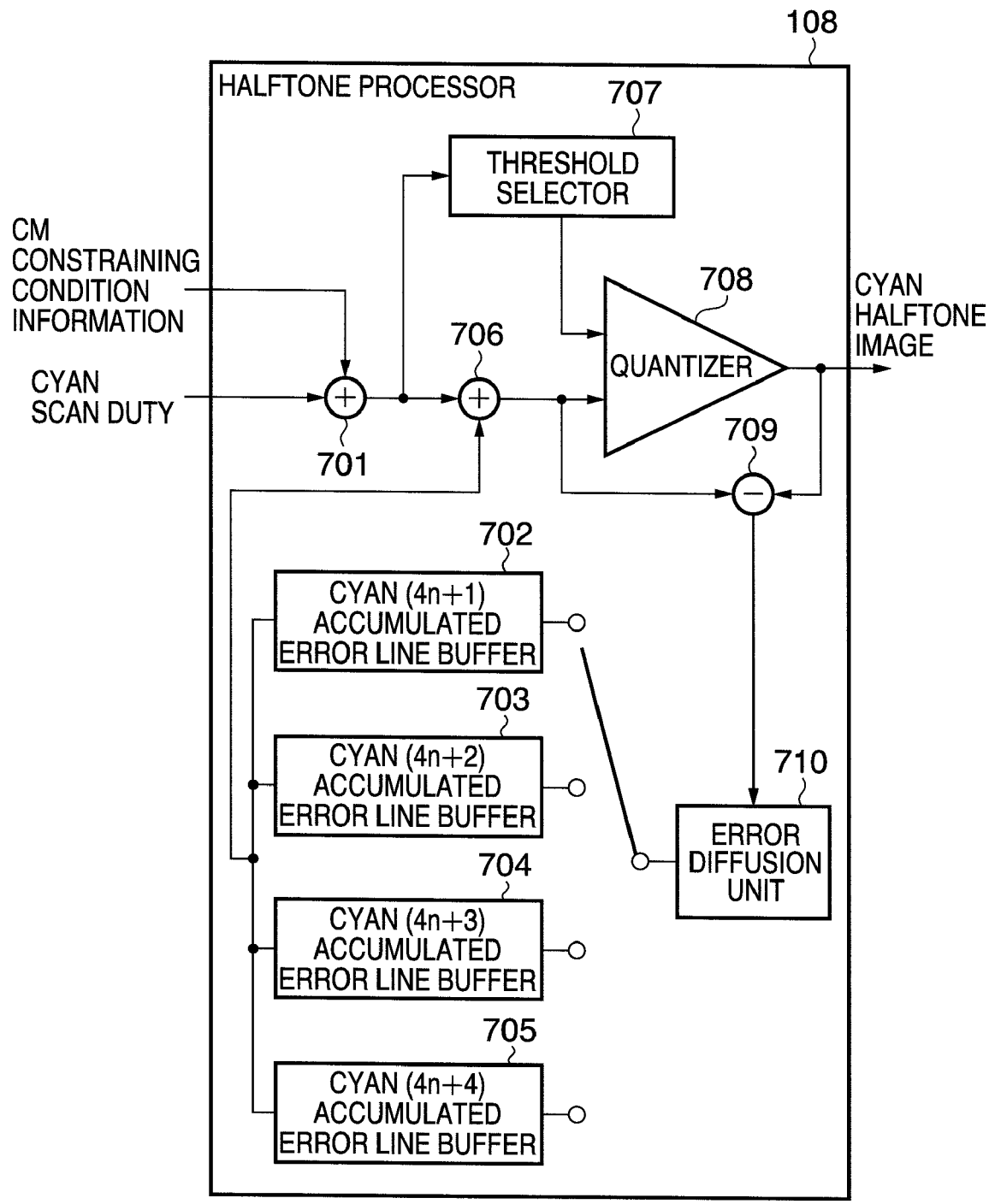
FIG. 31 is a block diagram showing the detailed arrangement associated with cyan of the halftone processor according to the third embodiment.
Figure 32:
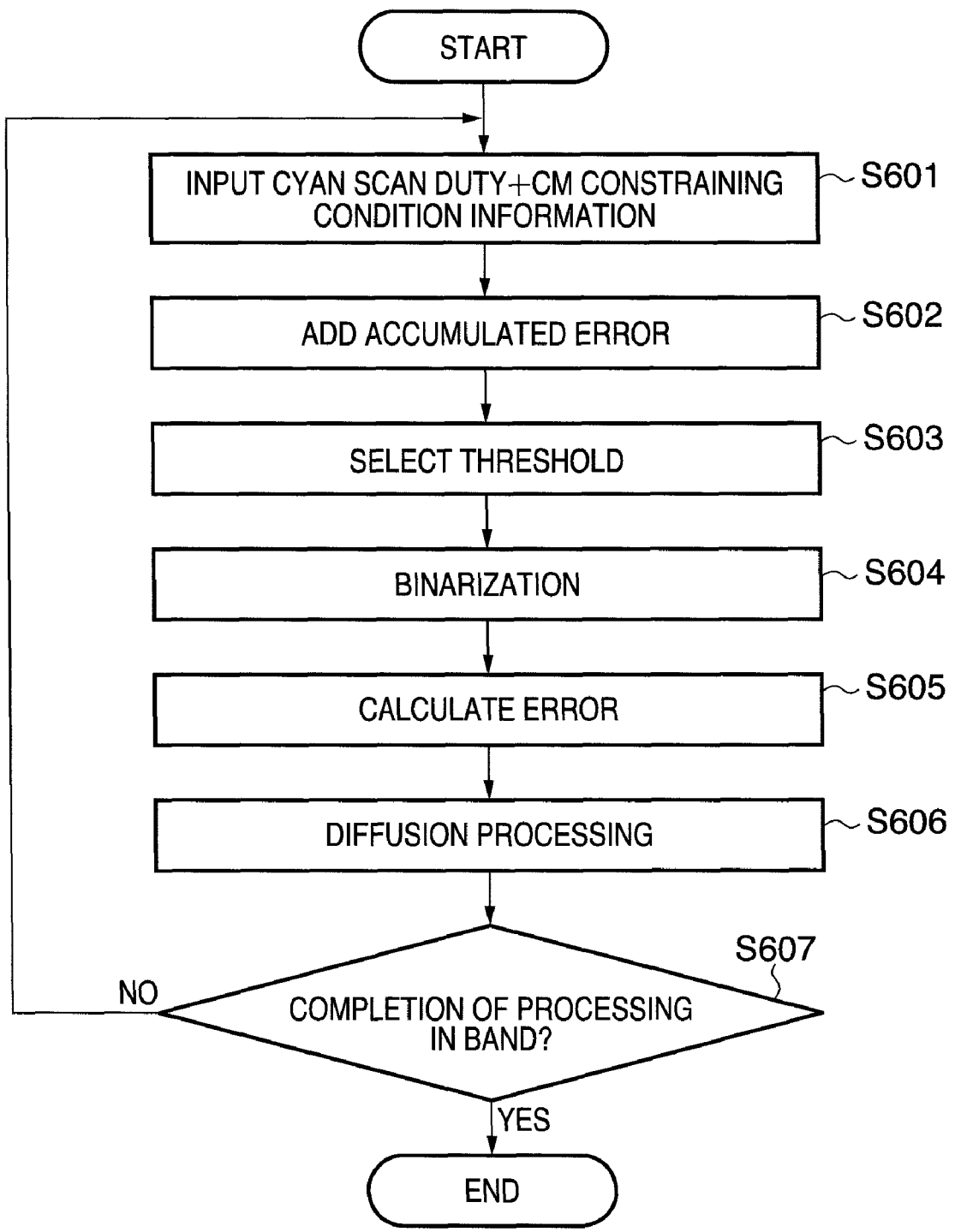
FIG. 32 is a flowchart showing the halftone processing of cyan according to the third embodiment.

For the sake of simplicity, details of the cyan halftone processing for 4-pass printing and the scan number k=1 will be described below with reference to the block diagram of FIG. 31 and the flowchart of FIG. 32. FIG. 31 is a block diagram showing the detailed arrangement especially associated with cyan processing in the halftone processor 108 of the third embodiment. FIG. 32 is a flowchart showing details of the cyan halftone processing of the third embodiment.

In step S601 shown in FIG. 32, a total of scan duty data and constraining condition information of cyan is input. That is, a constraining condition information adder 701 shown in FIG. 31 calculates total value data Ic of C_d as cyan scan duty data and cyan-magenta constraining condition information CM_r by:

$$Ic=C\_d+CM\_r \quad (44)$$

Note that constraining condition information CM_r includes all zeros when the scan number k=1.

In step S602, an accumulated error is added for error diffusion processing. The addition processing of an accumulated error of the third embodiment will be described in detail below.

In the third embodiment as well, assume that four coefficients K1 to K4 are set as error diffusion coefficients for the error diffusion processing, as shown in FIG. 14. For example, K1=7/16, K2=3/16, K3=5/16, and K4=1/16. However, the diffusion coefficients need not be fixed, as described above, but they may be changed according to tones or more coefficients may be set in place of the four coefficients.

In order to diffuse and accumulate an error using these error diffusion coefficients, the halftone processor 108 assures four accumulated error line buffers 702 to 705 for cyan, and switches the accumulated error line buffer to be used for each scan number as follows:

"When the scan numbers k=1, 5, . . . , 4n+1 (n is an integer equal to or larger than 0)",
  use cyan (4n+1) accumulated error line buffer 702
"When the scan numbers k=2, 6, . . . , 4n+2",
  use cyan (4n+2) accumulated error line buffer 703
"When the scan numbers k=3, 7, . . . , 4n+3",
  use cyan (4n+3) accumulated error line buffer 704
"When the scan numbers k=4, 8, . . . , 4n+4",
  use cyan (4n+4) accumulated error line buffer 705

Note that the cyan accumulated error line buffers 702, 703, 704, and 705 respectively include four sets of storage areas 3301 to 3304 shown in FIG. 33, i.e., four sets "Ec1_0, Ec1(x)", "Ec2_0, Ec2(x)", "Ec3_0, Ec3(x)", and "Ec4_0, Ec4(x)". For example, the cyan (4n+1) accumulated error line buffer 702 has one storage area Ec1_0 and storage areas Ec1(x) (x=1 to W) as many as the number W of horizontal pixels of the input image. The cyan accumulated error line buffers 702, 703, 704, and 705 are initialized by an initial value "all zeros" only at the beginning of processing of the scan numbers k=1, 2, 3, and 4, respectively. For example, at the beginning of processing of the scan number k=5, the (4n+1) accumulated error line buffer 702 is not initialized. In the third embodiment, since 4-pass printing is to be made, the aforementioned four accumulated error line buffers are required per color. Also, as will be described in detail later, the four accumulated error line buffers are also required for magenta.

When the scan number k=1, error diffusion processing using the cyan (4n+1) accumulated error line buffer 702 is executed. That is, an accumulated error adder 706 adds an error Ec1(x) corresponding to a horizontal pixel position x of input pixel data to the input data value as the total of the cyan scan duty data and CM constraining condition information. That is, let Ic be input data of interest, and Ic' be data after addition of an accumulated error. Then, we have:

$$Ic'=Ic+Ec1(x) \quad (45)$$

In step S603, a threshold selector 707 selects a threshold T. The threshold T is set, for example, by:

$$T=128 \quad (46)$$

Alternatively, in order to avoid any dot generation delay, the threshold T may be finely changed according to C_d to reduce an average quantization error, as given by:

$$T=f(C\_d) \quad (47)$$

In step S604, a quantizer 708 compares the pixel data Ic' after error addition with the threshold T to determine Out_c as a binarization result of the dot. This rule is as follows.
When Ic'<T, $$Out\_c=0 \quad (48)$$

When Ic'≧T, $$Out\_c=255 \quad (49)$$

In step S605, an error calculation unit 709 calculates a difference Err_c between the pixel data Ic' obtained by adding an error to the pixel Ic of interest, and the output pixel value Out_c by:

$$Err\_c(x)=Ic'-Out\_c \quad (50)$$

In step S606, an error diffusion unit 710 diffuses an error. That is, the unit 710 executes diffusion processing of the error Err_c(x) according to the horizontal pixel position x using the cyan (4n+1) accumulated error line buffer 702 as follows:

$$Ec1(x+1) \leftarrow Ec1(x+1)+Err\_c(x) \times 7/16 (x<W)$$

$$Ec1(x-1) \leftarrow Ec1(x-1)+Err\_c(x) \times 3/16 (x>1)$$

$$Ec1(x) \leftarrow Ec1\_0+Err\_c(x) \times 5/16 (1<x<W)$$

$$Ec1(x) \leftarrow Ec1\_0+Err\_c(x) \times 8/16 (x=1)$$

$$Ec1(x) \leftarrow Ec1\_0+Err\_c(x) \times 13/16 (x=W)$$

$$Ec1\_0 \leftarrow Err\_c(x) \times 1/16 (x<W)$$

$$Ec1\_0 \leftarrow 0 (x=W) \quad (51)$$

In this way, binarization (quantization value 0, 255) for one cyan pixel of the scan number k=1 is complete.

By repeating the aforementioned processes in steps S601 to S606 for addresses (0, 0) to (W−1, Nzz−1) in the band (S607), the dot positions of halftone image data, i.e., ON/OFF of cyan dots can be determined.

Figure 34:
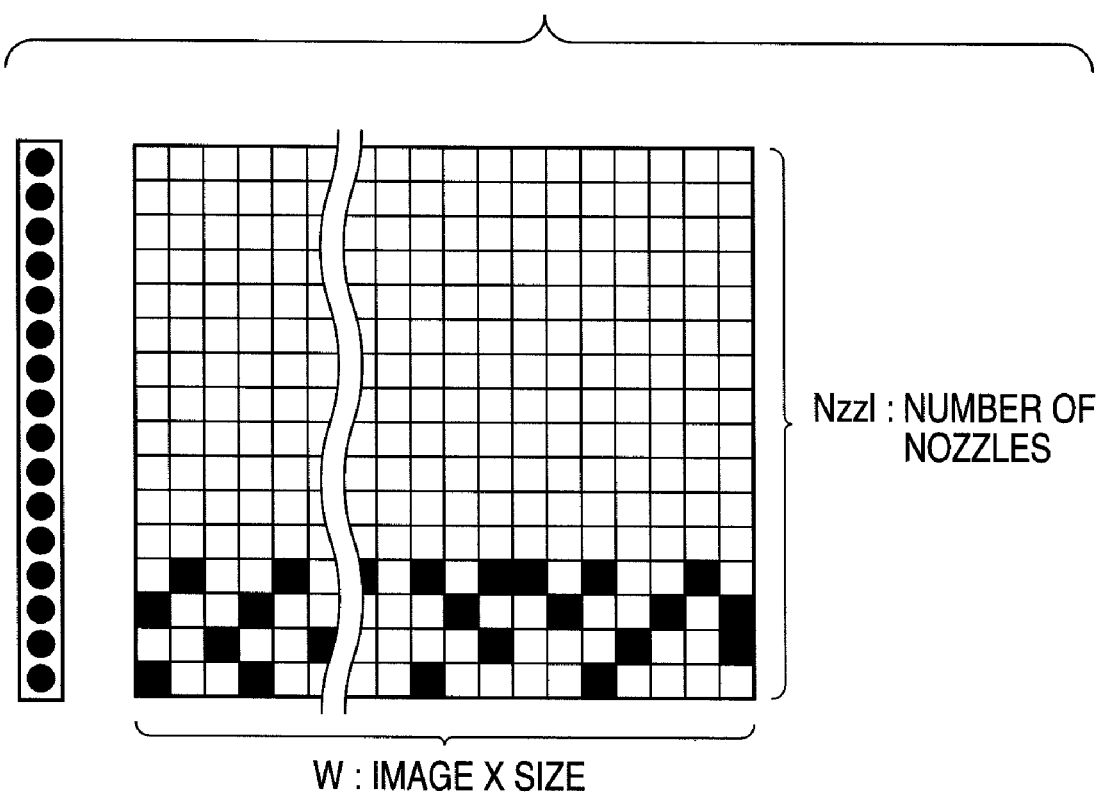
FIG. 34 shows a storage example of the halftone processing result of cyan according to the third embodiment.

Referring back to FIG. 29, upon completion of the cyan halftone processing in step S506 as described above, the cyan binary image data after the halftone processing is stored in the halftone image storage buffer 110 (S507). FIG. 34 shows the storage state of the halftone processing result of the cyan scan duty data of the scan number k=1 in the halftone image storage buffer 110. As shown in FIG. 34, the halftone image storage buffer 110 stores binary image data for (the number of nozzles: Nzzl)×(image X size: W) corresponding to the pixel positions of the scan duty data.

Next, band data of cyan halftone data, which is stored in the halftone image storage buffer 110, and the vertical direction of which corresponds to the number of nozzles (Nzzl) and the horizontal direction of which corresponds to the X size (W) of the image, is output from the image output terminal 112 (S508).

Then, the constraining condition information calculation unit 111 calculates CM constraining condition information based on cyan dot allocations (S509). As will be described in detail later, in the third embodiment, CM constraining condition information is calculated based on the cyan dot allocations, and then magenta dot allocations are determined based on that CM constraining condition information. The CM constraining condition information is updated based on the determined magenta dot allocations, and is used as that corresponding to the next scan number.

Figure 35:
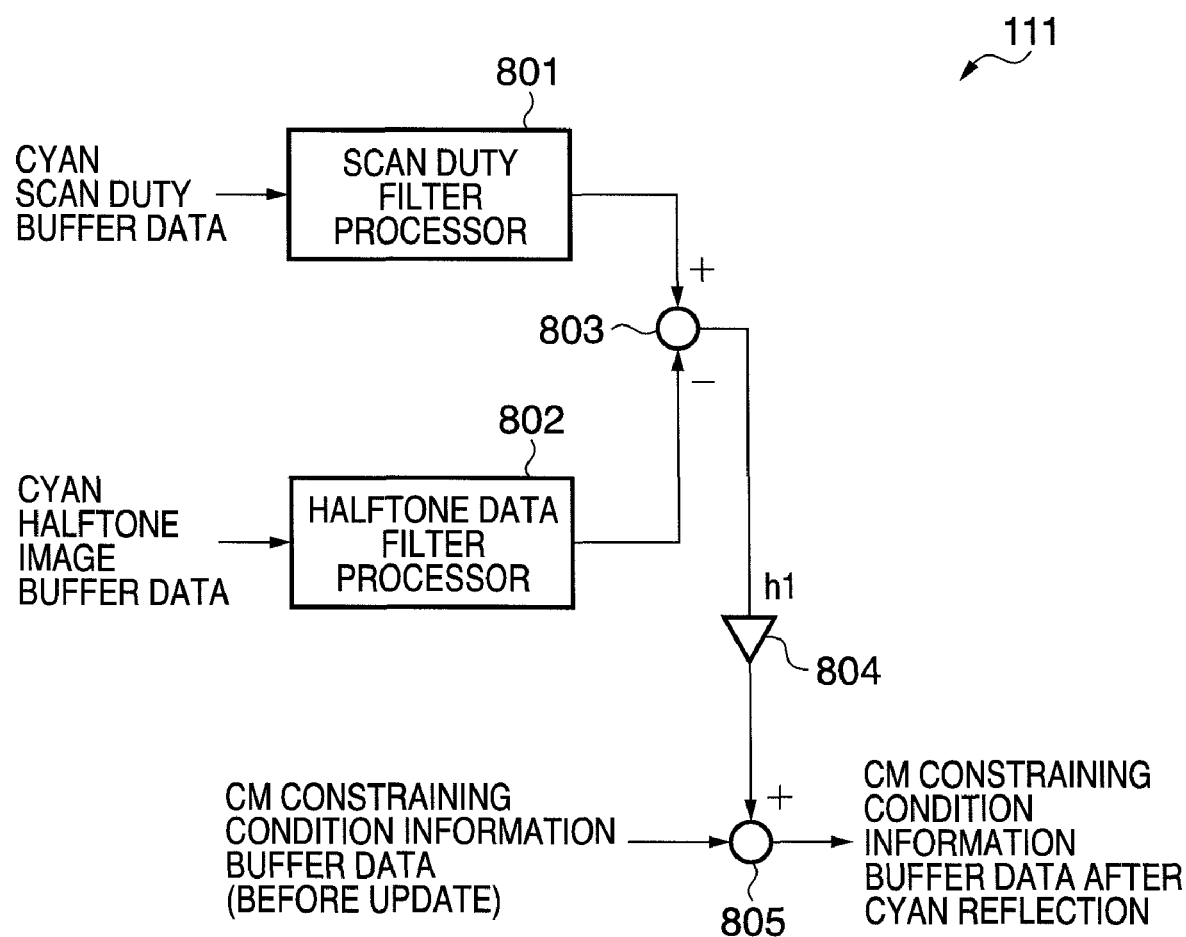
FIG. 35 is a block diagram showing the detailed arrangement associated with cyan of a constraining condition information calculation unit according to the third embodiment.
Figure 36:
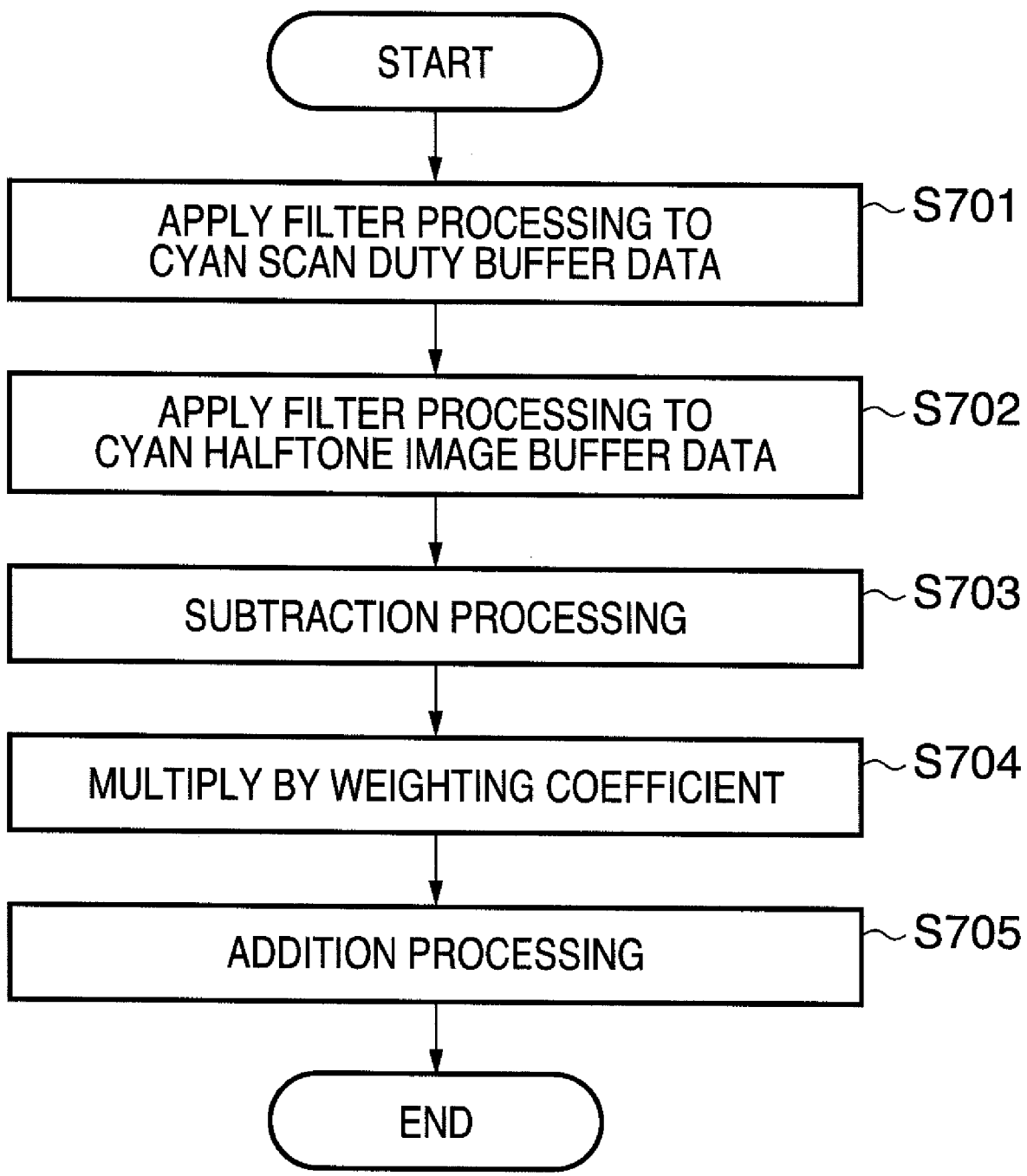
FIG. 36 is a flowchart showing the constraining condition information calculation processing of cyan according to the third embodiment.

The CM constraining condition information calculation processing based on the cyan dot allocations in step S509 will be described in detail below with reference to the block diagram of FIG. 35 and the flowchart of FIG. 36. FIG. 35 is a block diagram showing the detailed arrangement associated with cyan in the constraining condition information calculation unit 111, and FIG. 36 is a flowchart showing the constraining condition information calculation processing to be executed in that arrangement. As described above, since the constraining condition information in the third embodiment is commonly used for cyan and magenta, constraining condition information of cyan dots serves as a constraining condition upon determination of the magenta dot allocations for an identical scan number.

Figure 37:
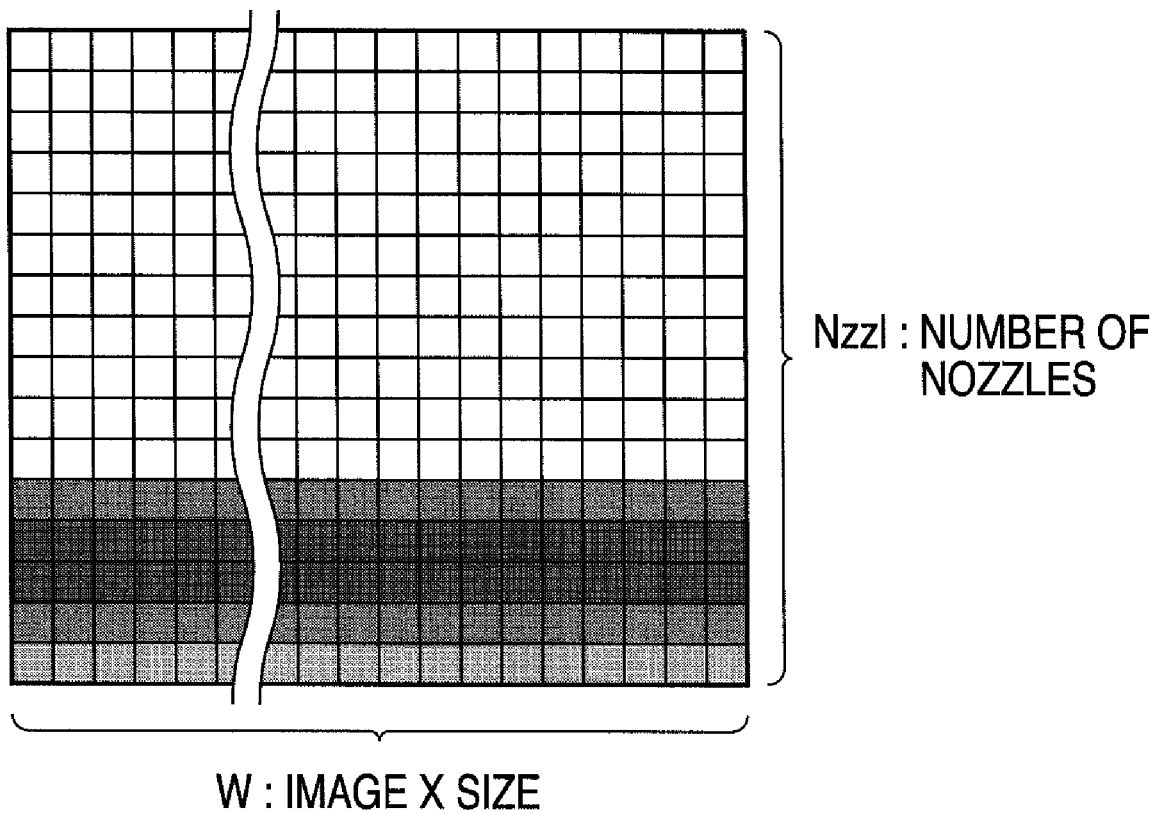
FIG. 37 shows cyan scan duty data after filter processing according to the third embodiment.

In step S701 shown in FIG. 36, filter processing is applied to data in the scan duty buffer 107. That is, a scan duty filter processor 801 shown in FIG. 35 applies, to C_d as the cyan scan duty in the scan duty buffer 107, filter processing using a predetermined filter F_m by:

$$C\_df = C\_d * F\_m \quad (52)$$

where * is a convolution operation to calculate C_df. FIG. 37 shows cyan scan duty data that has undergone the filter processing.

Note that the filter F_m of the third embodiment will be described as an isotropic weighted average filter 2401 in FIG. 24, which has a filter size of a 3×3 square and in which coefficients are set in a nearly concentric circler pattern. However, the present invention is not limited to such specific filter. For example, the filter size may be a 5×5, 7×7, or 9×9 square, or a 3×5, 5×7, or 5×9 rectangle, and an anisotropic filter in which filter coefficients are set in an elliptic pattern. Also, the present invention is not limited to low-pass characteristics, and a filter with band-pass or high-pass characteristics may be used.

In step S702, a halftone data filter processor 802 applies, to Out_c, filter processing using a predetermined low-pass filter LPF_b by:

$$Out\_c\_LPF = Out\_c * LPF\_b \quad (53)$$

to calculate Out_c_LPF. FIG. 38 shows cyan halftone data that has undergone the filter processing.

The coefficients of LPF_b of this embodiment will also be described as an isotropic weighted average filter 2402 in FIG. 24, which has a filter size of a 3×3 square and in which coefficients are set in a nearly concentric circler pattern, as in F_m. However, the present invention is not limited to such specific filter. However, LPF_b preferably has low-pass characteristics. In this embodiment, F_m and LPF_b use the same filter coefficients, but they may use different coefficients, as a matter of course.

In step S703, a subtractor 803 subtracts the data calculated by the halftone data filter processor 802 from the data calculated by the scan duty filter processor 801. In step S704, a weight multiplier 804 multiplies the difference data by a weighting coefficient h1 (real number).

In step S705, an adder 805 adds the data calculated by the weight multiplier 804 and the CM constraining condition information before update to calculate constraining condition information CM_r after reflection of cyan data, and saves the information CM_r as constraining condition information for magenta halftone processing.

A formula of the constraining condition information CM_r after reflection of cyan data calculated in steps S703 to S705 is described by:

$$CM\_r \leftarrow (-Out\_c\_LPF + C\_df) \times h1 + CM\_r \quad (54)$$

Figure 29:
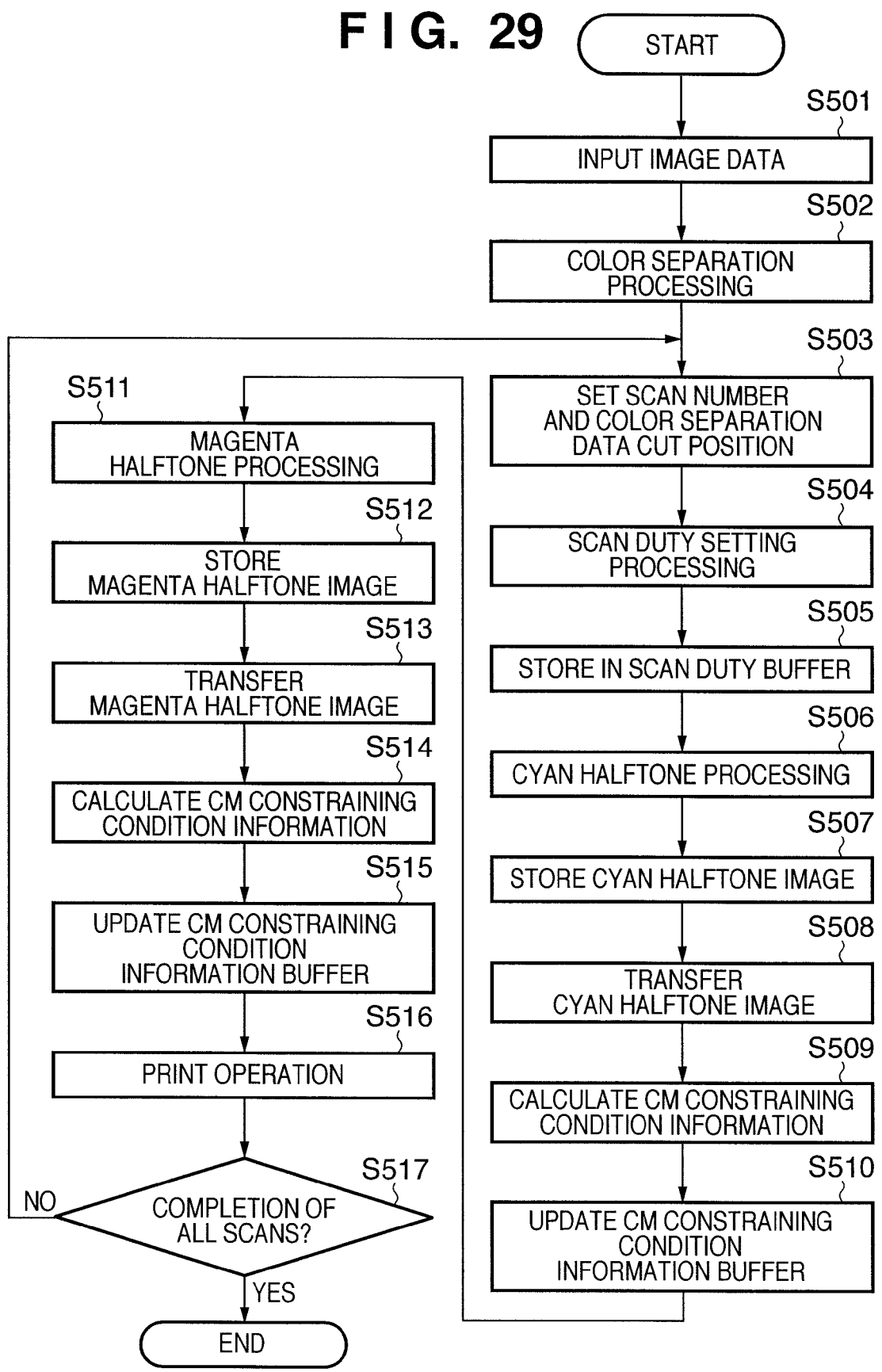
FIG. 29 is a flowchart showing halftone processing according to the third embodiment.

In this way, the CM constraining condition information calculation processing based on the cyan dot allocations in step S509 in FIG. 29 is complete.

In step S510, the constraining condition information buffer 109 shared by cyan and magenta is updated by the calculation result of the constraining condition information.

As described above, in the third embodiment, the constraining condition information is not relatively shifted upward by the paper feed amount LF in this stage unlike in the first embodiment. This is because a magenta halftone image of the same scan number is not processed yet, and the constraining condition information is used for the processing of magenta halftone data. In the third embodiment, since the constraining condition information is shared by cyan and magenta, the constraining condition information is not shifted until the magenta dot allocations of the same scan number are determined.

Figure 30:
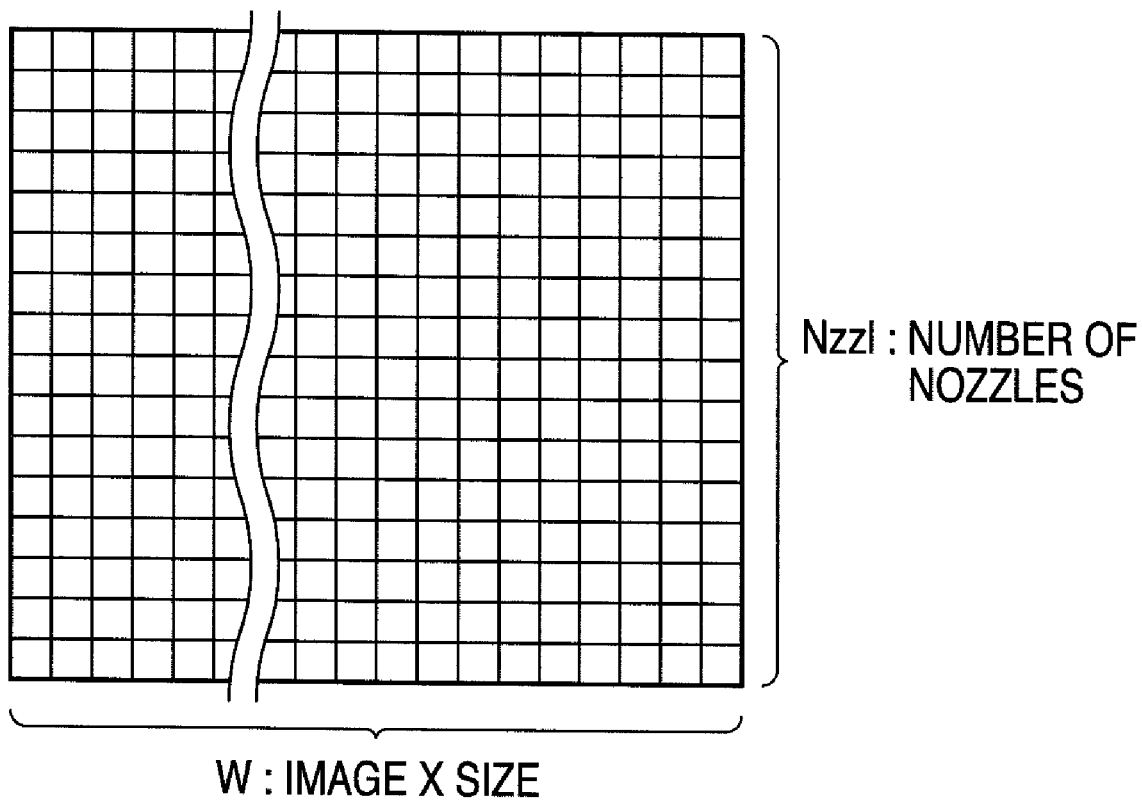
FIG. 30 shows an example of the band configuration of a constraining condition information buffer according to the third embodiment.

In step S511, the halftone processor 108 executes magenta halftone processing for converting the total value of magenta data in the scan duty buffer 107 and the contents of the constraining condition information buffer 109 into a tone value of two levels (binary data). Note that the constraining condition information buffer 109 of the third embodiment has the aforementioned buffer format shown in FIG. 30 since it is shared by cyan and magenta.

Figure 39:
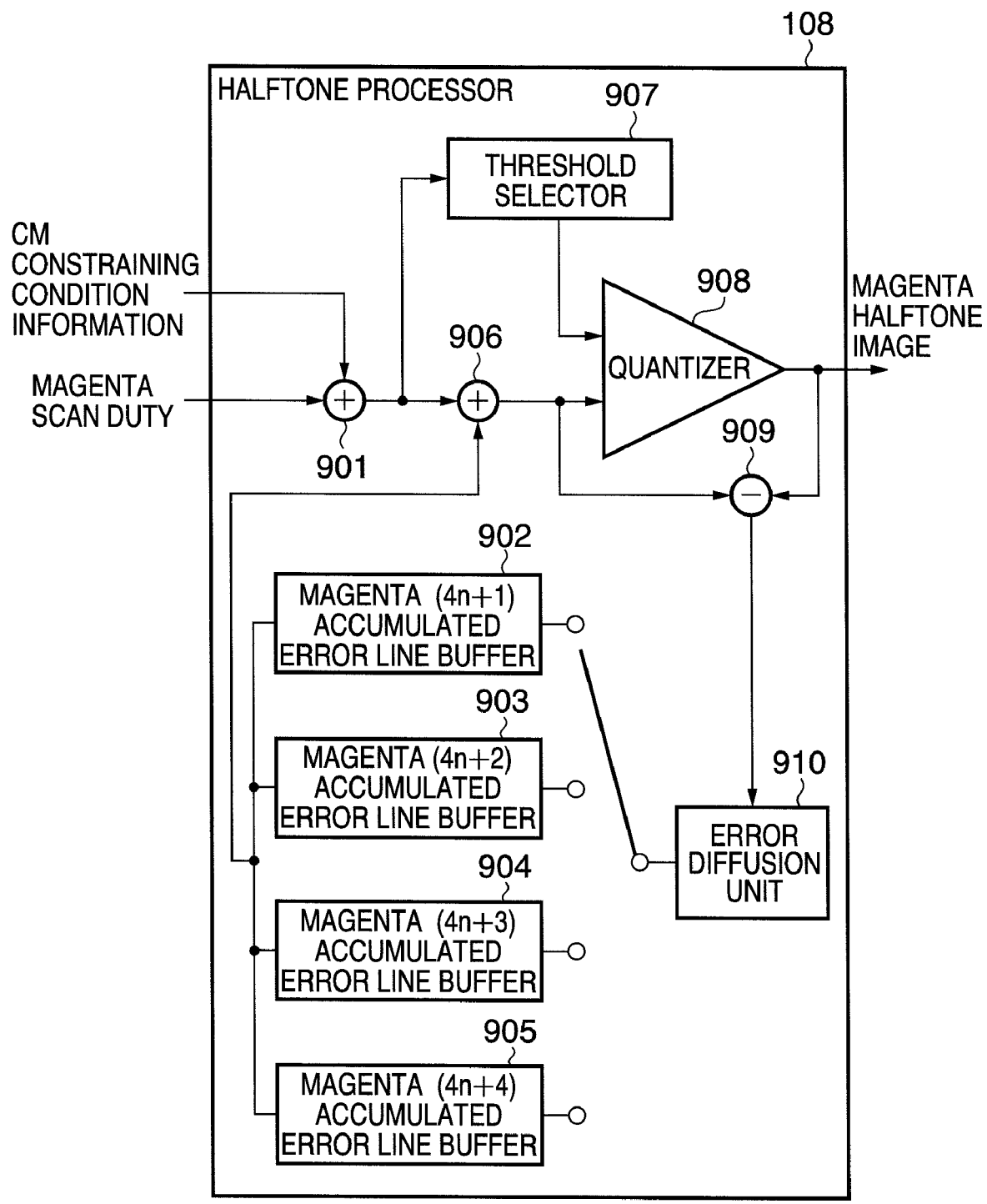
FIG. 39 is a block diagram showing the detailed arrangement associated with magenta of the halftone processor according to the third embodiment.
Figure 40:
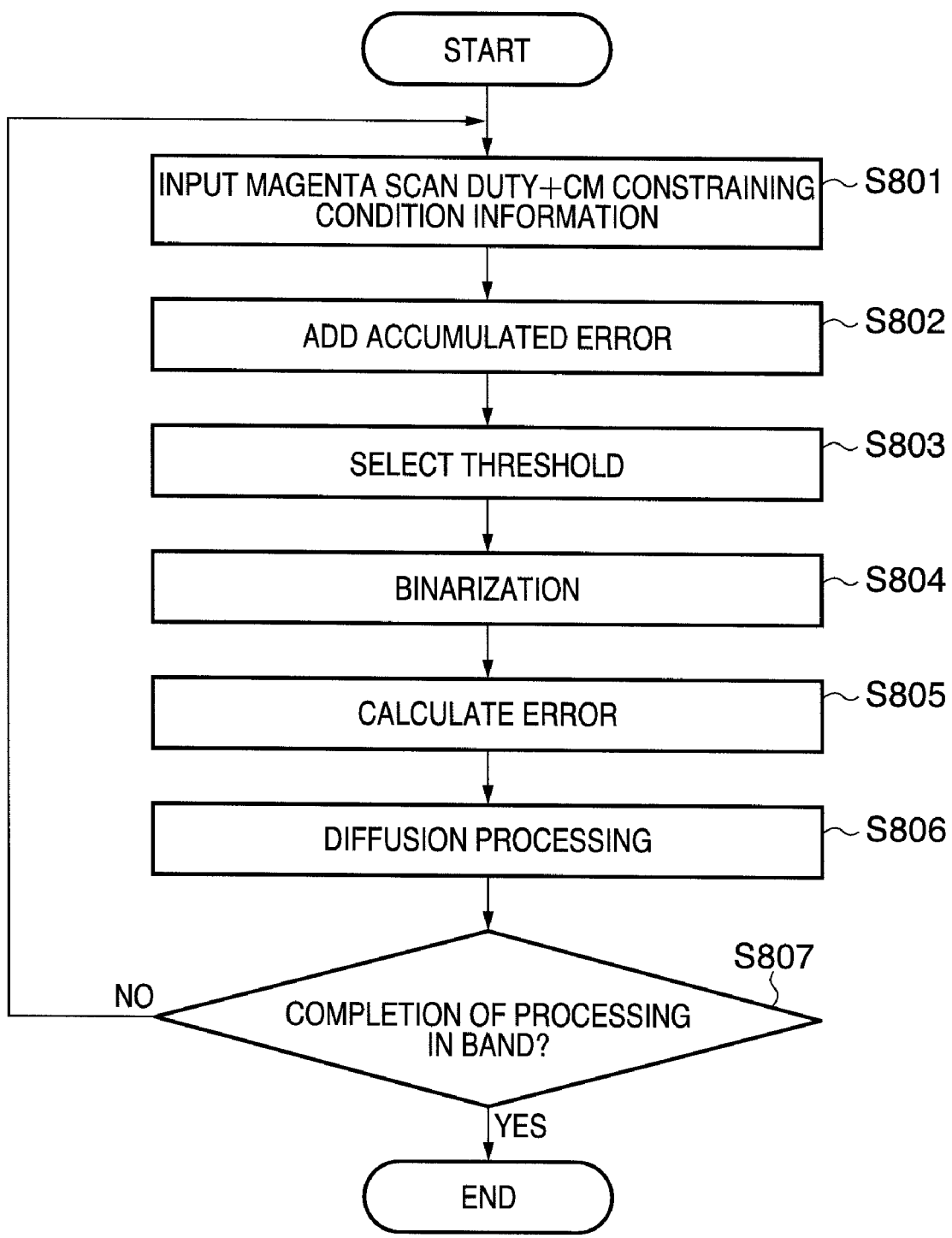
FIG. 40 is a flowchart showing the halftone processing of magenta according to the third embodiment.

Details of the magenta halftone processing will be described below with reference to the block diagram of FIG. 39 and the flowchart of FIG. 40. FIG. 39 is a block diagram showing the detailed arrangement especially associated with magenta processing in the halftone processor 108 of the third embodiment. FIG. 40 is a flowchart showing details of the magenta halftone processing of the third embodiment.

In step S801 shown in FIG. 40, a total of scan duty data and constraining condition information of magenta is input. That is, a constraining condition information adder 901 shown in FIG. 39 calculates total value data Im of M_d as magenta scan duty data and cyan-magenta constraining condition information CM_r by:

$$Im = M\_d + CM\_r \quad (55)$$

Note that the cyan constraining condition information has already been reflected by formula (54) to the input constraining condition information CM_r.

In step S802, an accumulated error is added for error diffusion processing. The addition processing of an accumulated error of the third embodiment will be described in detail below. In this case as well, assume that four coefficients K1 to K4 are set as error diffusion coefficients for the error diffusion processing, as shown in FIG. 14. In order to diffuse and accumulate an error using these error diffusion coefficients, the halftone processor 108 assures four accumulated error line buffers 902 to 905 for magenta, and switches the accumulated error line buffer to be used for each scan number as follows:

"When the scan numbers k=1, 5, . . . , 4n+1 (n is an integer equal to or larger than 0)",
  use magenta (4n+1) accumulated error line buffer 902
"When the scan numbers k=2, 6, . . . , 4n+2",
  use magenta (4n+2) accumulated error line buffer 903
"When the scan numbers k=3, 7, . . . , 4n+3",
  use magenta (4n+3) accumulated error line buffer 904
"When the scan numbers k=4, 8, . . . , 4n+4",
  use magenta (4n+4) accumulated error line buffer 905

Note that the magenta accumulated error line buffers 902, 903, 904, and 905 respectively include four sets of storage areas 3305 to 3308 shown in FIG. 33, i.e., four sets "Em1_0, Em1($x$)", "Em2_0, Em2($x$)", "Em3_0, Em3($x$)", and "Em4_0, Em4($x$)". For example, the magenta (4n+1) accumulated error line buffer 902 has one storage area Em1_0 and storage areas Em1($x$) ($x$=1 to W) as many as the number W of horizontal pixels of the input image. The magenta accumulated error line buffers 902, 903, 904, and 905 are initialized by an initial value "all zeros" only at the beginning of processing of the scan numbers k=1, 2, 3, and 4, respectively. For example, at the beginning of processing of the scan number k=5, the (4n+1) accumulated error line buffer 902 is not initialized.

When the scan number k=1, error diffusion processing using the magenta (4n+1) accumulated error line buffer 902 is executed. That is, an accumulated error adder 906 adds an error Em1($x$) corresponding to a horizontal pixel position x of input pixel data to the input data value as the total of the magenta scan duty data and CM constraining condition information. That is, let Im be input data of interest, and Im' be data after addition of an accumulated error. Then, we have:

$$Im'=Im+Em1(x) \qquad (56)$$

In step S803, a threshold selector 907 selects a threshold T. The threshold T is set, for example, by:

$$T=128 \qquad (57)$$

Alternatively, in order to avoid any dot generation delay, the threshold T may be finely changed according to M_d to reduce an average quantization error, as given by:

$$T=f(M\_d) \qquad (58)$$

In step S804, a quantizer 908 compares the pixel data Im' after error addition with the threshold T to determine Out_m as a binarization result of the dot. This rule is as follows.
  When Im'<T, $$Out\_m=0 \qquad (59)$$

When Im'≧T, $$Out\_m=255 \qquad (60)$$

In step S805, an error calculation unit 909 calculates a difference Err_m between the pixel data Im' obtained by adding an error to the pixel Im of interest, and the output pixel value Out_m by:

$$Err\_m(x)=Im'-Out\_m \qquad (61)$$

In step S806, an error diffusion unit 910 diffuses an error. That is, the unit 910 executes diffusion processing of the error Err_m(x) according to the horizontal pixel position x using the magenta (4n+1) accumulated error line buffer 902 as follows:

$$Em1(x+1) \leftarrow Em1(x+1)+Err\_m(x) \times 7/16 (x<W)$$

$$Em1(x-1) \leftarrow Em1(x-1)+Err\_m(x) \times 3/16 (x>1)$$

$$Em1(x) \leftarrow Em1\_0+Err\_m(x) \times 5/16 (1<x<W)$$

$$Em1(x) \leftarrow Em1\_0+Err\_m(x) \times 8/16 (x=1)$$

$$Em1(x) \leftarrow Em1\_0+Err\_m(x) \times 13/16 (x=W)$$

$$Em1\_0 \leftarrow Err\_m(x) \times 1/16 (x<W)$$

$$Em1\_0 \leftarrow 0 (x=W) \qquad (62)$$

In this way, binarization (quantization value 0, 255) for one magenta pixel of the scan number k=1 is complete.

By repeating the aforementioned processes in steps S801 to S806 for all pixels in the band (S807), the dot positions of magenta halftone data, i.e., ON/OFF of magenta dots can be determined.

Figure 41:
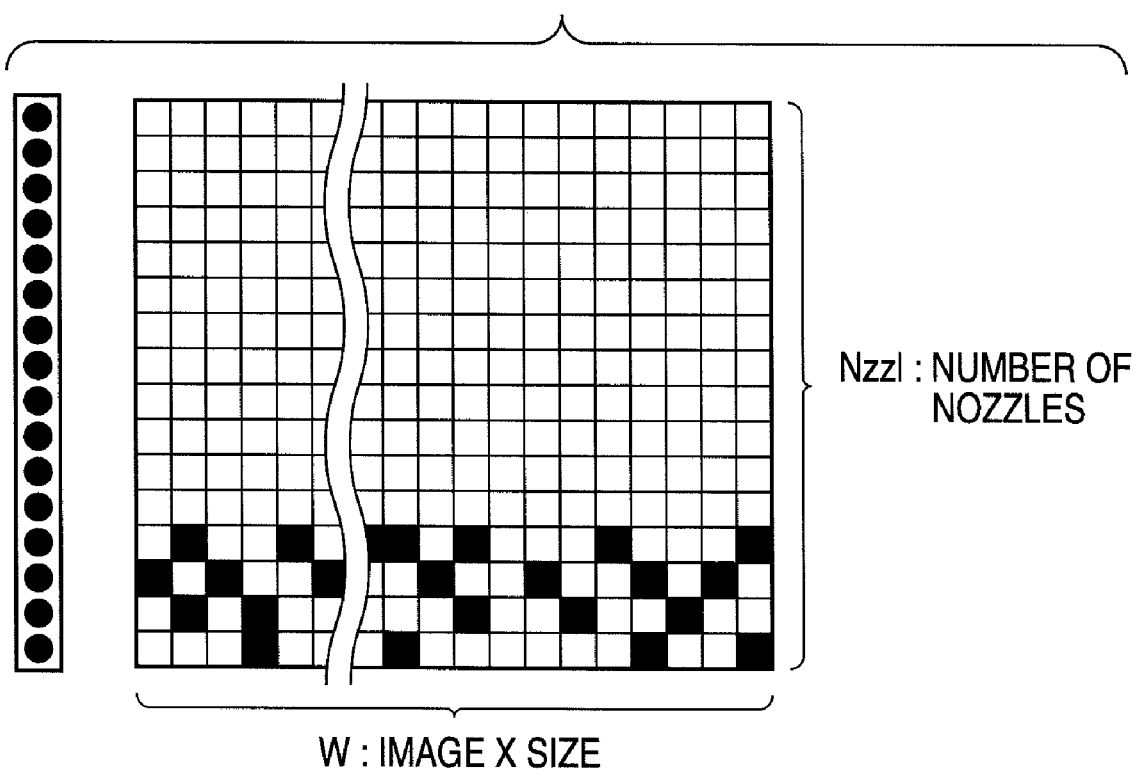
FIG. 41 shows a storage example of the halftone processing result of magenta according to the third embodiment.

Referring back to FIG. 29, upon completion of the magenta halftone processing in step S511 as described above, the magenta binary image data after the halftone processing is stored in the halftone image storage buffer 110 (S512). FIG. 41 shows the storage state of the halftone processing result of the magenta scan duty data of the scan number k=1 in the halftone image storage buffer 110. As shown in FIG. 41, the halftone image storage buffer 110 stores binary image data for (the number of nozzles: Nzzl)×(image X size: W) corresponding to the pixel positions of the scan duty data.

Next, band data of magenta halftone data, which is stored in the halftone image storage buffer 110, and the vertical direction of which corresponds to the number of nozzles (Nzzl) and the horizontal direction of which corresponds to the X size (W) of the image, is output from the image output terminal 112 (S513).

Figure 42:
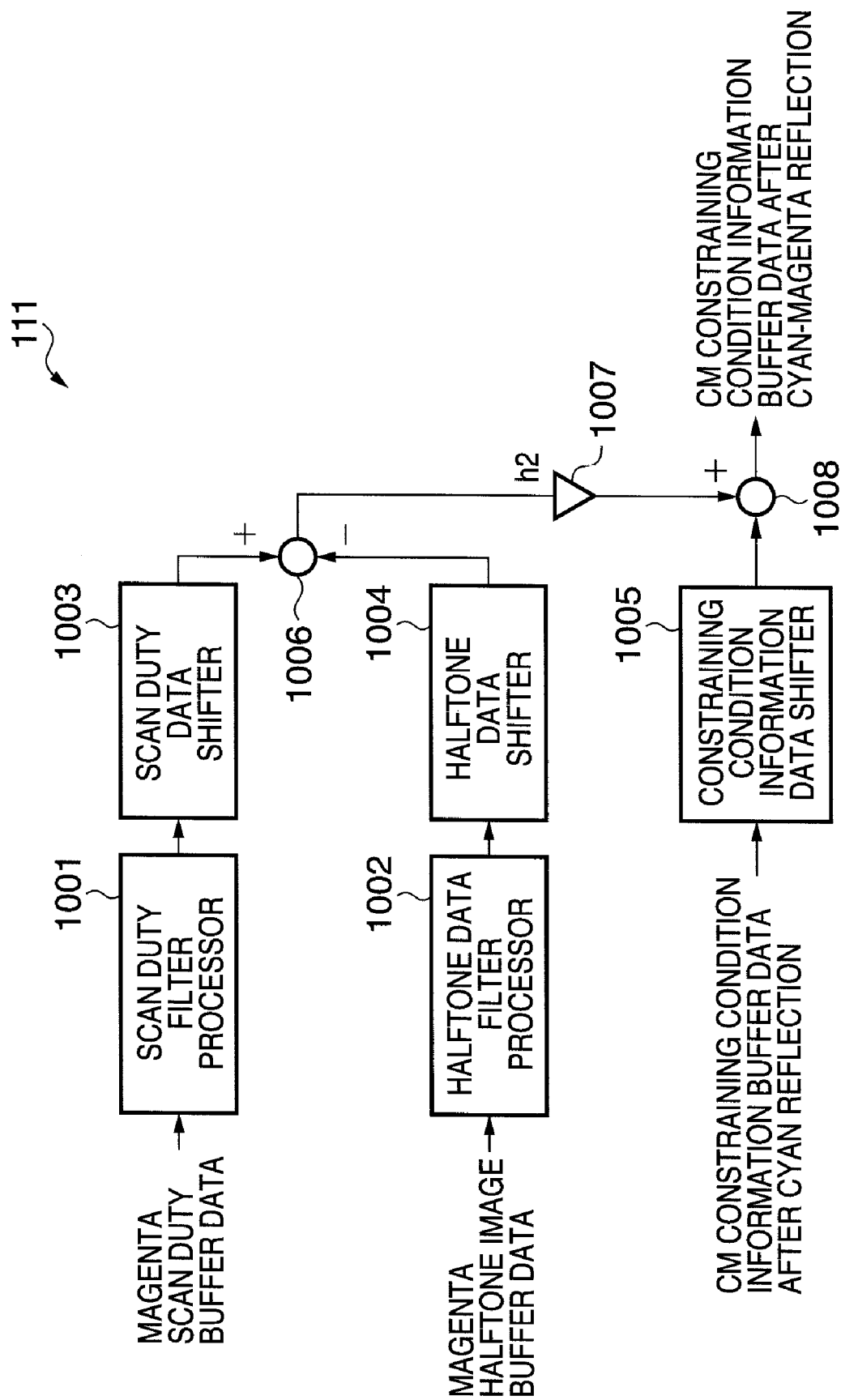
FIG. 42 is a block diagram showing the detailed arrangement associated with magenta of the constraining condition information calculation unit according to the third embodiment.

Then, the constraining condition information calculation unit 111 calculates CM constraining condition information based on magenta dot allocations (S514). The CM constraining condition information calculation processing based on the magenta dot allocations in step S514 will be described in detail below with reference to the block diagram of FIG. 42 and the flowchart of FIG. 43. FIG. 42 is a block diagram showing the detailed arrangement associated with magenta in the constraining condition information calculation unit 111, and FIG. 43 is a flowchart showing the constraining condition information calculation processing to be executed in that arrangement.

Figure 43:
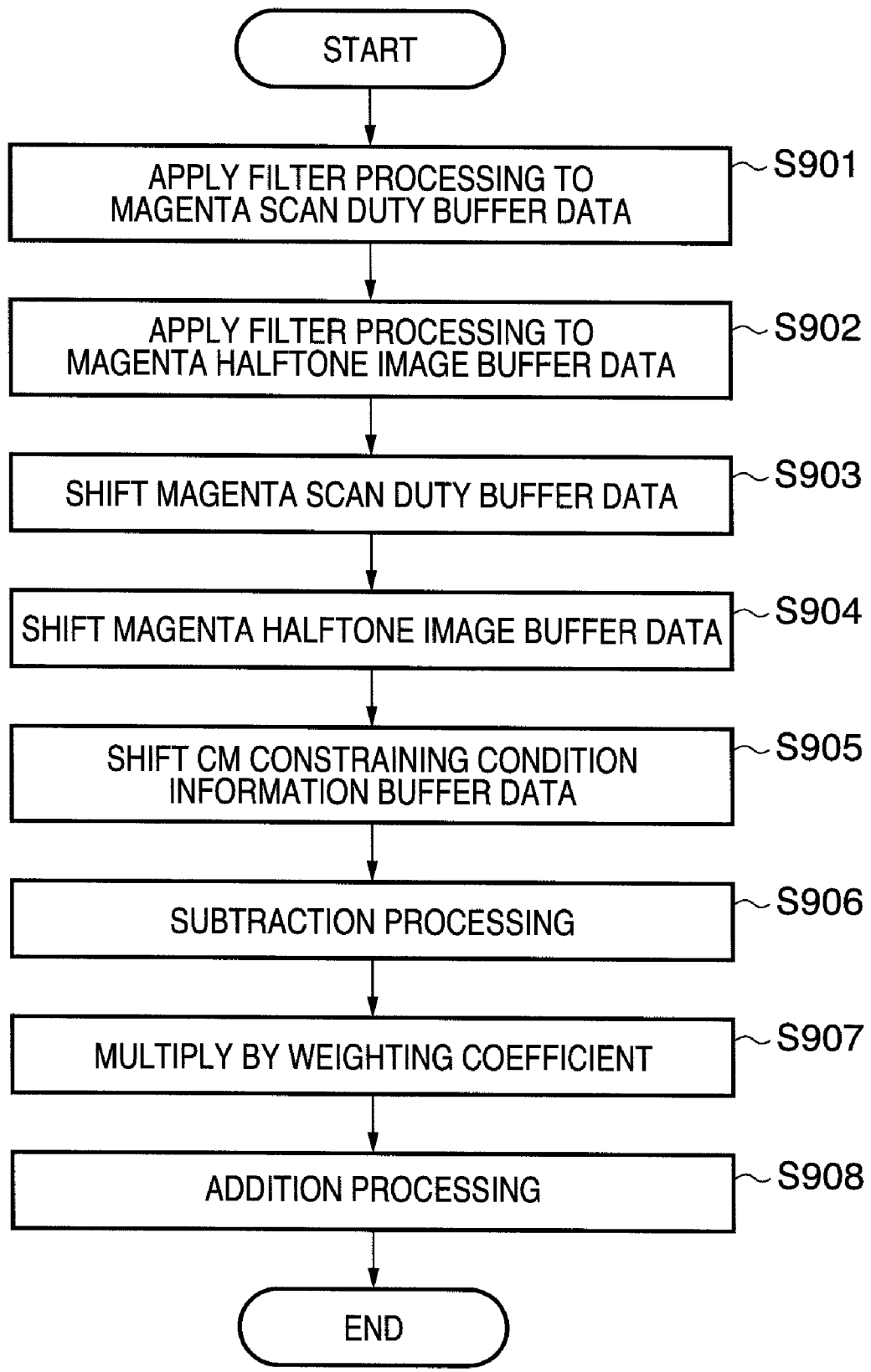
FIG. 43 is a flowchart showing the constraining condition information calculation processing of magenta according to the third embodiment.
Figure 44:
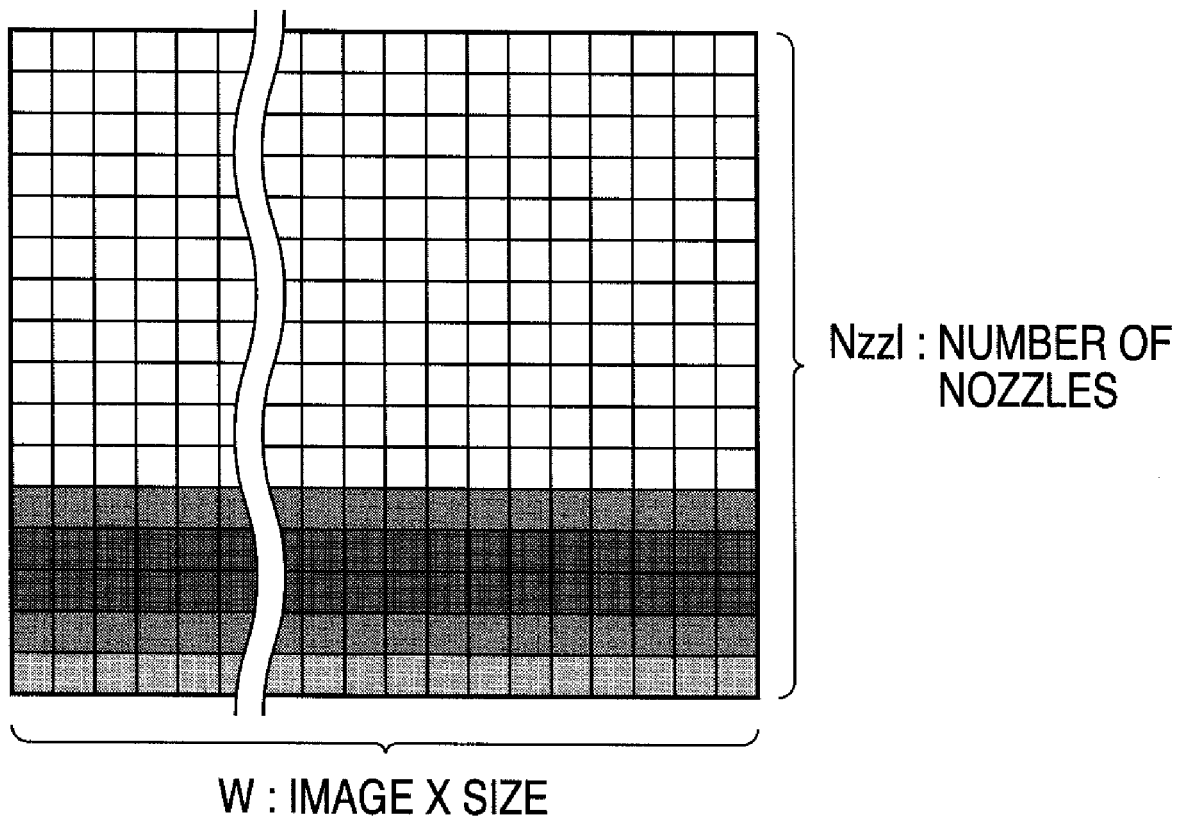
FIG. 44 shows magenta scan duty data after filter processing according to the third embodiment.

In step S901 shown in FIG. 43, filter processing is applied to data in the scan duty buffer 107. That is, a scan duty filter processor 1001 shown in FIG. 42 applies, to M_d as the magenta scan duty data in the scan duty buffer 107, filter processing using a predetermined filter F_m by:

$$M\_df=M\_d*F\_m \qquad (63)$$

where * is a convolution operation to calculate M_df. FIG. 44 shows magenta scan duty data that has undergone the filter processing.

Note that the filter F_m in this process may use the same filter as that in the cyan processing, but may use other filters.

Figure 45:
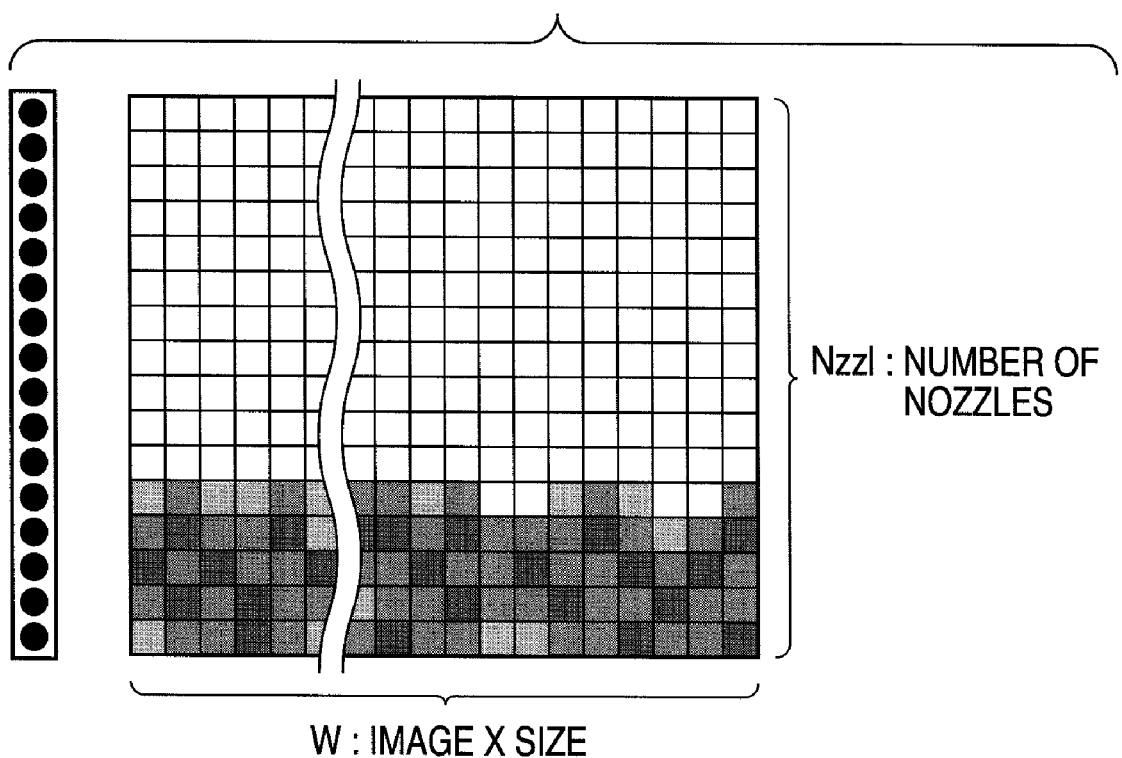
FIG. 45 shows magenta halftone data after the filter processing according to the third embodiment.

In step S902, a halftone data filter processor 1002 applies, to Out_m, filter processing using a predetermined low-pass filter LPF_b by:

$$Out\_m\_LPF=Out\_m*LPF\_b \qquad (64)$$

to calculate Out_m_LPF. FIG. 45 shows magenta halftone data that has undergone the filter processing.

Note that LPF_b of this embodiment may use either the same filter as in the cyan processing or other filters.

Figure 46:
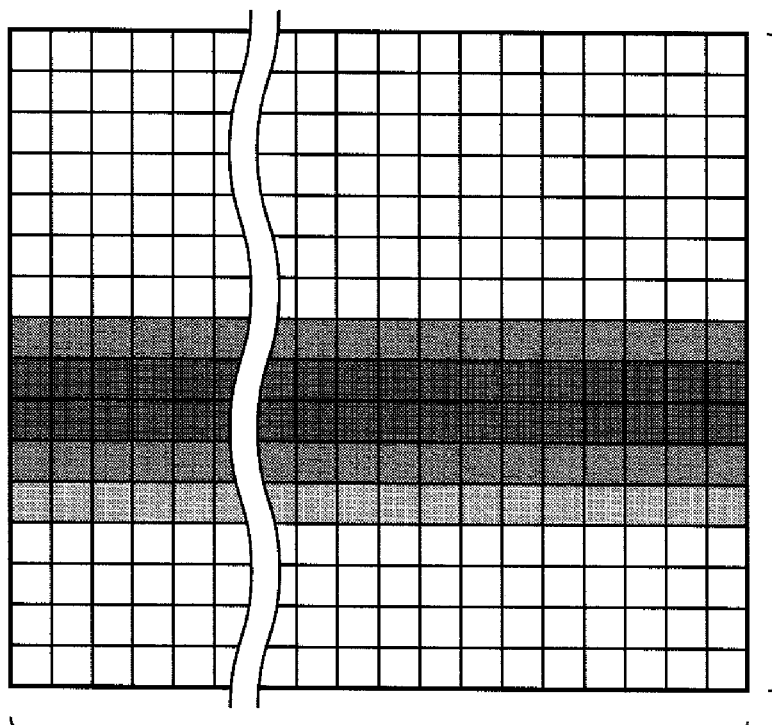
FIG. 46 shows magenta scan duty data after shift processing according to the third embodiment.

In step S903, a scan duty data shifter 1003 shifts the data M_df output from the scan duty filter processor 1001 upward by one paper feed amount LF=Nzzl/Pass=16/4=4. FIG. 46 shows shifted magenta scan duty data. Shifted scan duty data M'_df is calculated by:

$$M'\_df(nx,ny)=M\_df(nx,ny+LF) \quad (65)$$

for $0 \leq nx <$ image X size and $0 \leq ny < Nzz$

Figure 47:
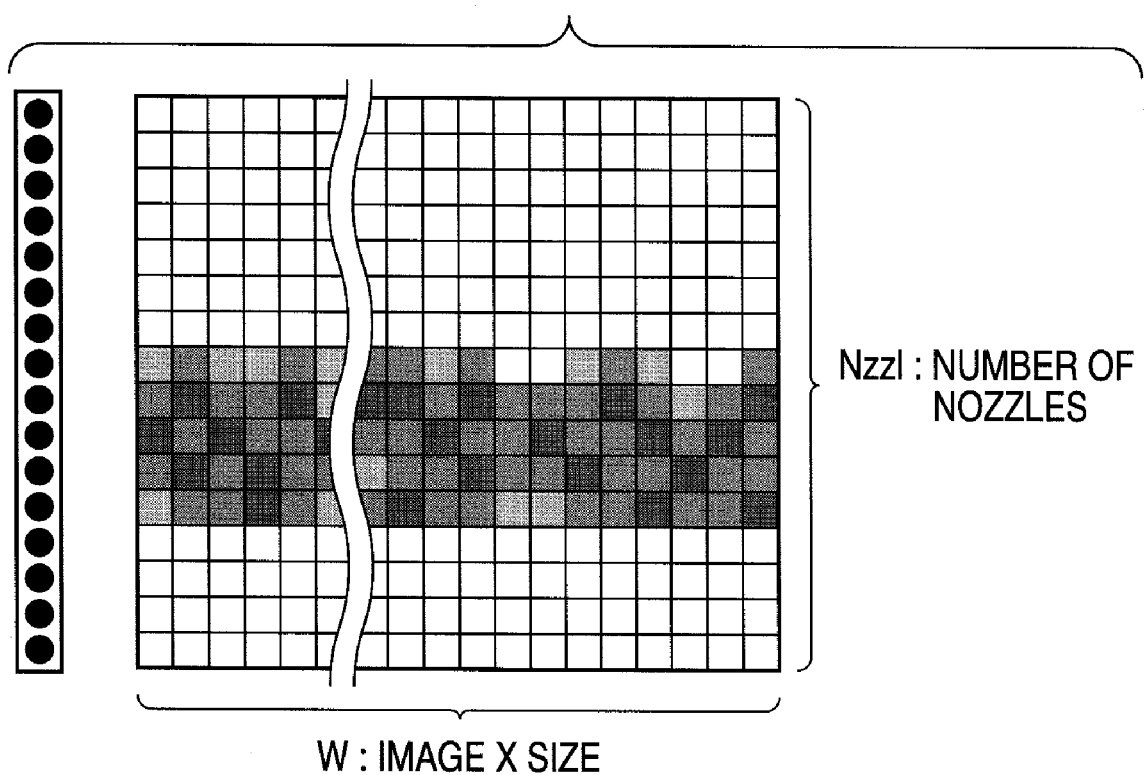
FIG. 47 shows magenta halftone data after the shift processing according to the third embodiment.

In equation (65), when $ny+LF \geq Nzzl$, $M'\_df(nx, ny)=0$. That is, zero is substituted in lower end LF nozzles (four nozzles in this case) after the shift processing. Likewise, in step S904 a halftone data shifter 1004 shifts the data Out_m_LPF upward by the paper feed amount. FIG. 47 shows shifted magenta halftone data. Shifted magenta halftone data Out'_m_LPF is calculated by:

$$Out'\_m\_LPF(nx,ny)=Out\_m\_LPF(nx,ny+LF) \quad (66)$$

for $0 \leq nx <$ image X size and $0 \leq ny < Nzzl$

In equation (66) as well, when $ny+LF \geq Nzzl$, $Out'\_m\_LPF(nx, ny)=0$. That is, zero is substituted in lower end LF nozzles (four nozzles in this case) after the shift processing.

Likewise, in step S905 a pre-update constraining condition information data shifter 1005 shifts the constraining condition information data CM_r after reflection of the cyan data upward by the paper feed amount. Shifted constraining condition information data CM'_r is calculated by:

$$CM'\_r(nx,ny)=CM\_r(nx,ny+LF) \quad (67)$$

for $0 \leq nx <$ image X size and $0 \leq ny < Nzzl$

In equation (67) as well, when $ny+LF \geq Nzzl$, $CM'\_r(nx, ny)=0$. That is, zero is substituted in lower end LF nozzles (four nozzles in this case) after the shift processing.

As described above, in order to calculate the constraining condition data for the next scan number, the information must be relatively shifted upward by the paper feed amount LF, and zero must be substituted in lower end LF nozzles. The reason why the buffer data are shifted by the paper feed amount LF in the magenta processing is that both the cyan and magenta halftone images at the same scan number have already been processed. Furthermore, in the third embodiment, since the constraining condition information is shared by cyan and magenta, after both the cyan and magenta dot allocations at the same scan number are determined, the constraining condition information is shifted upward by LF.

In step S906, a subtractor 1006 subtracts the data calculated by the halftone data shifter 1004 from the data calculated by the scan duty data shifter 1003. In step S907, a weight multiplier 1007 multiplies the difference data by a weighting coefficient h2 (real number).

In step S908, an adder 1008 adds the data calculated by the weight multiplier 1007 and the shifted CM constraining condition information to calculate constraining condition information CM_r after reflection of the cyan and magenta data.

A formula of the constraining condition information CM_r after reflection of the cyan and magenta data calculated in steps S906 to S908 is described by:

$$CM\_r \leftarrow (-Out'\_m\_LPF+M'\_df) \times h2+CM'\_r \quad (68)$$

In this way, the CM constraining condition information calculation processing based on the magenta dot allocations in step S514 in FIG. 29 is complete.

In step S515, the constraining condition information buffer 109 is updated by the calculation result of the CM constraining condition information. The updated CM constraining condition information is referred to as information required to determine the dot allocations for the next scan number k+1 and subsequent scan numbers.

In the third embodiment, with the aforementioned processing, a dot pattern is formed for each scan so as to set low frequency components of an already printed dot pattern to be in opposite phase on an identical region on a printing medium, as in the first embodiment. However, in the first embodiment, dot patterns are formed to set low frequency components in opposite phase for dots of an identical color. However, the third embodiment is characterized in that dot patterns are formed to set low frequency components in opposite phase by shared constraining condition information.

Therefore, according to the third embodiment, not only the number of constraining condition information buffers can be reduced, but also since low frequency components are set in opposite phase between different colors, a trouble such as deterioration of graininess due to formation of dark blue dots resulting from overlapping of cyan and magenta dots can be prevented.

In step S516, the printer 2 which received the halftone data selects ink colors that match the image data, and starts a print operation. In step S516, a main scan for printing an image on the printing medium by driving respective nozzles at a predetermined drive interval while moving the printing head 201 from the left to the right with respect to the printing medium is made once. Upon completion of the main scan, a sub-scan as a scan perpendicular to the main scan is made once.

It is then checked in step S517 if all scans are complete. If all scans are complete, a series of image forming processes are complete; otherwise, the process returns to step S503. As described above, all the processes are complete.

As described above, according to the third embodiment, since the constraining condition information is shared by two or more colors, low frequency components can be set in opposite phase and high frequency components can be set to have no correlation not only for an identical colors in the first embodiment but also between different colors. In this manner, in addition to a reduction of the number of constraining condition information buffers, deterioration of graininess due to overlapping of different color dots especially in a low frequency region can be prevented.

Fourth Embodiment

The fourth embodiment according to the present invention will be described hereinafter. Since the detailed arrangement of the image forming apparatus according to the fourth embodiment is the same as that in the first embodiment described above, a repetitive description thereof will be avoided.

The first to third embodiments described above have exemplified the case in which the constraining condition information buffer 109 is updated always using the same filters irrespective of the image density. However, in general, since the spatial frequency characteristics of a halftone-processed image change depending on the density, if the constraining condition information is generated always using the same filters, the following problems may occur. For example, even for an image which poses no problem in a low density region, graininess may become conspicuous in a high density region. Conversely, for an image which poses no problem in a high density region, nonuniformity may become conspicuous in a low density region.

The fourth embodiment is characterized in that filters are changed according to the density values of an image. In this way, optimal processing can be executed according to the density, and the aforementioned deterioration of image quality depending on the density can be prevented.

The halftone processing of the fourth embodiment will be described below. This processing is basically the same as that in the flowchart of FIG. 3 described in the first embodiment, except for details of the constraining condition information calculation processing in step S109. Therefore, details in the fourth embodiment of only the process in step S109 in FIG. 3 will be described below, and a description of other steps will not be given.

In step S109, constraining condition information is calculated. For the sake of simplicity, details of calculations of cyan constraining condition information for 4-pass printing, the scan number k=1, and the number Nzzl of nozzles=16 will be described below with reference to the block diagram of FIG. 48 and the flowchart of FIG. 49.

Figure 48:
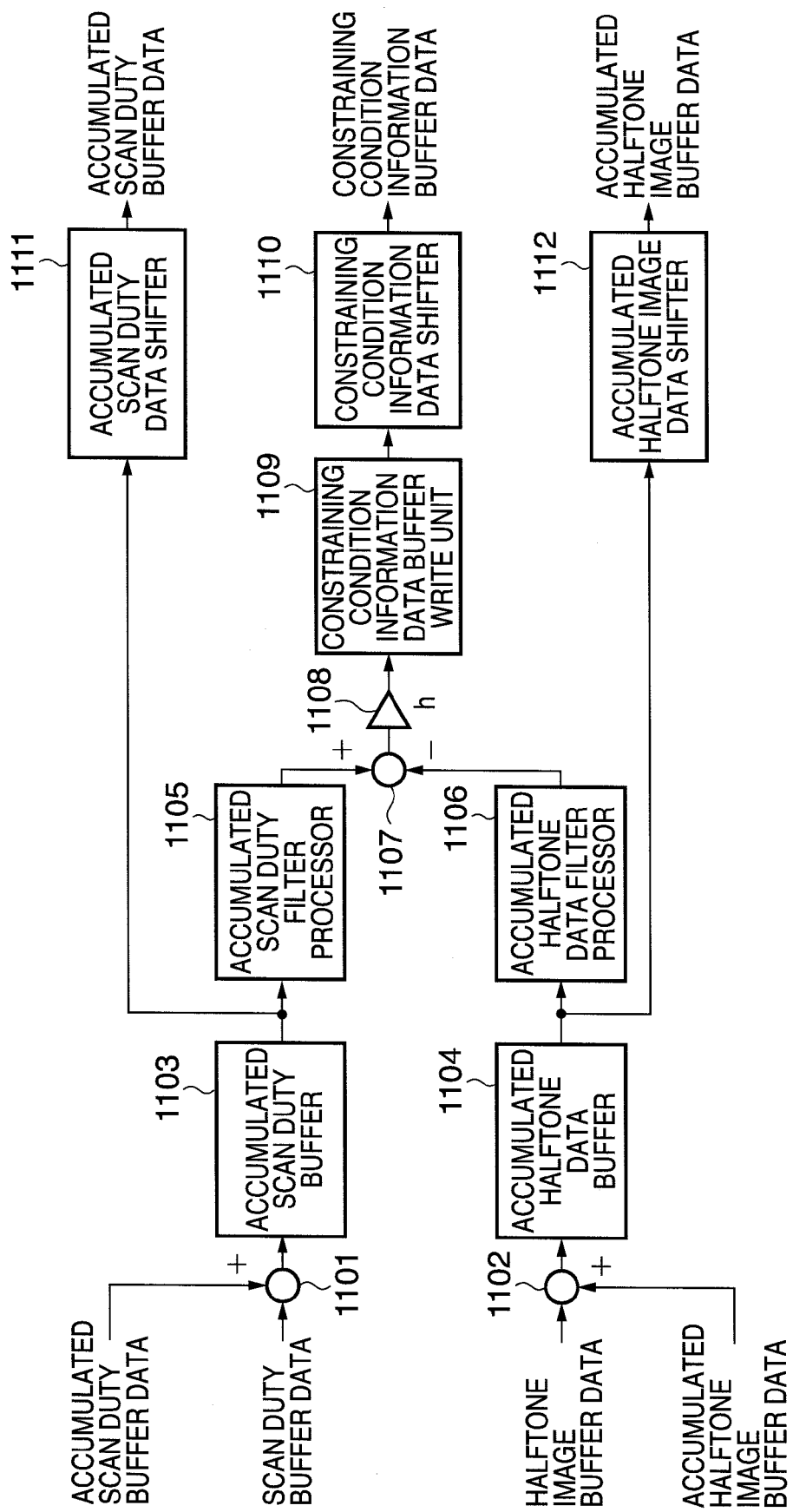
FIG. 48 is a block diagram showing the detailed arrangement associated with cyan of a constraining condition information calculation unit according to the fourth embodiment.
Figure 49:
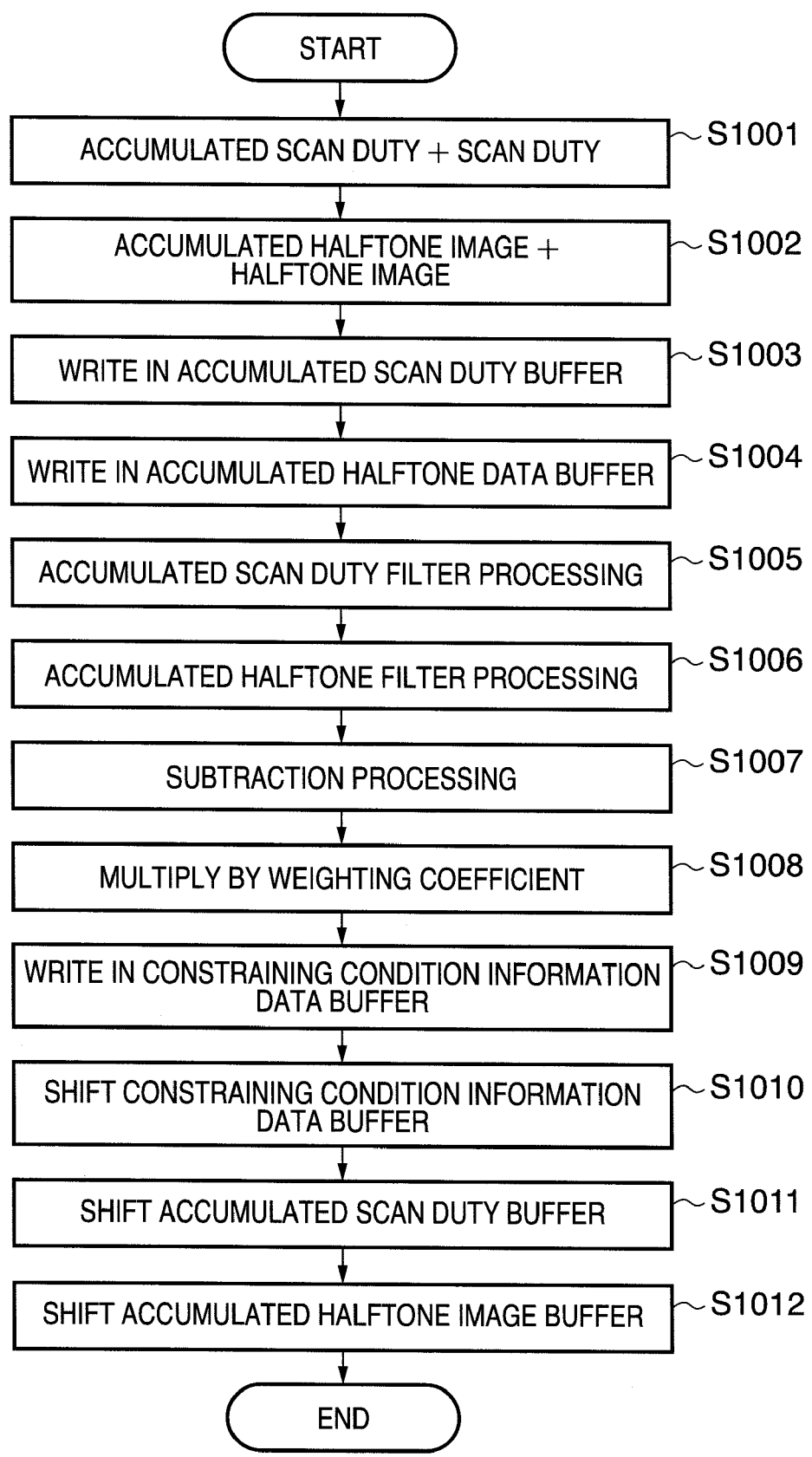
FIG. 49 is a flowchart showing constraining condition information calculation processing according to the fourth embodiment.

FIG. 48 is a block diagram showing the detailed arrangement associated with cyan in the constraining condition information calculation unit 111, and FIG. 49 is a flowchart showing the constraining condition information calculation processing to be executed in that arrangement. According to FIG. 48, the constraining condition information calculation unit 111 of the fourth embodiment is characterized by comprising an accumulated scan duty buffer 1103 and accumulated halftone data buffer 1104, and calculating the constraining condition information using accumulated data stored in these buffers.

Note that the constraining condition information indicates whether or not a dot is easily formed upon determining dot allocations of a halftone image at the scan number k=2 next to the current scan number k=1, as described above. When the current scan number is k, the next scan number is k+1.

In step S1001 shown in FIG. 49, an adder 1101 shown in FIG. 48 adds cyan duty data in the scan duty buffer 107 and data held in the accumulated scan duty buffer 1103. Note that an initial value of all zeros is substituted in the accumulated scan duty buffer 1103, and when the scan number k=1, data of respective colors are described by:

$$C\_sum\_d(nx,ny)=0 \quad (69)$$

$$Lc\_sum\_d(nx,ny)=0 \quad (70)$$

$$M\_sum\_d(nx,ny)=0 \quad (71)$$

$$Lm\_sum\_d(nx,ny)=0 \quad (72)$$

$$Y\_sum\_d(nx,ny)=0 \quad (73)$$

$$K\_sum\_d(nx,ny)=0 \quad (74)$$

where C_sum_d(X, Y), Lc_sum_d(X, Y), M_sum_d(X, Y), Lm_sum_d(X, Y), Y_sum_d(X, Y), and K_sum_d(X, Y) are buffer data of respective colors at an address (X, Y). Also, $0 \leq nx <$ image X size and $0 \leq ny < Nzzl$.

A description will be given to only cyan. Accumulated scan duty data C_sum_d' after addition in step S1001 is calculated by:

$$C\_sum\_d'=C\_d+C\_sum\_d \quad (75)$$

In step S1002, an adder 1102 shown in FIG. 48 adds halftone data and data held in the accumulated halftone data buffer 1104. Note that an initial value of all zeros is also substituted in the accumulated halftone data buffer 1104, and when the scan number k=1, data of respective colors are respective described by:

$$Out\_c\_sum(nx,ny)=0 \quad (76)$$

$$Out\_lc\_sum(nx,ny)=0 \quad (77)$$

$$Out\_m\_sum(nx,ny)=0 \quad (78)$$

$$Out\_lm\_sum(nx,ny)=0 \quad (79)$$

$$Out\_y\_sum(nx,ny)=0 \quad (80)$$

$$Out\_k\_sum(nx,ny)=0 \quad (81)$$

where Out_c_sum(X,Y), Out_lc_sum(X,Y), Out_m_sum(X,Y), Out_lm_sum(X,Y), Out_y_sum(X,Y), and Out_k_sum(X,Y) are buffer data of respective colors C, Lc, M, Lm, Y, and K at an address (X, Y). Also, $0 \leq nx <$ image X size and $0 \leq ny < Nzzl$.

A description will be given to only cyan. Accumulated scan duty data Out_c_sum' after addition in step S1001 is calculated by:

$$Out\_c\_sum'=Out\_c+Out\_c\_sum \quad (82)$$

Note that Out_c assumes a value "0" or "255" since it is halftone data. Since Out_c_sum is the accumulated data of Out_c, it is a multiple of 0 or 255. For example, when Out_c=255 and Out_c_sum=255, Out_c_sum'=510. When Out_c=255 and Out_c_sum=510, Out_c_sum'=765.

In step S1003, the accumulated scan duty data C_sum_d' calculated using equation (75) is written in the accumulated scan duty buffer 1103. As a result, we have:

$$C\_sum\_d \leftarrow C\_sum\_d' \quad (83)$$

In step S1004, the accumulated halftone data Out_c_sum' calculated using equation (82) is written in the accumulated halftone data buffer 1104. As a result, we have:

$$Out\_c\_sum \leftarrow Out\_c\_sum' \quad (84)$$

In step S1005, an accumulated scan duty filter processor 1105 applies filter processing to C_sum_d held in the accumulated scan duty buffer 1103. This filter processing uses a two-dimensional (2D) Gaussian filter F_m(C_sum_d, x, y) which changes according to C_sum_d, and calculates C_sum_df by:

$$C\_sum\_df=C\_sum\_d*F\_m(C\_sum\_d,x,y) \quad (85)$$

where * is a convolution operation.

Note that the 2D Gaussian filter F_m is expressed by:

$$F\_m=F'\_m/Sum\_m \quad (86)$$

where Sum_m is a total value of F'_m coefficients. Also, F'_m is given by:

$$F'\_m(C\_sum\_d, x, y) = \frac{1}{2\pi\sigma_x(C\_sum\_d)\sigma_y(C\_sum\_d)} \cdot \exp\left\{-\frac{1}{2}\left(\left(\frac{x}{\sigma_x(C\_sum\_d)}\right)^2 - 2\left(\frac{x}{\sigma_x(C\_sum\_d)}\right)\left(\frac{y}{\sigma_y(C\_sum\_d)}\right) + \left(\frac{y}{\sigma_y(C\_sum\_d)}\right)^2\right)\right\} \quad (87)$$

where the values of $\sigma_x(C\_sum\_d)$ and $\sigma_y(C\_sum\_d)$ change according to C_sum_d as the accumulated scan duty data.

FIG. 50 shows filters 5001 and 5002 as practical examples of the filter F_m. The fourth embodiment will exemplify a filter size of 3×3 square for the sake of simplicity. However, the present invention is not limited to such specific filter. For example, the filter size may be a 5×5, 7×7, or 9×9 square, or a 3×5, 5×7, or 5×9 rectangle. Also, the present invention is not limited to low-pass characteristics, and a filter with band-pass or high-pass characteristics may be used.

In FIG. 50, reference numeral 5001 denotes a filter example which has a size of 3×3, and yields $\sigma_x$(C_sum_d)= 1.0 and $\sigma_y$(C_sum_d)=1.0 when C_sum_d=30. Reference numeral 5002 denotes a filter example which has a size of 3×3, and yields $\sigma_x$(C_sum_d)=0.9 and $\sigma_y$(C_sum_d)=0.9 when C_sum_d=40. That is, as can be seen from FIG. 50, the filter coefficients of the filter F_m change according to C_sum_d.

In step S1006, an accumulated halftone data filter processor 1106 applies filter processing to Out_c sum held in the accumulated halftone data buffer 1104. This filter processing uses a 2D Gaussian filter LPF_b(C_sum_d, x, y) which changes according to C_sum_d, and calculates Out_c_sum_ LPF by:

$$\text{Out\_c\_sum\_LPF} = \text{Out\_c\_sum\_d} * \text{LPF\_b} \tag{88}$$

Note that the 2D Gaussian filter LPF_b is expressed by:

$$\text{LPF\_b} = \text{LPF'\_b}/\text{Sum\_b} \tag{89}$$

where Sum_b is a total value of LPF'_b coefficients. Also, LPF'_b is given by:

$$\text{LPF'\_b}(C\_sum\_d, x, y) = \frac{1}{2\pi\sigma_x(C\_sum\_d)\sigma_y(C\_sum\_d)} \cdot \exp\left\{-\frac{1}{2}\left(\left(\frac{x}{\sigma_x(C\_sum\_d)}\right)^2 + \left(\frac{y}{\sigma_y(C\_sum\_d)}\right)^2\right)\right\} \tag{90}$$

where the values of $\sigma_x$(C_sum_d) and $\sigma_y$(C_sum_d) change according to C_sum_d as the accumulated scan duty data.

FIG. 50 shows filters 5003 and 5004 as practical examples of the filter F_m. As for LPF_b, the fourth embodiment will exemplify a filter size of 3×3 square as in F_m. However, the present invention is not limited to such specific filter. For example, the filter size may be a 5×5, 7×7, or 9×9 square, or a 3×5, 5×7, or 5×9 rectangle. However, the value σ desirably increases with decreasing C_sum_d. Also, LPF_b preferably has low-pass characteristics.

As can be seen from FIG. 50, the filter coefficients of LPF_b change according to C_sum_d as in F_m. Note that the fourth embodiment uses the same filter coefficients as F_m and LPF_b, as shown in FIG. 50. However, different coefficients may be used, as a matter of course.

In step S1007, a subtractor 1107 subtracts the data calculated by the accumulated halftone data filter processor 1106 from the data calculated by the accumulated scan duty filter processor 1105. In step S1008, a weight multiplier 1108 multiplies the difference data by a weighting coefficient h (real number) to obtain constraining condition information C_r. The processes in steps S1007 and S1008 are described by:

$$C\_r \leftarrow (-\text{Out\_c\_sum\_LPF} + \text{C\_sum\_}df) \times h \tag{91}$$

In step S1009, a constraining condition information data buffer write unit 1109 writes the data C_r obtained by formula (91) in the constraining condition information buffer 109.

In step S1010, a constraining condition information data buffer shifter 1110 shifts the constraining condition information C_r written in the constraining condition information buffer 109 upward by one paper feed amount LF=Nzzl/Pass=16/4=4. Shifted constraining condition information data is calculated by:

$$C\_r(nx,ny) = C\_r(nx,ny+LF) \tag{92}$$

for $0 \leq nx <$ image X size and $0 \leq ny < Nzzl$

In equation (92), when ny+LF$\geq$Nzzl, C_r(nx, ny)=0. That is, zero is substituted in lower end LF nozzles (four nozzles in this case) after the shift processing.

In step S1011, an accumulated scan duty data shifter 1111 shifts C_sum_d held in the accumulated scan duty buffer 1103 upward by one paper feed amount LF=Nzzl/Pass=16/ 4=4. Shifted accumulated scan duty data is calculated by:

$$C\_sum\_d(nx,ny) = C\_sum\_d(nx,ny+LF) \tag{93}$$

for $0 \leq nx <$ image X size and $0 \leq ny < Nzzl$

In equation (93) as well, when ny+LF$\geq$Nzzl, C_sum_d (nx, ny)=0. That is, zero is substituted in lower end LF nozzles (four nozzles in this case) after the shift processing.

Likewise, in step S1012, an accumulated halftone data shifter 1112 shifts Out_c_sum held in the accumulated halftone data buffer 1104 upward by one paper feed amount. Shifted accumulated halftone data is calculated by:

$$\text{Out\_c\_sum}(nx,ny) = \text{Out\_c\_sum}(nx,ny+LF) \tag{94}$$

for $0 \leq nx <$ image X size and $0 \leq ny < Nzzl$

In equation (94) as well, when ny+LF$\geq$Nzzl, Out_c_sum (nx, ny)=0. That is, zero is substituted in lower end LF nozzles (four nozzles in this case) after the shift processing.

In this way, the constraining condition information calculation processing in step S109 of the fourth embodiment is complete.

As described above, since the filter coefficients are changed for an identical color in accordance with the accumulated scan duty data, optimal constraining condition information according to the density can be calculated, thus preventing deterioration of image quality depending on the density.

Note that the filter processing of the fourth embodiment may be applied to the second embodiment that executes the dither matrix processing, and also to the third embodiment that shares constraining condition information by different colors.

Fifth Embodiment

The fifth embodiment according to the present invention will be described hereinafter. Since the detailed arrangement of the image forming apparatus according to the fifth embodiment is the same as that in the first embodiment described above, a repetitive description thereof will be avoided.

In the first to fourth embodiments described above, the filter processing is applied to multi-valued data such as C_d or C_sum_d and the like to execute processing under the assumption of preservation of the spatial frequency characteristics of an image. However, as is known, the filter processing for the multi-valued data such as C_d or C_sum_d and the like requires high processing cost in both hardware and software processing.

The fifth embodiment executes processing that omits the filter processing of the multi-valued data. With this processing, an image edge is emphasized, but a configuration that can reduce the processing cost can be attained.

The halftone processing of the fifth embodiment will be described below. This processing is basically the same as that in the flowchart of FIG. 3 described in the first embodiment, except for details of the constraining condition information calculation processing in step S109. Therefore, details in the fifth embodiment of only the process in step S109 in FIG. 3 will be described below, and a description of other steps will not be given.

Figure 54:
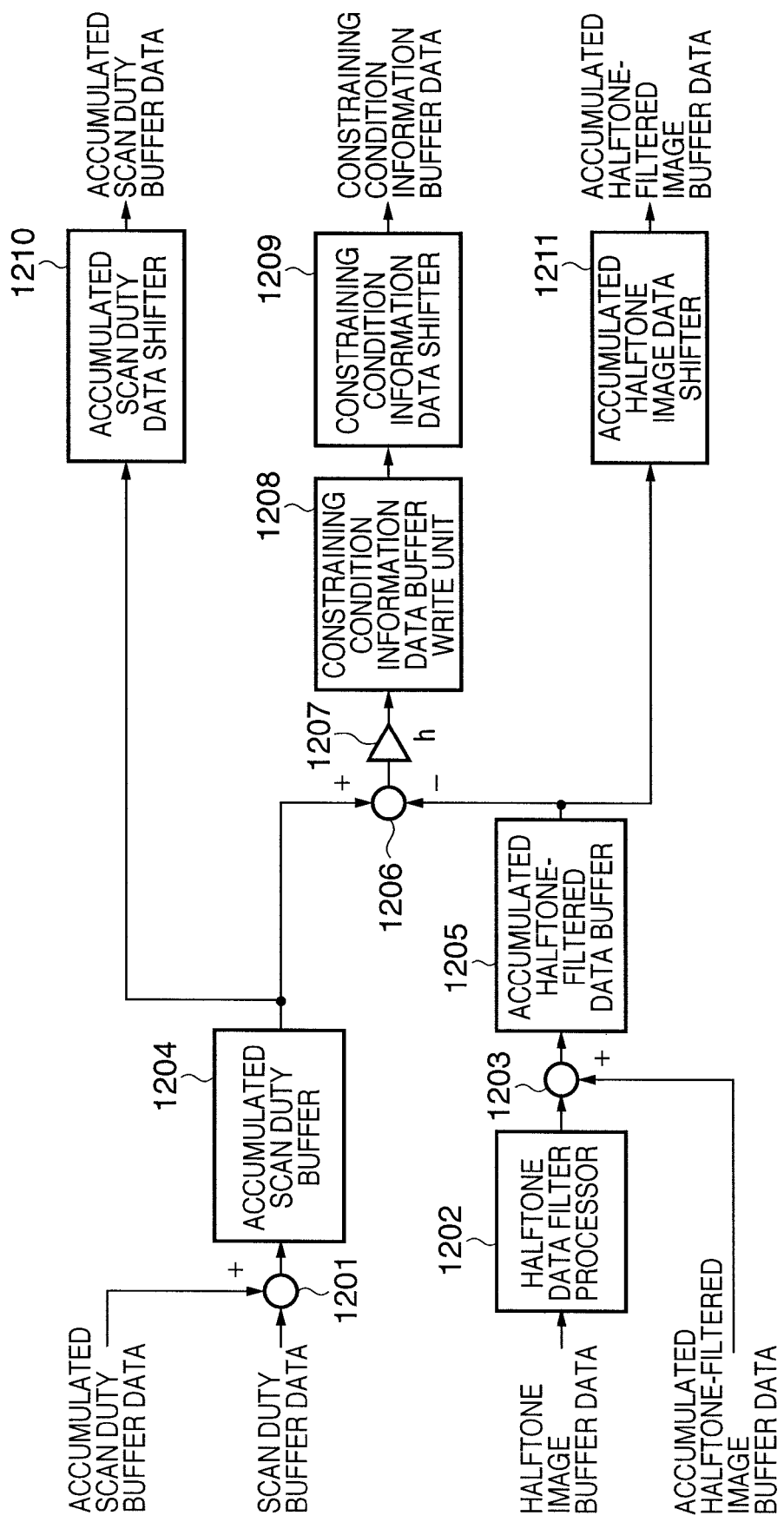
FIG. 54 is a block diagram showing the detailed arrangement of a constraining condition information calculation unit according to the fifth embodiment.
Figure 55:
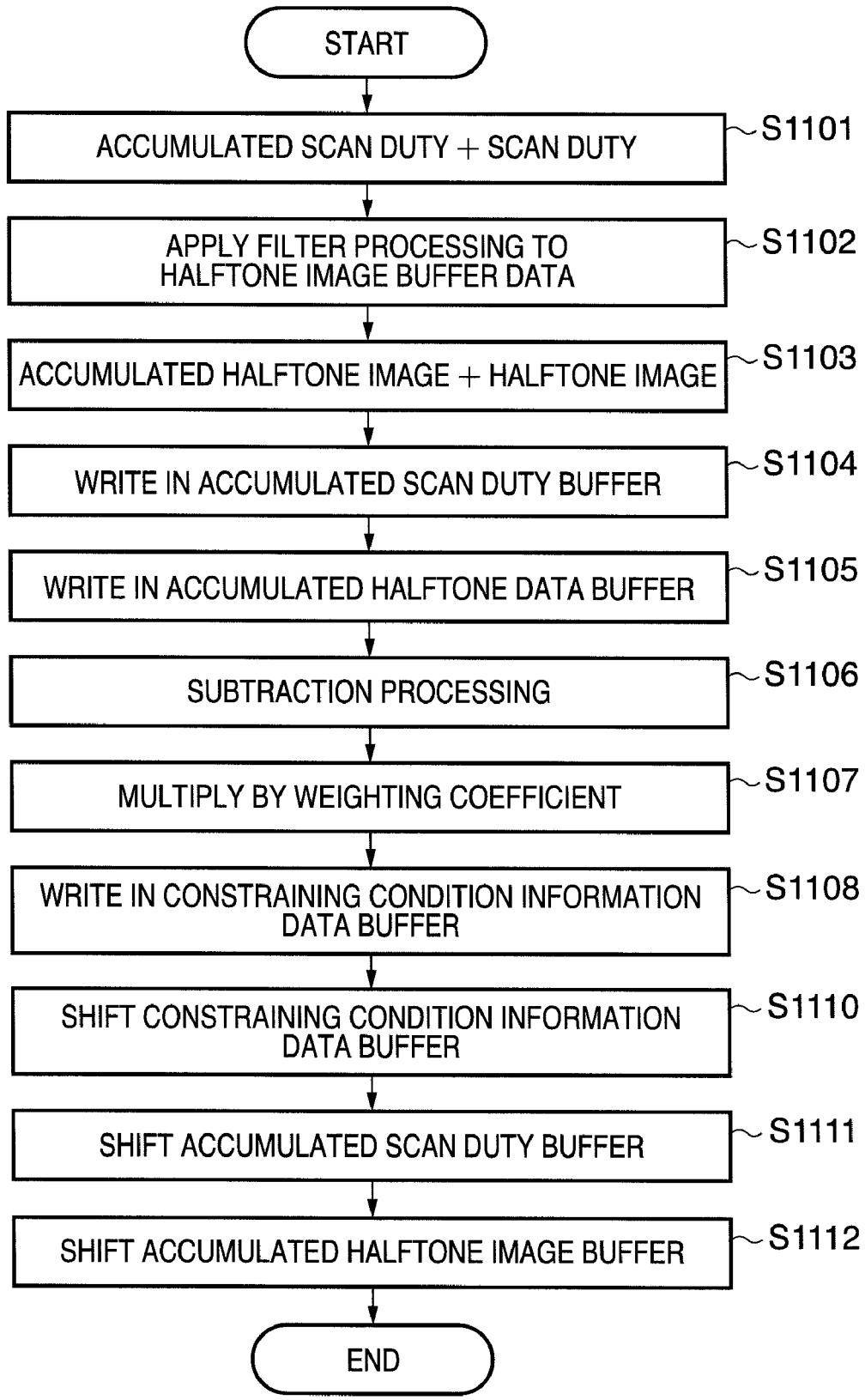
FIG. 55 is a flowchart showing constraining condition information calculation processing according to the fifth embodiment.

In step S109, constraining condition information is calculated. For the sake of simplicity, details of calculations of cyan constraining condition information for 4-pass printing, the scan number k=1, and the number Nzzl of nozzles=16 will be described below with reference to the block diagram of FIG. 54 and the flowchart of FIG. 55. FIG. 54 is a block diagram showing the detailed arrangement associated with cyan in the constraining condition information calculation unit 111, and FIG. 55 is a flowchart showing the constraining condition information calculation processing to be executed in that arrangement. Note that the constraining condition information indicates whether or not a dot is easily formed upon determining dot allocations of a halftone image at the scan number k=2 next to the current scan number k=1, as described above. When the current scan number is k, the next scan number is k+1.

In step S1101 shown in FIG. 55, an adder 1201 shown in FIG. 54 adds cyan duty data in the scan duty buffer 107 and data held in an accumulated scan duty buffer 1204. Note that an initial value of all zeros is substituted in the accumulated scan duty buffer 1204, and when the scan number k=1, data of respective colors are described by:

$$C\_sum\_d(nx,ny)=0 \quad (95)$$

$$Lc\_sum\_d(nx,ny)=0 \quad (96)$$

$$M\_sum\_d(nx,ny)=0 \quad (97)$$

$$Lm\_sum\_d(nx,ny)=0 \quad (98)$$

$$Y\_sum\_d(nx,ny)=0 \quad (99)$$

$$K\_sum\_d(nx,ny)=0 \quad (100)$$

where $C\_sum\_d(X, X)$, $Lc\_sum\_d(X, Y)$, $M\_sum\_d(X, Y)$, $Lm\_sum\_d(X, Y)$, $Y\_sum\_d(X, Y)$, and $K\_sum\_d(X, Y)$ are buffer data of respective colors at an address (X, Y). Also, $0 \leq nx <$ image X size and $0 \leq ny <$ Nzzl.

A description will be given to only cyan. Accumulated scan duty data $C\_sum\_d'$ after addition in step S1101 is calculated by:

$$C\_sum\_d'=C\_d+C\_sum\_d \quad (101)$$

In step S1102, a halftone data filter processor 1202 applies filter processing using a predetermined low-pass filter LPF_b to Out_c:

$$Out\_c\_LPF=Out\_c*LPF\_b \quad (102)$$

The coefficients of LPF_b of the fifth embodiment will be explained as an isotropic weighted average filter 2402 in FIG. 24, which has a filter size of a 3×3 square and in which coefficients are set in a nearly concentric circler pattern. However, the present invention is not limited to such specific filter. LPF_b preferably has low-pass characteristics.

In step S1103, an adder 1203 shown in FIG. 54 adds the halftone data after the halftone processing and data held in an accumulated halftone-filtered data buffer 1205. Note that an initial value of all zeros is also substituted in the accumulated halftone-filtered data buffer 1205, and when the scan number k=1, data of respective colors are respective described by:

$$Out\_c\_LPF\_sum(nx,ny)=0 \quad (103)$$

$$Out\_lc\_LPF\_sum(nx,ny)=0 \quad (104)$$

$$Out\_m\_LPF\_sum(nx,ny)=0 \quad (105)$$

$$Out\_lm\_LPF\_sum(nx,ny)=0 \quad (106)$$

$$Out\_y\_LPF\_sum(nx,ny)=0 \quad (107)$$

$$Out\_k\_LPF\_sum(nx,ny)=0 \quad (108)$$

where $Out\_c\_LPF\_sum(X, Y)$, $Out\_lc\_LPF\_sum(X, Y)$, $Out\_m\_LPF\_sum(X, Y)$, $Out\_lm\_LPF\_sum(X, Y)$, $Out\_y\_LPF\_sum(X, Y)$, and $Out\_k\_LPF\_sum(X, Y)$ are buffer data of respective colors C, Lc, M, Lm, Y, and K at an address (X, Y). Also, $0 \leq nx <$ image X size and $0 \leq ny <$ Nzzl.

A description will be given to only cyan. Accumulated halftone-filtered data $Out\_c\_LPF\_sum'$ after addition in step S1103 is calculated by:

$$Out\_c\_LPF\_sum'=Out\_c\_LPF+Out\_c\_LPF\_sum \quad (109)$$

In step S1104, the accumulated scan duty data $C\_sum\_d'$ calculated using equation (101) is written in the accumulated scan duty buffer 1204. As a result, we have:

$$C\_sum\_d \leftarrow C\_sum\_d' \quad (110)$$

In step S1105, the accumulated halftone-filtered data $Out\_c\_LPF\_sum'$ calculated using equation (109) is written in the accumulated halftone-filtered data buffer 1205. As a result, we have:

$$Out\_c\_LPF\_sum \leftarrow Out\_c\_LPF\_sum' \quad (111)$$

In step S1106, a subtractor 1206 subtracts the data stored in the accumulated halftone-filtered data buffer 1205 from the data stored in the accumulated scan duty buffer 1204. In step S1107, a weight multiplier 1207 multiplies the difference data by a weighting coefficient h (real number) to obtain constraining condition information C_r. The processes in steps S1106 and S1107 are described by:

$$C\_r \leftarrow (-Out\_c\_LPF\_sum + C\_sum\_d) \times h \quad (112)$$

In step S1108, a constraining condition information data buffer write unit 1208 writes the data C_r obtained by formula (112) in the constraining condition information buffer 109.

In step S1109, a constraining condition information data buffer shifter 1209 shifts the constraining condition information C_r written in the constraining condition information buffer 109 upward by one paper feed amount LF=Nzzl/Pass=16/4=4. Shifted constraining condition information data is calculated by:

$$C\_r(nx,ny)=C\_r(nx,ny+LF) \quad (113)$$

for $0 \leq nx <$ image X size and $0 \leq ny <$ Nzzl

In equation (113), when $ny+LF \geq Nzzl$, $C\_r(nx, ny)=0$. That is, zero is substituted in lower end LF nozzles (four nozzles in this case) after the shift processing.

In step S1110, an accumulated scan duty data shifter 1210 shifts C_sum_d held in the accumulated scan duty buffer 1204 upward by one paper feed amount LF=Nzzl/Pass=16/4=4. Shifted accumulated scan duty data is calculated by:

$$C\_sum\_d(nx,ny)=C\_sum\_d(nx,ny+LF) \quad (114)$$

for $0 \leq nx <$ image X size and $0 \leq ny <$ Nzzl

In equation (114) as well, when $ny+LF \geq Nzzl$, $C\_sum\_d(nx, ny)=0$. That is, zero is substituted in lower end LF nozzles (four nozzles in this case) after the shift processing.

Likewise, in step S1111, an accumulated halftone data shifter 1211 shifts Out_c_LPF_sum held in the accumulated halftone-filtered data buffer 1205 upward by one paper feed amount. Shifted accumulated halftone data is calculated by:

$$Out\_c\_LPF\_sum(nx,ny)=Out\_c\_LPF\_sum(nx,ny+LF) \quad (115)$$

for $0 \leq nx <$ image X size and $0 \leq ny <$ Nzzl

In equation (115) as well, when $ny+LF \geq Nzzl$, $Out\_c\_LPF\_sum(nx, ny)=0$. That is, zero is substituted in lower end LF nozzles (four nozzles in this case) after the shift processing.

In this way, the constraining condition information calculation processing in step S109 of the fifth embodiment is complete.

As described above, according to the fifth embodiment, the processing that omits filter processing of multi-valued data is executed for an identical color in place of that in the first to fourth embodiments described above. In this way, an image edge is emphasized, but a configuration that can reduce the processing cost can be attained.

Note that the filter processing of the fifth embodiment may be applied to the second embodiment that executes the dither matrix processing, and also to the third embodiment that shares constraining condition information by different colors.

Other Embodiments

Each of the aforementioned embodiments has explained the image processing apparatus which uses the ink-jet printing method that forms an image by scanning the printing head having the plurality of nozzles, arranged in the predetermined direction, in a direction perpendicular to the arranging direction of the nozzles, and ejecting inks onto a printing medium. However, the present invention can be applied to printing apparatuses (for example, a thermal transfer method and electrophotography method) which execute printing according to methods other than the ink-jet method. In this case, the nozzles which eject ink droplets correspond to printing elements or laser light-emitting elements which print dots.

The present invention can also be applied to a so-called full-line type printing apparatus or the like, which has a printing head with a length corresponding to the printing width of a printing medium, and attains printing by moving the printing medium with respect to the printing head.

The present invention can adopt embodiments in the forms of a system, apparatus, method, program, storage medium (recording medium), and the like. More specifically, the present invention can be applied to either a system constituted by a plurality of devices (e.g., a host computer, interface device, image sensing device, web application, and the like), or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. The program in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As a program supply method, the following method may be used. The user establishes a connection to a homepage on the Internet using a browser on a client computer, and downloads the computer program itself of the present invention (or a compressed file including an automatic installation function) from the homepage onto a recording medium such as a hard disk or the like. Also, the program code that forms the program of the present invention may be segmented into a plurality of files, which may be downloaded from different homepages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, and the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented when an OS or the like running on the computer executes some or all of actual processing operations on the basis of an instruction of that program.

Furthermore, the functions of the aforementioned embodiments can be implemented when the program read out from the recording medium is written in a memory equipped on a function expansion board or a function expansion unit, which is inserted in or connected to the computer, and is then executed. Therefore, a CPU equipped on the function expansion board or function expansion unit can execute some or all of actual processing operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-023515, filed Feb. 1, 2007, which is hereby incorporated by reference herein in its entirety.

What is claimed is:

1. An image forming apparatus which forms an image by using a printing head, comprising a plurality of printing elements, to scan a printing medium, comprising:
   an input unit adapted to input image data;
   a calculation unit adapted to calculate printing amounts for the respective printing elements for each main scan of the printing head in accordance with the image data;
   an N-ary unit adapted to generate a dot pattern to be formed by applying N-ary processing, with N being an integer not less than 2, to the printing amounts calculated by said calculation unit based on predetermined constraining condition information; and
   a generation unit adapted to generate the constraining condition information to be referred to by said N-ary unit for a next main scan based on the printing amounts calculated by said calculation unit and the dot pattern output from said N-ary unit,
   wherein said generation unit generates the constraining condition information so that a phase of the dot pattern to be generated by said N-ary unit has an opposite phase relationship in a part of a frequency region with respect to a dot pattern already printed on an identical region on the printing medium.

2. The apparatus according to claim 1, wherein said generation means generates the constraining condition information so that the dot pattern to be generated by said N-ary unit is set in opposite phase in the part of the frequency region with respect to the phase of a dot pattern of an identical color, which is already recorded on the identical region on the printing medium.

3. The apparatus according to claim 1, wherein said generation means generates the constraining condition information so that the dot pattern to be generated by said N-ary unit is set in opposite phase in the part of the frequency region with respect to the phase of a dot pattern of a different color, which is already recorded on the identical region on the printing medium.

4. The apparatus according to claim 1, wherein said calculation unit calculates the printing amounts for the respective printing elements by dividing a printing amount corresponding to the image data in accordance with positions of the printing elements in the printing head.

5. The apparatus according to claim 4, wherein said calculation unit calculates the printing amounts for the respective printing elements so that a total of printing amounts for the respective printing elements for an identical region on the printing medium becomes the printing amount corresponding to the image data.

6. The apparatus according to claim 1, wherein said N-ary unit executes the N-ary processing based on an error diffusion method.

7. The apparatus according to claim 1, wherein said N-ary unit executes the N-ary processing based on a dither matrix method.

8. The apparatus according to claim 1, wherein said generation unit generates the constraining condition information based on accumulated values of the printing amounts calculated by said calculation unit.

9. The apparatus according to claim 1, wherein the printing head is equipped for each of a plurality of colors.

10. An image processing apparatus which outputs a dot pattern to an image forming apparatus that forms an image by using a printing head, comprising a plurality of printing elements, to scan a printing medium, comprising:
   an input unit adapted to input image data;
   a calculation unit adapted to calculate printing amounts for the respective printing elements for each main scan of the printing head;
   an N-ary unit adapted to generate a dot pattern to be formed by applying N-ary processing to the printing amounts calculated by said calculation unit based on predetermined constraining condition information; and
   a generation unit adapted to generate the constraining condition information to be referred to by said N-ary unit for a next main scan based on the printing amounts calculated by said calculation unit and the dot pattern output from said N-ary unit,
   wherein said generation unit generates the constraining condition information so that a phase of the dot pattern to be generated by said N-ary unit has an opposite phase relationship in a part of a frequency region with respect to a dot pattern already printed on an identical region on the printing medium.

11. A method of controlling an image forming apparatus which forms an image by using a printing head, comprising a plurality of printing elements, to scan a printing medium, comprising:
   an input step of causing an input unit to input image data;
   a calculation step of causing a calculation unit to calculate printing amounts for the respective printing elements for each main scan of the printing head in accordance with the image data;
   an N-ary step of causing an N-ary unit to generate a dot pattern to be formed by applying N-ary processing based on predetermined constraining condition information to the printing amounts calculated in the calculation step; and
   a generation step of causing a generation unit to generate the constraining condition information to be referred to by the N-ary unit for a next main scan based on the printing amounts calculated in the calculation step and the dot pattern output from the N-ary step,
   wherein in the generation step, the constraining condition information is generated so that a phase of the dot pattern to be generated by the N-ary unit has an opposite phase relationship in a part of the frequency region with respect to a dot pattern already printed on an identical region on the printing medium.

12. The method according to claim 11, wherein in the generation step, the constraining condition information is generated so that the phase of the dot pattern to be generated has no correlation in a high frequency region with respect to the dot pattern already printed on the identical region on the printing medium.

13. A non-transitory computer-readable storage medium storing a computer program for making a computer execute a control method of an image forming apparatus according to claim 11.

14. A method of controlling an image processing apparatus which outputs a dot pattern to an image forming apparatus that forms an image by using a printing head, comprising a plurality of printing elements, to scan a printing medium, comprising:
   an input step of causing an input unit to input image data;
   a calculation step of causing a calculation unit to calculate printing amounts for the respective printing elements for each main scan of the printing head in accordance with the image data;
   an N-ary step of causing an N-ary unit to generate a dot pattern to be formed by applying N-ary processing based on predetermined constraining condition information to the printing amounts calculated in the calculation step; and
   a generation step of causing a generation unit to generate the constraining condition information to be referred to by the N-ary unit for a next main scan based on the printing amounts calculated in the calculation step and the dot pattern output from the N-ary step,
   wherein in the generation step, the constraining condition information is generated so that a phase of the dot pattern to be generated by the N-ary unit has an opposite phase relationship in a part of a frequency region with respect to a dot pattern already printed on an identical region on the printing medium.

15. A non-transitory computer-readable storage medium storing a computer program for making a computer execute a control method of an image processing apparatus according to claim 14.

* * * * *